US010220665B2

(12) United States Patent
Vaughan et al.

(10) Patent No.: US 10,220,665 B2
(45) Date of Patent: Mar. 5, 2019

(54) SYMMETRICALLY DYNAMIC EQUALIZED VOLUME AND PRESSURE AIR MANAGEMENT SYSTEM

(71) Applicant: BASE Air Management, Inc., Richmond, VA (US)

(72) Inventors: Matthew Vaughan, Blacksburg, VA (US); David Bryan Lewis, Amelia Court House, VA (US); Joseph Calaway, Camden, MI (US); George Arrants, Richmond, VA (US)

(73) Assignee: BASE Air Management, Inc., Richmond, VA (US)

( * ) Notice: Subject to any disclaimer, the term of this patent is extended or adjusted under 35 U.S.C. 154(b) by 0 days.

(21) Appl. No.: 16/154,085

(22) Filed: Oct. 8, 2018

(65) Prior Publication Data
US 2019/0039431 A1    Feb. 7, 2019

Related U.S. Application Data

(63) Continuation-in-part of application No. 16/009,760, filed on Jun. 15, 2018, now Pat. No. 10,093,145.
(Continued)

(51) Int. Cl.
*B60G 17/052* (2006.01)
*B60G 17/015* (2006.01)
(Continued)

(52) U.S. Cl.
CPC ..... *B60G 17/0525* (2013.01); *B60G 17/0155* (2013.01); *B60G 17/0162* (2013.01);
(Continued)

(58) Field of Classification Search
CPC .............. B60G 17/0525; B60G 21/067; B60G 21/026; B60G 21/005; B60G 17/0162;
(Continued)

(56) References Cited

U.S. PATENT DOCUMENTS 2,361,575 A    10/1944    Thompson
2,784,978 A    3/1957     Seale
(Continued)

FOREIGN PATENT DOCUMENTS

WO    03/029687 A1    4/2003
WO    2013000014 A1   1/2013

OTHER PUBLICATIONS

Notification of Transmittal of the International Search Report and the Written Opinion of the International Search Authority, dated Oct. 1, 2018, 14 pages.
(Continued)

*Primary Examiner* — Darlene P Condra
(74) *Attorney, Agent, or Firm* — Rothwell, Figg, Ernst & Manbeck, P.C.

(57) ABSTRACT

An air management system for a vehicle having a supply tank, a system controller integrated with the supply tank, a first pneumatic circuit pneumatically connected to the system controller, and a second pneumatic circuit pneumatically connected to the system controller. The system controller adjusts independently air pressure of the first pneumatic circuit and the second pneumatic circuit without establishing pneumatic communication between the first and second pneumatic circuits. The system controller establishes pneumatic communication between the first and second pneumatic circuits when the system controller is not adjusting independently the air pressure of the first pneumatic circuit and the second pneumatic circuit.

30 Claims, 48 Drawing Sheets

Related U.S. Application Data

(60) Provisional application No. 62/520,918, filed on Jun. 16, 2017, provisional application No. 62/573,587, filed on Oct. 17, 2017, provisional application No. 62/626,373, filed on Feb. 5, 2018.

(51) Int. Cl.
*B60G 17/016* (2006.01)
*B60G 21/00* (2006.01)
*B60G 21/02* (2006.01)
*B60G 21/067* (2006.01)
*F15B 13/04* (2006.01)

(52) U.S. Cl.
CPC ......... *B60G 21/005* (2013.01); *B60G 21/026* (2013.01); *B60G 21/067* (2013.01); *F15B 13/0406* (2013.01); *B60G 2202/1524* (2013.01); *B60G 2204/111* (2013.01); *B60G 2204/82* (2013.01); *B60G 2400/51222* (2013.01); *B60G 2500/2021* (2013.01); *B60G 2500/2046* (2013.01); *B60G 2800/914* (2013.01)

(58) Field of Classification Search
CPC ........ B60G 17/0155; B60G 2500/2046; B60G 2500/2021; B60G 2400/51222; B60G 2204/82; B60G 2204/111; B60G 2202/1524; B60G 2800/914; F15B 13/0406
See application file for complete search history.

(56) References Cited

U.S. PATENT DOCUMENTS

| | | | |
|---|---|---|---|
| 2,862,725 A | 12/1958 | Jackson | |
| 2,950,124 A | 8/1960 | Pribonic | |
| 2,962,296 A | 11/1960 | Jackson | |
| 2,986,404 A | 5/1961 | Chuba et al. | |
| 3,022,749 A | 2/1962 | Voertman et al. | |
| 3,061,330 A * | 10/1962 | Alfieri | B60G 17/0155 280/124.102 |
| 3,104,114 A | 9/1963 | Vogel | |
| 4,586,728 A | 5/1986 | Tokunaga et al. | |
| 4,787,644 A * | 11/1988 | Yokote | B60G 17/016 280/5.507 |
| 4,798,369 A | 1/1989 | Geno et al. | |
| 6,036,179 A | 3/2000 | Rensel | |
| 6,089,551 A | 7/2000 | Haviland et al. | |
| 6,250,659 B1 * | 6/2001 | Morris | B60G 11/27 280/124.147 |
| 6,412,790 B2 | 7/2002 | McKenzie et al. | |
| 6,669,216 B1 | 12/2003 | Elser et al. | |
| 6,799,768 B2 | 10/2004 | Jin | |
| 6,945,275 B2 | 9/2005 | Krechmery et al. | |
| 7,420,462 B2 | 9/2008 | Nordmeyer | |
| 7,621,538 B2 | 11/2009 | Nordmeyer et al. | |
| 7,938,418 B1 | 5/2011 | Coombs et al. | |
| 7,946,599 B2 | 5/2011 | Lloyd | |
| 7,950,674 B2 | 5/2011 | Honig et al. | |
| 8,047,551 B2 | 11/2011 | Morris et al. | |
| 8,172,237 B2 | 5/2012 | Peterson | |
| 8,413,997 B1 | 4/2013 | Coombs et al. | |
| 8,868,294 B2 | 10/2014 | Gambrall | |
| 8,905,071 B2 | 12/2014 | Coombs et al. | |
| 8,936,043 B2 | 1/2015 | Costin et al. | |
| 8,973,922 B2 | 3/2015 | Koelzer | |
| 9,211,776 B2 | 12/2015 | May | |
| 9,272,599 B1 | 3/2016 | Cook, Jr. et al. | |
| 9,358,855 B2 | 6/2016 | Gomann et al. | |
| 9,428,022 B2 | 8/2016 | Coombs et al. | |
| 9,440,506 B2 | 9/2016 | Coombs et al. | |
| 9,452,655 B2 | 9/2016 | Hiebert et al. | |
| 9,879,745 B2 | 1/2018 | Prams | |
| 9,975,392 B2 | 5/2018 | Ahmadian | |
| 10,040,331 B2 | 8/2018 | Gandhi | |
| 10,093,145 B1 | 10/2018 | Vaughan et al. | |
| 2003/0075883 A1 | 4/2003 | Jin | |
| 2004/0245732 A1 * | 12/2004 | Kotulla | B60G 11/44 280/5.502 |
| 2007/0052141 A1 | 3/2007 | Li | |
| 2007/0073461 A1 | 3/2007 | Fielder | |
| 2007/0200304 A1 | 8/2007 | Brookes | |
| 2008/0054537 A1 | 3/2008 | Harrison | |
| 2009/0194179 A1 | 8/2009 | Morris | |
| 2011/0187070 A1 | 8/2011 | Hammond | |
| 2012/0227662 A1 | 9/2012 | Coombs | |
| 2015/0251515 A1 * | 9/2015 | Joachim | B60G 11/27 280/5.514 |
| 2016/0185179 A1 | 6/2016 | May | |
| 2017/0106710 A1 * | 4/2017 | Giuliani | B60G 11/52 |
| 2017/0361672 A1 * | 12/2017 | Ahmadian | B60G 11/27 |
| 2017/0361674 A1 * | 12/2017 | Ahmadian | B60G 11/27 |

OTHER PUBLICATIONS

Examination report No. 1 cited in Australian Application No. 2018217242 dated Oct. 5, 2018, 9 pages.

* cited by examiner

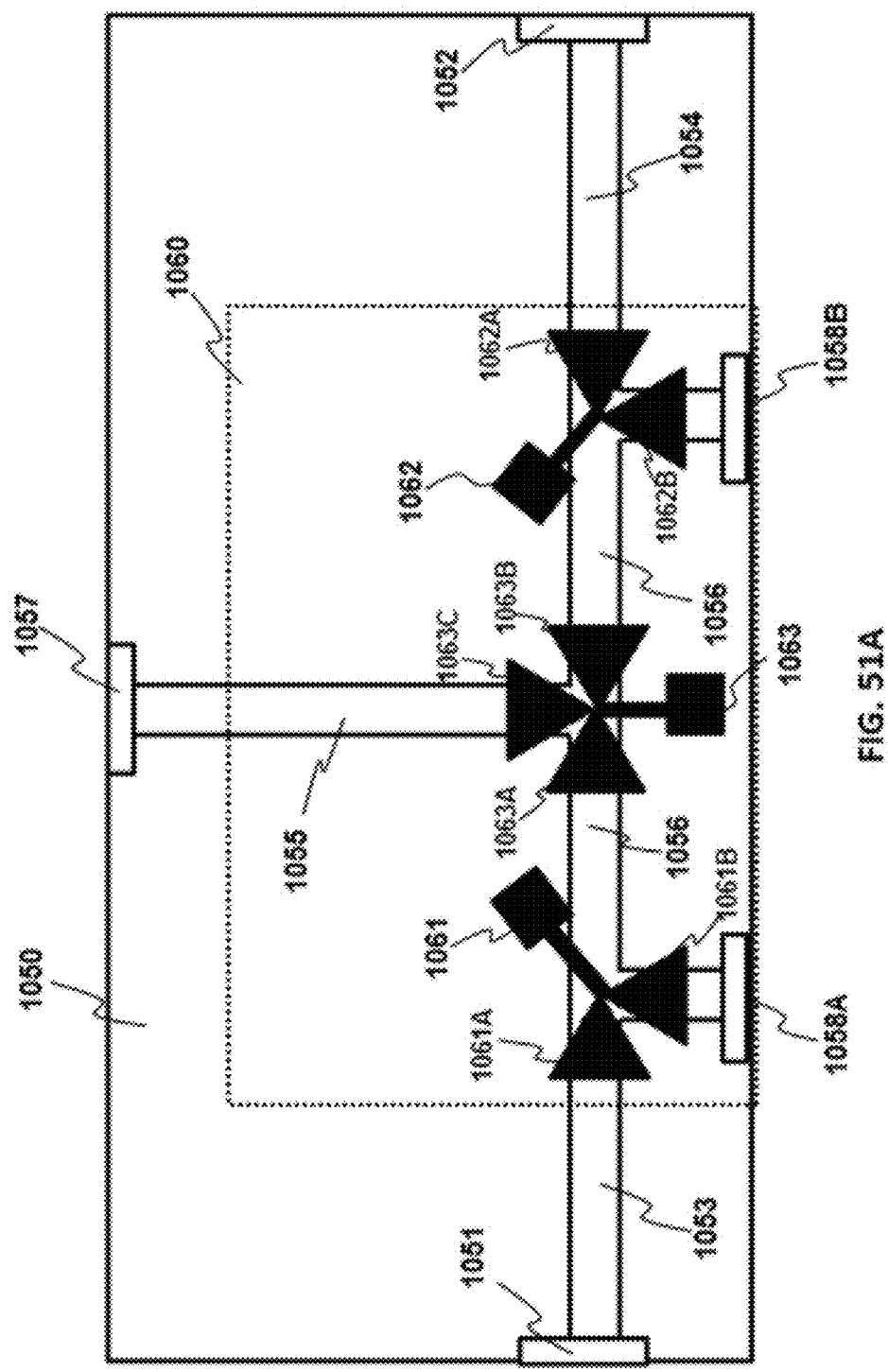

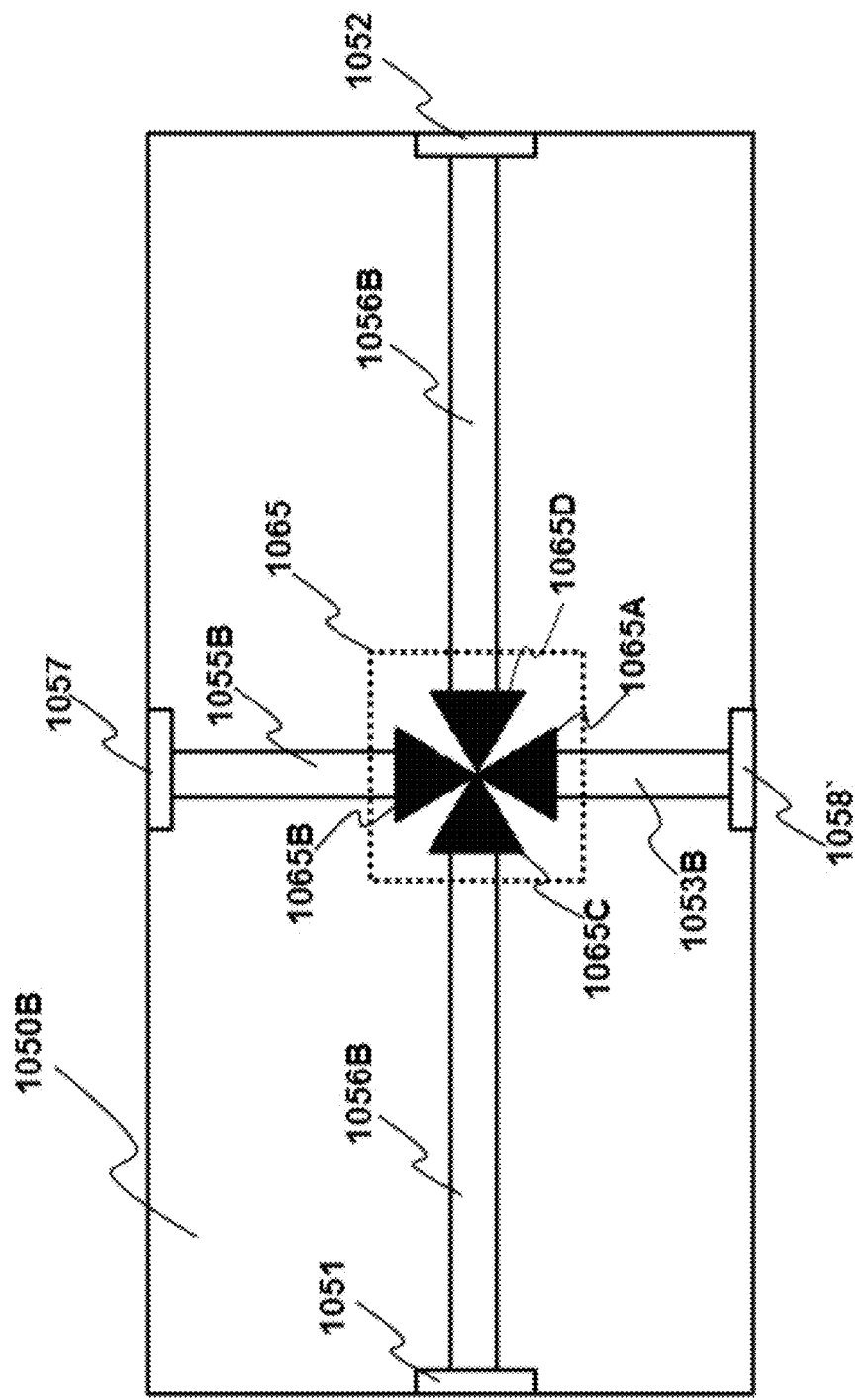

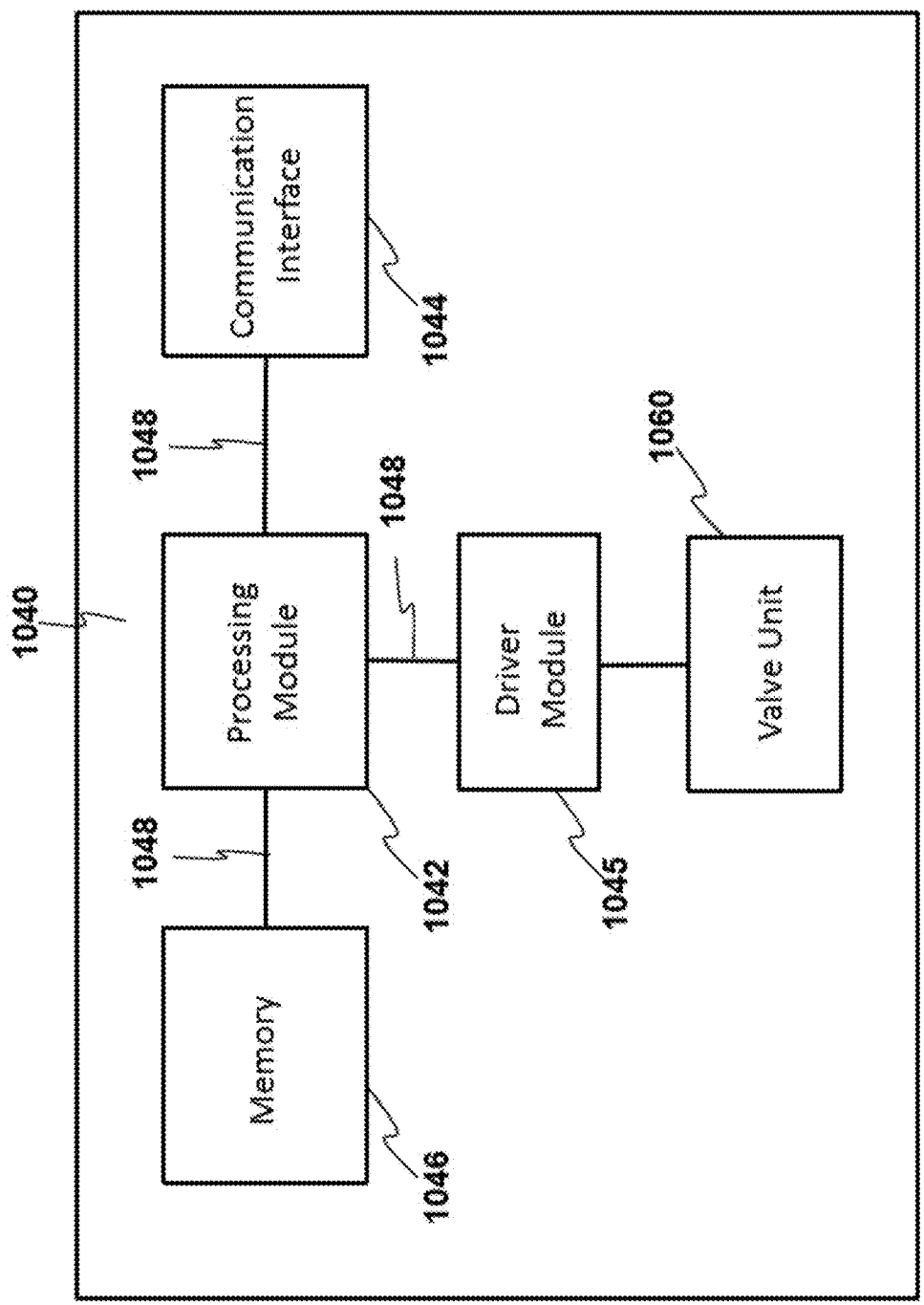

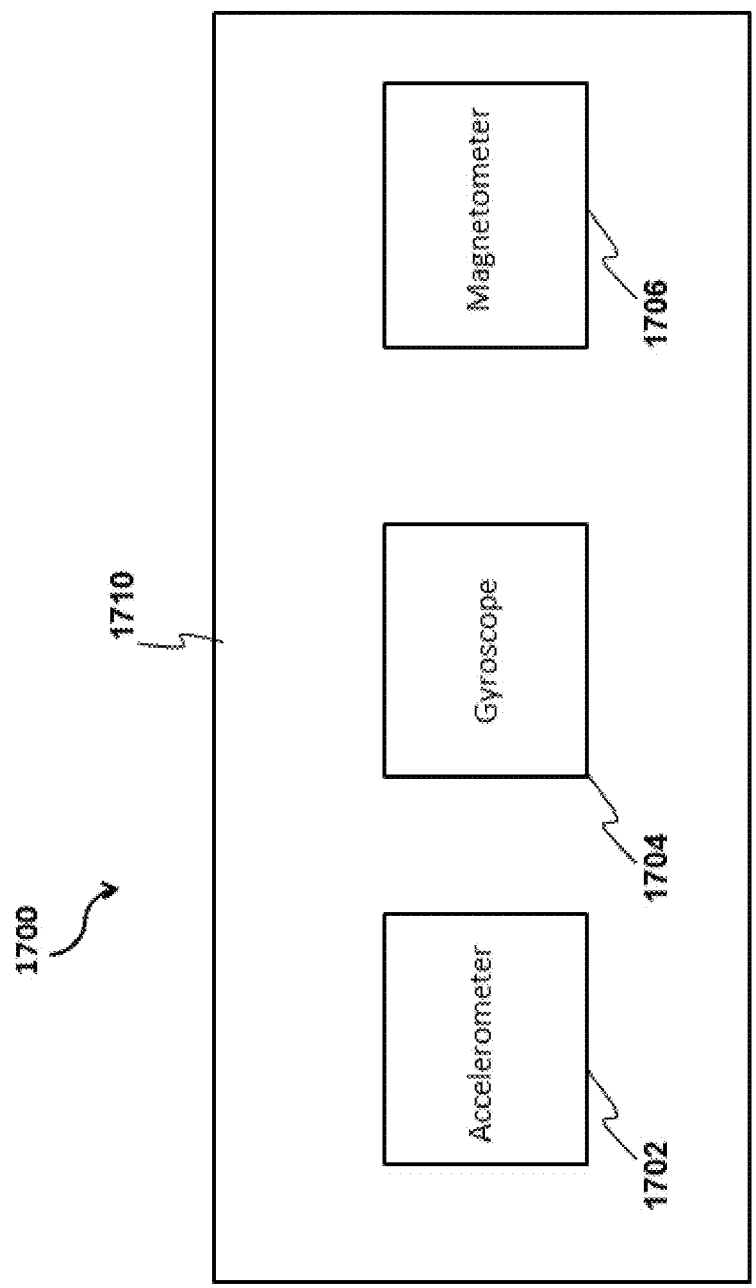

SYMMETRICALLY DYNAMIC EQUALIZED VOLUME AND PRESSURE AIR MANAGEMENT SYSTEM

CROSS REFERENCE TO RELATED APPLICATIONS

This application is a continuation-in-part of U.S. Ser. No. 16/009,760, filed Jun. 15, 2018, which claims the benefit of provisional patent application Ser. No. 62/520,918 filed Jun. 16, 2017, provisional patent application Ser. No. 62/573,587 filed Oct. 17, 2017, and provisional patent application Ser. No. 62/626,373 filed Feb. 5, 2018, the disclosures of which are incorporated herein by reference in their entireties.

FIELD OF THE DISCLOSURE

This disclosure relates to improvements in air management systems for vehicles, trailers, and towables of any type, including load carrying prime mover and trailer vehicles having one or more axles supported by air springs.

BACKGROUND

Air suspension systems for vehicles have a plurality of air suspension bags supporting one or more vehicle axles in pairs on either side of each axle. In one well-known vehicle, the pairs of air springs are connected by a common large diameter air lines extending between correspondingly positioned air springs on adjacent axles. The common air lines are each connected by an air line to a height control valve directed to a respective side of a vehicle. The height control valve controls the air supply to the common air lines to adjust the inflation of the air springs to ensure that the vehicle is kept level as it is driven over variable road conditions. Unless defined otherwise, the term "height control valve" is used as equivalent to the term "leveling valve," such that the terms "height control valve" and "leveling valve" may be used inter-changeably.

For example, when a vehicle negotiates a turn, the vehicle's center of gravity shifts along its width away from the turn. Due to the weight shift, the air springs on the side of the vehicle facing away from the turn start to contract, while the air springs on the side of the vehicle facing the turn start to extend. Consequently, the vehicle becomes unleveled from side-to-side. In response, one of the leveling valves on the lowered side of the vehicle supplies air to the contracted air springs, while the other leveling valve on the elevated side of the vehicle removes air from the extended air springs to keep the vehicle level. Through testing, it has now been found that leveling valves often overcompensate in responding to dynamic weight shifts of the vehicle, in which the air springs that were supplied air from the leveling valve tend to have a greater air pressure than the air springs that were purged by the leveling valve. As a result, a pressure difference persists between the two sides of the air suspensions system ever after the leveling valves attempt to level the vehicle. Even though a pressure differential remains between the air springs on opposite sides of the vehicle, the leveling valves return to a neutral mode (e.g., the rotary disk is set within a dead band range), in which there is a lack of pneumatic communication between the air springs on opposite sides of the vehicle. Due to this pressure differential between the air springs, the vehicle remains unlevel even after the leveling valves have adjusted the pressure of the air springs in response to the vehicle weight shift.

Other types of air suspension systems have replaced mechanical leveling valves with electronic-actuated valves to the control the height of the air bags. While some electronic-actuated valves have been designed to respond to vehicle weight shifts or vehicle rolling, electronic-actuated valves fail to account for pressure differentials between the air springs that persist after the heights of the air springs have been adjusted in response to vehicle weight shifts.

Accordingly, the present inventors have recognized that there is a need for an air management system that solves the problem of persistent pressure imbalance so that the vehicle may be restored to equilibrium air pressure, level and ride height.

SUMMARY

The present invention provides for an enhanced pneumatic suspension system for a vehicle in which the air management system includes a first pneumatic circuit, a second pneumatic circuit, and a cross-flow mechanism pneumatically connecting the first pneumatic circuit with the second pneumatic circuit. The first pneumatic circuit includes a first leveling valve configured to adjust independently the height of a first side of the vehicle. The second pneumatic circuit includes a second leveling valve configured to adjust independently the height of a second side of the vehicle. The first and second leveling valves are configured to establish pneumatic communication between the first and second pneumatic circuits when the first leveling valve is not independently adjusting the height of the first side of the vehicle and the second leveling valve is not independently adjusting the height of the second side of the vehicle. According to the various examples of the air management systems described herein, all air management systems are amenable to modification such that each air management system may be utilized under mechanical or electronic operations (e.g., an actuator for a leveling valve may be switched from a mechanical mechanism to an electronic component).

The first pneumatic circuit includes a first set of air springs disposed on a first side of the vehicle, a first supply tank, a first plurality of air lines pneumatically connecting the first set of air springs with the first leveling valve, and a first supply line pneumatically connecting the first leveling valve with the first supply tank. The second pneumatic circuit includes a second set of air springs disposed on a second side of the vehicle, a second supply tank, a second plurality of air lines pneumatically connecting the second set of air springs with the second leveling valve, and a second supply line pneumatically connecting the second leveling valve with the second supply tank. The cross-flow connections extend from the first leveling valve to the second leveling valve. In another example, the first and second pneumatic circuits may be supplied air by a common air supply tank such that the air management system only includes only one air supply tank to provide air flow to air springs on both sides of the vehicle. In one example, the first plurality of air lines and the second plurality of air lines may be of substantially the same diameter and length, and the first supply line and the second supply line may be of substantially the same diameter and length.

In one configuration, each leveling valve may include a housing and a control arm pivotably connected to the leveling valve, in which the control arm is configured to pivot between a neutral position and one or more response positions in response to compression or extension of the air springs. The first and second leveling valves may be configured to establish pneumatic communication between the first and second pneumatic circuits when the control arm of both the first and second level valves are set in the neutral position. The first and second leveling valves may be configured to prevent pneumatic communication between the first and second pneumatic circuits when the control arm of one of the first and second leveling valves is set to the one or more response positions. The first and second leveling valves may include a control arm sensor configured to detect the position of the control arm. The air management system may include a control unit in electrical communication with each control arm sensor. Each control arm sensor may be configured to transmit the position of the control arm as a control arm position input to the control unit. The control unit may be configured to determine a vehicle height relative to the axle at the first and second sides of the vehicle based on the control arm position input.

In one example, the first and second leveling valves may each be a rotary valve comprising a housing body and a rotary disk configured to rotate within the housing body to alter communication between the first and second pneumatic circuits. Each housing body may comprise a supply port configured to receive air from an air source, an exhaust port configured to exhaust air into an atmosphere, one or more spring ports configured to receive or supply air to one of the first or second pneumatic circuits, and a cross-flow port configured to receive or supply air to one of the first or second leveling valves. In one configuration, the rotary disk may be configured to establish communication between the one or more spring ports and the cross-flow port while neither establishing communication between the one or more spring ports and the supply port nor the one or more spring ports and the exhaust port. In one configuration, the first and second leveling valves may each comprise a control arm pivotably connected to the housing body and configured to rotate about the valve in response to a height change by one of the first or second pneumatic circuits. In one configuration, rotation of the control arm may induce the rotary disk to rotate between a plurality of angular positions to alter communication between the supply port, the exhaust port, the one or more spring ports, and the cross-flow port.

In one example, the first and second leveling valves may each include a manifold housing, a valve element disposed in a bore of the manifold housing, and an electronic actuator. The valve element may be configured to move in the bore of the manifold housing to one or more positions including at least a neutral position to establish pneumatic communication between the first and second pneumatic circuits and a supply position to supply air to a respective pneumatic circuit from an air supply tank, and an exhaust position to remove air from the respective pneumatic circuit to the atmosphere. The electronic actuator is configured to trigger movement of the plunger between the one or more positions. The valve element may be selected from the group consisting of a plunger, a rotary disk, and a poppet. The electronic actuator is, e.g., a solenoid, a servomotor, and a stepper motor.

In one example, the air management system may include a control module in electrical communication with the electronic actuator of each leveling valve. The control module may be configured to transmit a command to each electronic actuator to trigger movement of the valve element between the neutral, supply, and exhaust positions. The air management system may include one or more leveling sensors. Each leveling sensor may be configured to detect a vehicle height relative to the axle along a position of the vehicle and transmit the detected vehicle height to the control module as a vehicle leveling input. The control module may be configured to determine a vehicle height relative to the axle at the first and second sides of the vehicle based on the vehicle leveling input.

In one configuration each leveling valve may include a cylindrical-shaped manifold, a valve member disposed in the manifold and in sliding engagement with an interior surface of the manifold, and an electronic actuator operatively linked to the valve member. The manifold may comprise a plurality of openings disposed along a side surface of the manifold. The electronic actuator may be configured to actuate the valve member to slide along the longitudinal axis of the manifold to control the exposure of the plurality of openings such that a respective leveling valve is configured to selectively: (i) supply air to a respective pneumatic circuit, (ii) remove air from a respective pneumatic circuit, or (iii) establish cross-flow between the first and second pneumatic circuits.

The present invention includes a leveling valve. The leveling valve may comprise an upper housing mounted on a lower housing to form a valve body, in which the valve body defines a chamber extending between the upper housing and the lower housing. The lower housing may include a plurality of ports communicating with the chamber, in which the plurality of ports include a supply port, an exhaust port, one or more spring ports, and a cross-flow port. In one configuration, the lower housing may further comprise a dump port, wherein the cross-flow port is disposed on a first end of the lower housing and the dump port is disposed on a second end of the lower housing opposite to the first end. In one configuration, the supply port may be disposed on a first side of the lower housing, and the exhaust port may be disposed on a second side of the lower housing opposite to the first side of the lower housing. In one configuration, the cross-flow port may be disposed on a first end of the lower housing, and the first end may extend between the first and second sides of the lower housing. In one configuration, the one or more spring ports may comprise a first spring port located on one of the first side or the second side of the lower housing. The leveling valve may include a control arm having a first end attached to a shaft extending through an upper surface of the upper housing, in which the control arm is configured to rotate about the valve body in response to extension or compression of the vehicle suspension. The leveling valve may include a rotary disk positioned in the chamber of the valve body and connected to the control arm by the shaft extending through the upper housing, in which the rotary disk is configured to rotate about the supporting element within the chamber of the valve body. The rotary disk may be configured to establish pneumatic communication between the one or more spring ports and the cross-flow port while neither establishing pneumatic communication between the one or more spring ports and the supply port nor the one or more spring ports and the exhaust port.

The present invention may include a method for controlling stability of a vehicle. The method may comprise the step of providing an air management system comprising a first pneumatic circuit and a second pneumatic circuit. The first pneumatic circuit may include a first leveling valve configured to adjust independently the height of a first side of the vehicle. The second pneumatic circuit may include a second leveling valve configured to adjust independently the height of a second side of the vehicle. The air management system may include a cross-flow line connecting the first leveling valve with the second leveling valve. The method may comprise the step of establishing, by the first and second leveling valves, pneumatic communication between the first and second pneumatic circuits when the first leveling valve is not independently adjusting the height of the first side of the vehicle and the second leveling valve is not independently adjusting the height of the second side of the vehicle.

The present invention may include a method for adjusting air pressure of an air management system of a vehicle comprising one or more air supply tanks, a first pneumatic circuit disposed on a first side of the vehicle, and a second pneumatic circuit disposed on a second side of the vehicle. The method may comprise a step of adjusting independently the air pressure of the first pneumatic circuit by a first leveling valve such that the first leveling valve is either supplying air from the one or more air supply tanks to the first pneumatic circuit or removing air from the first pneumatic circuit to the atmosphere. The method may comprise the step of adjusting independently the air pressure of the second pneumatic circuit by a second leveling valve such that the second leveling valve is either supplying air from the one or more air supply tanks to the second pneumatic circuit or removing air from the second pneumatic circuit to the atmosphere. The method may comprise the step of establishing pneumatic communication between the first pneumatic circuit and the second pneumatic circuit only when both the first leveling valve and the second leveling valve are set in a neutral mode such that each leveling valve is neither supplying air from the one or more air supply tanks nor removing air to the atmosphere.

The present invention may include a control unit associated with an air spring of an air management system for a vehicle. The control unit may comprise a housing configured to be mounted to a top plate of the air spring, wherein the housing comprises a valve chamber. The control unit may comprise a valve disposed in the valve chamber. The valve may be configured to switch between a plurality of modes including: (i) an active mode wherein the valve is adjusting independently a height of the associated air spring, and (ii) a neutral mode wherein the valve is establishing pneumatic communication between the associated air spring and a cross-flow line connected to a second air spring of the air management system when the valve is not in the active mode. The control unit may comprise one or more sensors configured to monitor at least one condition of the air spring and generate a measurement signal indicating the at least one condition of the air spring. The control unit may comprise a communication interface configured to transmit and receive data signals to and from a second control unit associated with the second air spring of the air management system. The control unit may comprise a processing module operatively linked to the valve, the one or more sensors, and the communication interface, wherein the processing module is configured to: (i) receive measurement signals from the one or more sensors and data signals from the communication interface, and (ii) actuate the valve to switch between the active mode and the neutral mode based on the received measurement signals from the one or more sensors and the data signals from the communication interface.

The present invention may include an air management system for a vehicle. The air management system may comprise a first pneumatic circuit having one or more air springs disposed at a first side of a vehicle. The air management system may comprise a second pneumatic circuit having one or more air springs disposed on a second side of a vehicle. The air management system may comprise one or more cross-flow lines, wherein each cross-flow line extends from an air spring associated with the first pneumatic circuit to an air spring associated with the second pneumatic circuit. Each air spring may comprise a control unit. Each control unit may comprise a housing configured to be mounted to a top plate of an associated air spring, wherein the housing comprises a valve chamber. Each control unit may comprise a valve disposed in the valve chamber, wherein the valve is configured to switch between a plurality of modes including: (i) an active mode wherein the valve is adjusting independently a height of the associated air spring, and (ii) a neutral mode wherein the valve is establishing pneumatic communication between the associated air spring and a respective cross-flow line when the valve is not in the active mode. Each control unit may comprise one or more sensors configured to monitor at least one condition of the associated air spring and generate a measurement signal indicating the at least one condition of the associated air spring. Each control unit may comprise a communication interface configured to directly transmit and receive data signals to and from other control units associated with other air springs of the air management system. Each control unit may comprise a processing module operatively linked to the valve, the one or more sensors, and the communication interface, wherein the processing module is configured to: (i) receive measurement signals from the one or more sensors and data signals from the communication interface, and (ii) actuate the valve to switch between the active mode and the neutral mode based on the received measurement signals from the one or more sensors and the data signals from the communication interface.

The present invention may include a method for controlling the stability of a vehicle comprising an air management system, in which the air management system may comprise a first pneumatic circuit having one or more air springs disposed at a first side of a vehicle, a second pneumatic circuit having one or more air springs disposed on a second side of a vehicle, and one or more cross-flow lines, in which each cross-flow line extends from an air spring associated with the first pneumatic circuit to an air spring associated with the second pneumatic circuit. The method may comprise the step of monitoring, by a height sensor and an air pressure sensor, a height and an air pressure of a respective air spring. The method may comprise the step of generating, by the height sensor and the air pressure sensor, a signal indicating the height and the air pressure of the respective air spring. The method may comprise the step of receiving, by a processing module, the signal indicating the height and the air pressure of the respective air spring. The method may comprise the step of calculating, by the processing module, a height differential rate and pressure differential rate of the respective air spring based on the received signal indicating the height of the respective air spring. The method may comprise the step of determining, by the processing module, whether to adjust the height of the air spring independently or establish pneumatic communication between the air spring and a respective cross-flow line. The method may comprise the step of actuating, by the processing module, a valve to switch to one of the modes: (i) an active mode wherein the valve is adjusting independently a height of the associated air spring, and (ii) a neutral mode wherein the valve is establishing pneumatic communication between the associated air spring and a respective cross-flow line when the valve is not in the active mode. In one configuration, the height sensor, processing module, and the valve are disposed in a chamber of the air spring.

The present invention provides for an enhanced pneumatic suspension system for a vehicle in which the air management system includes a supply tank, a system controller integrated with the supply tank, a first pneumatic circuit comprising one or more air springs disposed on a first side of the vehicle and one or more air lines pneumatically connecting the one or more air springs with the system controller, and a second pneumatic circuit comprising one or more air springs disposed on a second side of the vehicle and one or more air lines pneumatically connecting the one or more air springs with the system controller. The system controller is configured to adjust independently air pressure of the one or more air springs of the first pneumatic circuit and adjust independently air pressure of the one or more air springs of the second pneumatic circuit without establishing pneumatic communication between the first and second pneumatic circuits. The system controller is configured to establish pneumatic communication between the first and second pneumatic circuits when the system controller is not adjusting independently the air pressure of the one or more air springs of the first pneumatic circuit and not adjusting independently the air pressure of the one or more air springs of the second pneumatic circuit. In one example, the system may include multiple supply tanks. In one example, the air lines have equal lengths and diameters.

In one configuration, the system controller comprises a housing disposed on an exterior surface of the supply tank, and the housing comprises an internal cross-flow passage pneumatically connecting the first and second pneumatic circuits. In one configuration, the system controller comprises a housing disposed within the supply tank, and the housing comprises an internal cross-flow passage pneumatically connecting the first and second pneumatic circuits. In one configuration, the system controller comprises a first port connected to one of the air lines of the first pneumatic circuit, a second port connected to one of the air lines of the second pneumatic circuit, an exhaust port configured to exhaust air to the atmosphere, and one or more tank ports coupled to the supply tank. In one configuration, the system controller comprises a cross-flow passage pneumatically connecting the first port to the second port.

In one configuration, the system controller comprises a valve unit comprising a plurality of valves configured to selectively supply air from the air tank to at least one of the first and second pneumatic circuits, remove air from at least one of the first and second pneumatic circuits, and establish pneumatic communication between the first and second pneumatic circuits. In one configuration, at least one air spring of the first and second pneumatic circuits comprises a height sensor configured to monitor the height of its associated air spring and transmit a signal indicating the height of its associated air spring. In one configuration, the system controller is configured to receive the signal transmitted from each height sensor and calculate a height differential between the air springs of the first pneumatic circuit and the air springs of the second pneumatic circuit based at least on the received signals from the height sensor. In one configuration, the system controller is configured to adjust independently the air pressure of the first and second pneumatic circuits when the calculated height differential is above a predetermined threshold, and the system controller is configured to establish pneumatic communication between the first and second pneumatic circuits when the calculated height differential is below a predetermined threshold.

In one configuration, at least one air spring of the first and second pneumatic circuits comprises a proportional control sensor configured to monitor the air pressure of its associated air spring and transmit a signal indicating the air pressure of its associated air spring. In one configuration, the system controller is configured to receive the signal transmitted from each proportional control sensor and determine a lag time for air to travel from the system controller to one of the air springs based at least on the received signals from the proportion control sensor.

In one configuration, each air spring comprises an inertial sensor unit comprising an accelerometer, a gyroscope, and a magnetometer. In one configuration, the accelerometer is configured to measure an acceleration with respect to three axes of the vehicle. In one configuration, the gyroscope is configured to measure an angular velocity with respect to three axes of the vehicle. In one configuration, the magnetometer is configured to measure the magnetic force with respect to three axis of the vehicle. In one configuration, the inertial sensor unit is configured to transmit a signal indicating the measured acceleration, the angular velocity, and the magnetic force with respect to the three axes of the vehicle. In one configuration, the system controller is configured to receive the signal transmitted from the inertial sensor unit and calculate at least one of the vehicle yaw, vehicle pitch, and vehicle roll, and the system controller is configured to determine the desired air pressure of each air spring based on at least on one of the calculated vehicle yaw, vehicle pitch, and vehicle roll.

The present invention includes a system controller for an air management system comprising a supply tank, a first pneumatic circuit disposed on a first side of a vehicle, and a second pneumatic circuit disposed on a second side of a vehicle. In one configuration, the system controller comprises a housing integrated with the supply tank, wherein the housing comprises at least one tank port pneumatically connected to the supply tank, a first port pneumatically connected to the first pneumatic circuit, a second port pneumatically connected to the second pneumatic circuit, and an exhaust port pneumatically connected to the atmosphere. In one configuration, the system controller further comprises a set of valves configured to selectively supply air from the air tank to at least one of the first and second pneumatic circuits, remove air from at least one of the first and second pneumatic circuits to the atmosphere, and establish pneumatic communication between the first and second pneumatic circuits. The system controller is configured to adjust independently air pressure of the first pneumatic circuit and adjust independently air pressure of the second pneumatic circuit without establishing pneumatic communication between the first and second pneumatic circuits. The system controller is configured to establish pneumatic communication between the first and second pneumatic circuits when the system controller is not adjusting independently the air pressure of the first pneumatic circuit and not adjusting independently the air pressure of the second pneumatic circuit.

In one configuration, the housing is disposed on an exterior surface of the supply tank. In one configuration, the housing is disposed within the supply tank. In one configuration, the housing comprises a first passage pneumatically connecting the first port with the first tank port, a second passage pneumatically connecting the second port with the second tank port, a cross-flow passage pneumatically connecting the first passage with the second passage, and an exhaust passage pneumatically connecting the exhaust port to the cross-flow passage.

In one configuration, the set of valves is a valve unit comprising: a first valve disposed at an intersection between the first passage and the cross-flow passage, a second valve disposed at an intersection between the second passage and the cross-flow passage, and a third valve disposed at an intersection between the exhaust passage and the cross-flow passage. In one configuration, the first valve and the second valve each comprises two electronically actuated solenoid valves, and the third valve comprises three electronically actuated solenoid valves. In one configuration, the first valve is configured to selectively supply air from the air tank to the first pneumatic circuit, and the second valve is configured to selectively supply air from the air tank to the second pneumatic circuit. In one configuration, the first and third valves are synced such that the first and third valves are configured to selectively exhaust air from the first pneumatic circuit, and the second and third valves are synced such that the second third valves are configured to selectively exhaust air from the second pneumatic circuit. In one configuration, the first, second, and third valves are synced such that the first, second, and third valves are configured to establish pneumatic communication between the first and second ports without supplying air from the air tank to any one of the first and second pneumatic circuits and without exhausting air from any one of the first and second pneumatic circuits to the exhaust port.

In one configuration, at least one tank port comprises a first tank port, and the housing comprises: a supply passage pneumatically connected to the first tank port, an exhaust passage pneumatically connected to the exhaust port, and a flow passage pneumatically connected to the first port, the second port, the supply passage, and the exhaust passage. In one configuration, the set of valves is a four-way valve disposed at an intersection between the supply, exhaust, and flow passages. In one configuration, the four-way valve comprises: a first flow-valve and a second flow-valve connected to the flow passage, a supply valve connected to the supply passage, and an exhaust valve connected to the exhaust passage. In one configuration, the first flow-valve, the second-flow valve, the supply valve, and the exhaust valve are each an electronically actuated solenoid valve. In one configuration, the first flow-valve, the second-flow valve, the supply valve, and the exhaust valve are synced such that the four-way valve is configured to establish pneumatic communication between the first and second ports without supplying air from the air tank to any one of the first and second pneumatic circuits and without exhausting air from any one of the first and second pneumatic circuits to the exhaust port. In one configuration, the first flow-valve, the second-flow valve, the supply valve, and the exhaust valve are synced such that the four-way valve is configured to selectively supply air from the air tank to any one of the first and second pneumatic circuits and remove air from any one of the first and second pneumatic circuits to the exhaust port.

In one configuration, the set of valves is a valve unit comprising a first valve configured to selectively supply air from the first tank port to the first port, a second valve configured to selectively supply air from the second tank port to the second port, an exhaust valve configured to selectively remove air from at least one of the first and second ports to the exhaust port, and a cross-flow valve configured to selectively establish pneumatic communication between the first and second ports. In one configuration, the first valve, the second valve, the exhaust valve, and cross-flow valve are each an electronically actuated solenoid valve.

In one configuration, the set of valves comprise a first leveling valve and a second leveling valve. In one configuration, the first leveling valve is configured to selectively supply air from the first tank port to the first port, selectively remove air from the first port to the exhaust port, and selectively establish pneumatic communication between the first port and the second port. In one configuration, the second leveling valve is configured to selectively supply air from the second tank port to the second port, selectively remove air from the second port to the exhaust port, and selectively establish pneumatic communication between the second port and the first port. In one configuration, the first and second leveling valves are each electronically actuated four-way valves.

The present invention may include a method for adjusting air pressure of an air management system of a vehicle comprising a supply tank, a first pneumatic circuit disposed on a first side of the vehicle, and a second pneumatic circuit disposed on a second side of the vehicle. The method may comprise a step of adjusting independently, by a system controller, the air pressure of the first pneumatic circuit such that the system controller is either supplying air from the supply tank to the first pneumatic circuit or removing air from the first pneumatic circuit to the atmosphere. The method may comprise a step of adjusting independently, by the system controller, the air pressure of the second pneumatic circuit such that the system controller is either supplying air from the supply tank to the second pneumatic circuit or removing air from the second pneumatic circuit to the atmosphere. The method may comprise a step of establishing, by the system controller, pneumatic communication between the first pneumatic circuit and the second pneumatic circuit only when the system controller is neither supplying air from the supply tank nor removing air to the atmosphere. The system controller comprises a housing integrated with the supply tank, and the housing comprises an internal cross-flow passage pneumatically connecting the first and second pneumatic circuits.

According to the various examples of the air management systems described herein, all air management systems include at least two independent pneumatic circuits, in which each independent pneumatic circuit is configured to adjust independently the height of one side of vehicle in response to dynamic vehicle weight shifts. In a state of adjusting independently the height of one side of the vehicle, the respective pneumatic circuit is not in pneumatic communication with the other pneumatic circuit disposed on the opposite of the vehicle such that the air springs on one side of the vehicle are not in pneumatic communication with air springs disposed on the opposite side of the vehicle. According to the various examples of the air management systems described herein, all air management systems may selectively establish cross-flow between the two independent circuits so that the air springs disposed on one side of the vehicle are in pneumatic communication with the air springs disposed on the other side of the vehicle when all the leveling valves are set in a neutral position or neutral mode. In the present context, the leveling valve is set in a neutral position or neutral mode when leveling valve is neither supplying air from the air supply tank to the air springs nor purging air from the air springs to the atmosphere (e.g., the rotary disk is set within a dead band range).

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIGS. 51A, 51B are a schematic view of a manifold housing according to the present disclosure.

FIG. 52 is a schematic view of a system controller according to the present disclosure.

FIG. 55 is a schematic view of an inertial sensor unit according to the present disclosure.

DETAILED DESCRIPTION

Figure 1A:
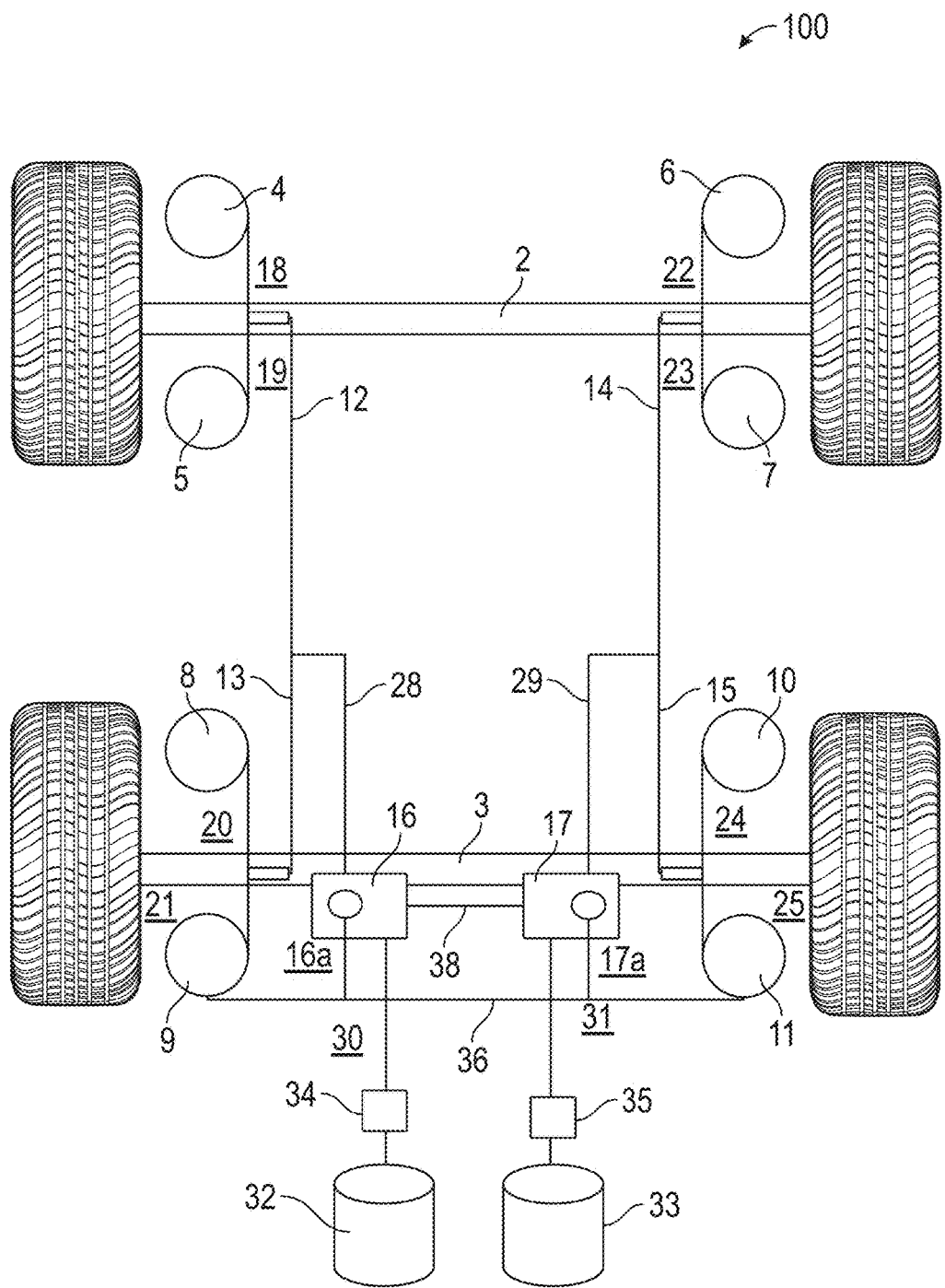
FIG. 1A is a schematic view of an air management system according to one configuration of the present invention.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

The present disclosure includes an air management system for a vehicle having a first pneumatic circuit having a first leveling valve configured to adjust independently the height of a first side of the vehicle, a second pneumatic circuit having a second leveling valve configured to adjust independently the height of a second side of the vehicle, and a cross-flow mechanism connecting the first leveling valve with the second leveling valve. The first and second leveling valves establish pneumatic communication between the first and second pneumatic circuits when the first leveling valve is not independently adjusting the height of the first side of the vehicle and the second leveling valve is not independently adjusting the height of the second side of the vehicle, e.g., when the ride height control arms on both sides of the vehicle are in a neutral position or when an electronic-actuated valve is set in a neutral mode. The first and second leveling valves are configured to be set to the neutral position or neutral mode under all driving conditions including when the vehicle is traveling at a velocity substantially above zero miles-per-hour.

As used herein, the terms "neutral position" and "neutral mode" are defined as the state in which neither leveling valve is supplying air from the air supply tank to the air springs or removing air from the air springs to the atmosphere, and each of the leveling valves are in pneumatic communication with each other.

As used herein, the term "active mode" is defined as the state in which the valve is independently adjusting the height or air pressure of one or more air springs in one pneumatic circuit while the valve is not in pneumatic communication with any components of another pneumatic circuit.

As used herein, a "cross-flow mechanism" or "cross-flow system" includes any components necessary to establish pneumatic communication between a first pneumatic circuit and a second pneumatic circuit, wherein the first and second pneumatic circuits are provided on opposite sides of a vehicle, i.e., left and right sides. The cross-flow mechanism or cross-flow system may include a cross-flow air line connecting a first leveling valve and a second leveling valve connected to a cross-flow port on each leveling valve, in which the cross-flow air line is not directly connected to a supply tank or a supply line connected to the supply tank. The cross-flow mechanism or cross-flow system may also include a cross-flow controller device connected to each of the first leveling valve and the second leveling valve. The cross-flow mechanism or cross-flow system may also include electrical sensors, e.g., air pressure sensors, air flow sensors, ride height sensors, stability control sensors.

As used herein, the "response position" is defined as the state in which one or more leveling valves on each side of the vehicle are adjusting the air pressure of air springs independently in the pneumatic circuits.

As used herein, "dead band" refers to range of rotation in which a disk surface of a rotary disk completely overlies the reservoir cavity of the lower housing such that the leveling valve is neither supplying air from the air supply tank to the air springs nor removing air from the air springs to the atmosphere.

In one example, each leveling valve includes a housing, a valve element disposed in a bore of the housing, and a control arm pivotably connected to the housing such that it pivots from a neutral position to one or more response positions to induce rotation or movement of the valve element. In another example, each leveling valve includes a housing and a ride height sensor electrically connected thereto instead of a control arm. In another example, each leveling valve includes a housing, a valve element disposed in a bore of the housing, a control arm pivotably connected to the housing to induce movement or rotation of the valve element, and a sensor disposed in the housing to detect movement of the control arm. In another example, each leveling valve may include a housing, a valve element, and a motor (e.g., stepper motor) to induce rotation or movement of the valve element. The valve element may be selected from the group consisting of a plunger, a rotary disk, and a poppet.

In one example, the first and second leveling valves establish pneumatic communication between the first and second pneumatic circuits when the control arm of both the first and second level valves are set in the neutral position, and the first and second leveling valves are configured to prevent pneumatic communication between the first and second pneumatic circuits when the control arm of one of the first and second leveling valves is set to the one or more response positions.

In one example, the first pneumatic circuit includes a first set of air springs disposed on a first side of the vehicle, a first supply tank, a first plurality of air lines pneumatically connecting the first set of air springs with the first leveling valve, and a first supply line pneumatically connecting the first leveling valve with the first supply tank; and the second pneumatic circuit includes a second set of air springs disposed on a second side of the vehicle, a second supply tank, a second plurality of air lines pneumatically connecting the second set of air springs with the second leveling valve, and a second supply line pneumatically connecting the second leveling valve with the second supply tank. In another example, the first and second pneumatic circuits may be supplied air by a common air supply tank such that the air management system only includes only one air supply tank to provide air flow to air springs on both sides of the vehicle.

In one example, the air lines are provided to supply equal volumes of air to maintain symmetry within the pneumatic circuits on both sides of the vehicle. The air lines are of substantially the same (e.g., within ±10% or ±5% or ±2% or ±1%) or equal diameter and/or length. The supply lines are of substantially the same (e.g., within ±10% or ±5% or ±2% or ±1%) or equal diameter and/or length.

Figure 1B:
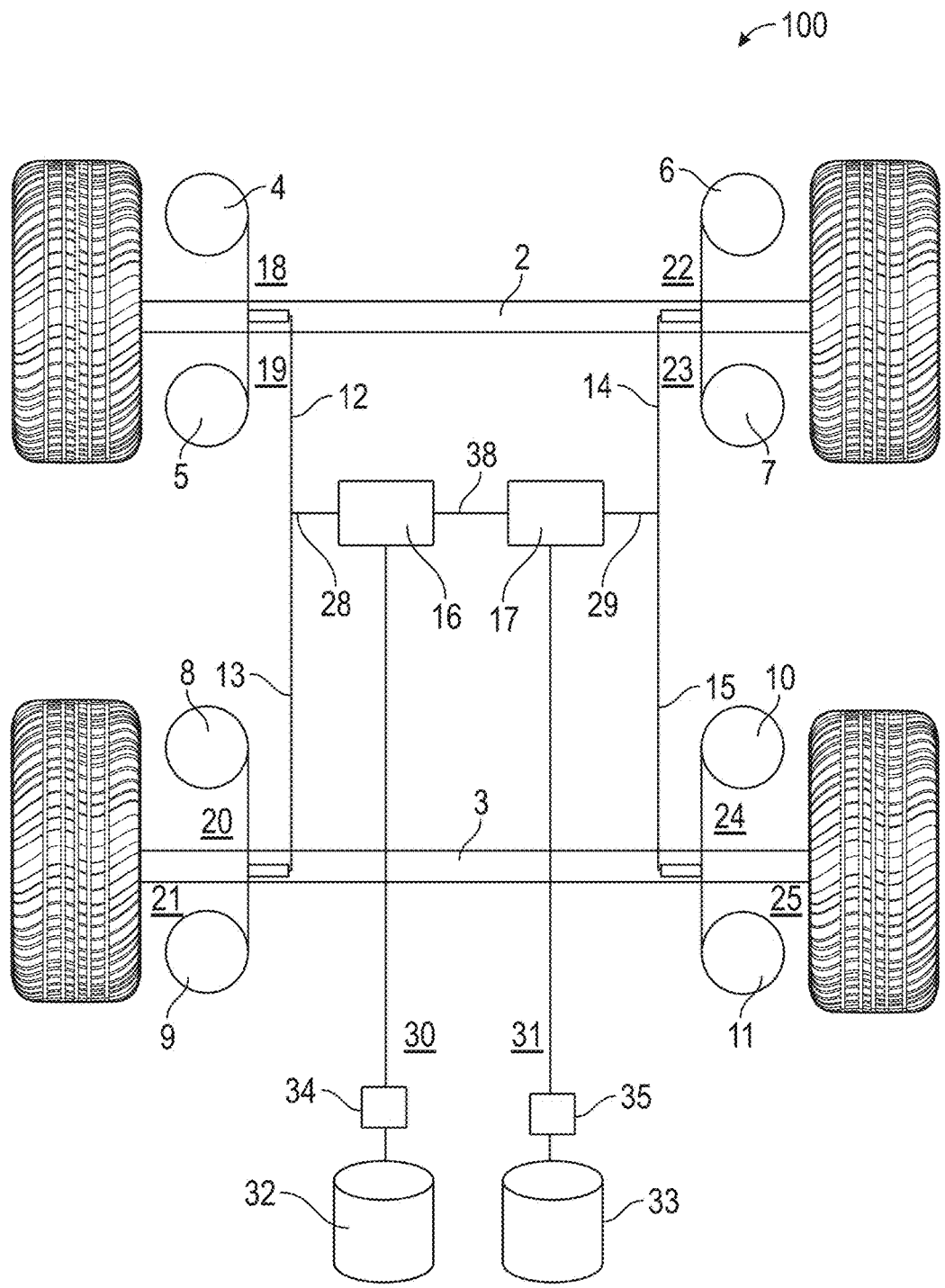
FIG. 1B is a schematic view of an air management system comprising leveling valves disposed at a central portion of a vehicle according to one configuration of the present invention.
Figure 1C:
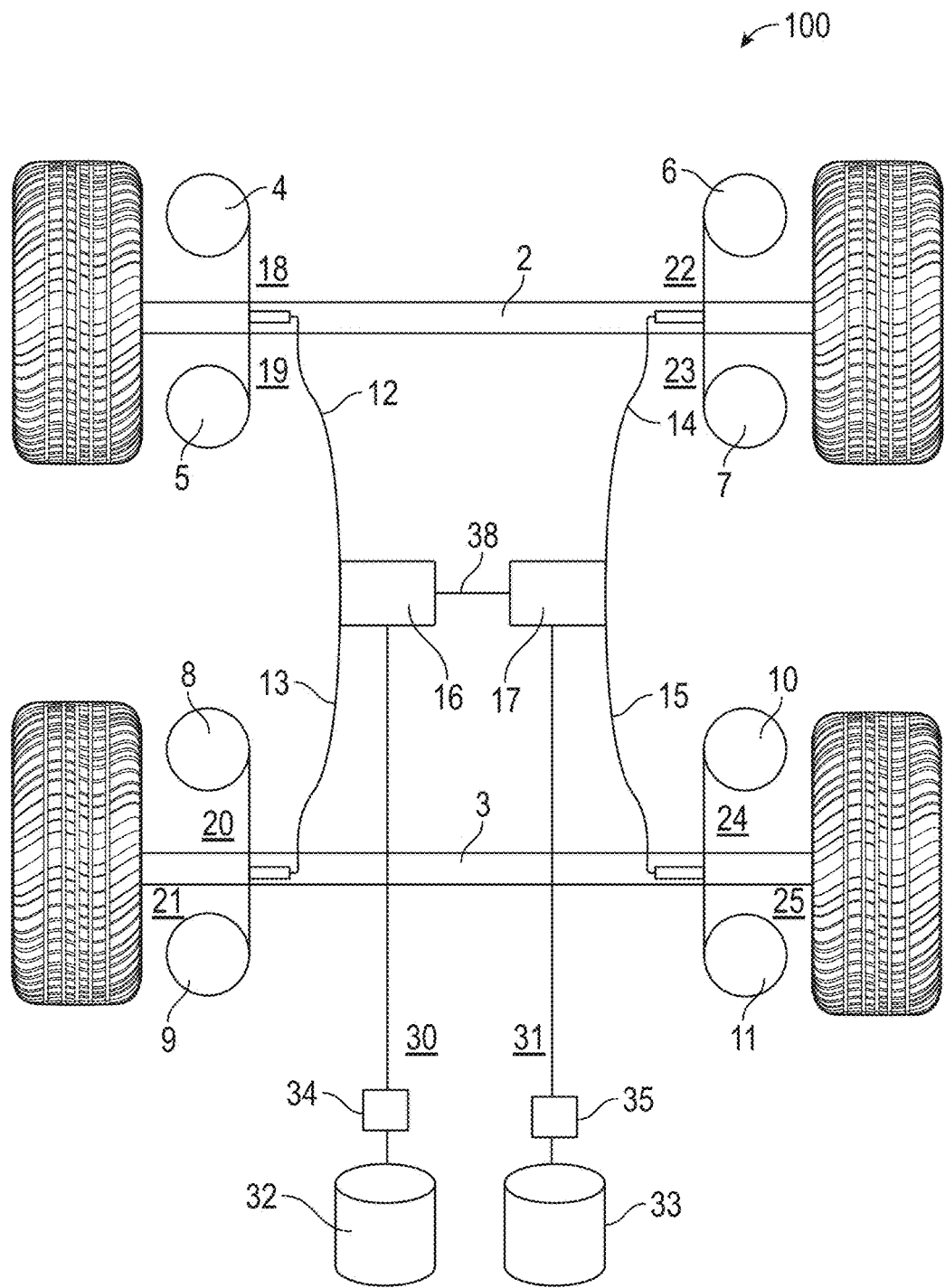
FIG. 1C is a schematic view of an air management system comprising leveling valves, in which each leveling valve has a plurality of air bag ports, according to one configuration of the present invention.

FIGS. 1A-C show configurations of air management systems for a vehicle as disclosed herein, indicated by reference number 100. The air management assembly 100 includes a first pneumatic circuit disposed on a first side of a vehicle 1, a second pneumatic circuit disposed on a second side of the vehicle 1, and a cross-flow line 38 pneumatically connecting the first and second pneumatic circuits. The vehicle 1 can have front and rear driven and/or non-driven wheeled axles 2 and 3, which are supported in a known manner on the chassis 1 by pairs of air bags (also referred to interchangeably as air springs) 4 and 5, 6 and 7, 8 and 9 and 10 and 11, positioned as illustrated on either side of the axles 2 and 3. The present invention is not limited to having the particular number of axle(s), air bags (air springs), air lines/hoses, air supply tank(s) that are shown in the drawings, as these elements vary depending on the type of vehicle that is used as would be immediately clear to a person skilled in the art. In another example, the first and second pneumatic circuits may be supplied air by a common air supply tank such that the air management system 100 only includes only one air supply tank to provide air flow to air springs 4-11 on both sides of the vehicle 1.

In FIGS. 1A-C, air springs 4, 5, 8, and 9 are positioned on the first side of the vehicle 1 and connected together by separate air lines 12, 13, and 18-21 to form a first set of air springs. Air springs 4, 5, 8 and 9 and separate air lines 12, 13, and 18-21 are supplied air by a valve hose 28, which is connected to a first leveling valve 16. A supply hose 30 extends directly from the first leveling valve 16 to a first supply tank 32 for supplying air to the first leveling valve 16. The supply hose 30 is also provided with a pressure protection valve 34. Accordingly, air springs 4, 5, 8, and 9, separate air lines 12, 13, and 18-21, valve hose 28, first leveling valve 16, supply hose 30, pressure protection valve 34 (not required in some vehicles or air management systems), and the first supply tank 32 form the first pneumatic circuit adapted for adjusting independently the height of the first side of the vehicle 1.

In some embodiments (not shown), the air management assembly 100 may comprise a single air supply tank to deliver air simultaneously to both the first and second pneumatic circuits and a single pressure protection valve connected to the air supply tank by a single hose and connected to the first and second pneumatic circuits through two supply hoses. The single pressure protection valve is configured to supply sufficient air pressure to both the first and second pneumatic circuits in the event of a leak or failure within the air management system 100. The single pressure protection valve is configured to have a larger air capacity to the dual pressure protection valves 34 in order to provide sufficient air to both the first and second pneumatic circuits simultaneously.

Air springs 6, 7, 10, and 11 are positioned on a second side of the vehicle 1 and connected together by separate air lines 14, 15, and 22-25 to form a second set of air springs. Air springs 6, 7, 10, and 11 and separate air lines 14, 15, and 22-25 are supplied air by a valve hose 29, which is connected to a second level valve 17. A supply hose 31 extends directly from the second leveling valve 17 to a second supply tank 33 for supplying air to the second leveling valve 17. The supply hose 31 is also provided with a pressure protection valve 35. Accordingly, air springs 6, 7, 10, 11, separate air lines 14, 15, and 22-25, valve hose 29, second leveling valve 17, supply hose 31, the pressure protection valve 35, and the second supply tank 33 form the second pneumatic circuit adapted for adjusting independently the height of the second side of the vehicle 1. Both the first pneumatic circuit and the second pneumatic circuit are independently operable so that the first leveling valve 16 independently delivers air to or purges air from the first side of the vehicle 1 and the second leveling valve 17 independently delivers air to or purges air from the second side of vehicle 1.

To ensure a balanced supply air of substantially the same volume and pressure to each air spring, the separate air lines 12, 13, and 18-21 on the first side of the vehicle 1 and the separate air lines 14, 15, and 22-25 on the second side of the vehicle 1 are of substantially the same size (internal diameter) and length. In the illustrated configuration, the separate air lines 18-21 and 22-25 each have a bore diameter of about 12 mm (½ inch). Other sizes may be used with similar results provided the size and length of the air lines in each set or group (e.g. 18 to 25, 28 and 29, 30 and 30 31 etc.) are the same. For similar reasons, the valve hoses 28 and 29 are of substantially the same size or internal diameter and length, and the supply hoses 30 and 31 are of substantially the same size or internal diameter and length. The provision of the separate air lines 18-21 and 21-25 and the connection of these lines to the separately supplied leveling valves 16 and 17 ensure that an equal volume of air is rapidly supplied to each of the air springs so that the internal pressure of the air springs respond appropriately to changes in road conditions relayed to the valves 16 and 17. Thus, the rate of change for the internal pressure of the first set of air springs is substantially symmetrical to the rate of change for the internal pressure of the second set of air springs.

The first control valve 16 and the second control valve 17 each include control arms 16a, 17a linked to a rigid bar 36 mounted underneath the air springs 9 and 11. The control arms 16a, 17a are each configured to move up and down in response to compression and extension of the air springs, which actuates the first and second control valves 16, 17 to either supply or purge air to and from the air springs. Both the first and second leveling valves 16, 17 neither supply air from the supply tank to the air springs nor remove air from the air springs to the atmosphere when the control arms 16a, 17a are in a neutral position. A cross-flow line 38 extends from the first leveling valve 16 to the second leveling valve 17 to connect the first and second leveling valves. As shown in FIG. 1A, the cross-flow line 38 is not directly connected supply lines 30, 31 or the air supply tanks 32, 33. When the control arms 16a, 17a are both in the neutral position, the first and second leveling valves 16, 17 are in pneumatic communication with each other such that there is pneumatic communication between the first and second pneumatic circuits via the cross-flow line 38 to equalize air pressure between air springs 4, 5, 8, and 9 on the first side of the vehicle 1 and air springs 6, 7, 10, 11 on the second side of the vehicle. As a result, the first and second pneumatic circuits are linked together as a common circuit when the control arms 16a, 17a are both in the neutral position. By maintaining equal air pressure between the first and second sets of air springs, the first and second leveling valves 16, 17 equilibrate the pressure between the two sides of the vehicle when both control arms 16a, 17a are in the neutral position. In the illustrated embodiment, only a single cross-flow line 38 is needed to establish pneumatic communication between the first and second pneumatic circuits such that air flows between the left and right sides of the vehicle.

The first and second leveling valves 16, 17 only permit pneumatic communication with each other via the cross-flow line 38 when the control arms 16a, 17a are both in the neutral position. In other words, the first and second leveling valves 16a, 17a prevent pneumatic communication between the first and second pneumatic circuits when either one of the control arms 16a, 17a is not in the neutral position. By not establishing communication between the first and second pneumatic circuits when either one of the control arms 16a, 17a are moving up and down from the neutral position, the first and second leveling valves 16, 17 are able to purge air from or supply air to the air springs independently. Accordingly, when the vehicle 1 is negotiating a sharp turn that shifts the vehicle's center of gravity, one of the first and second leveling valves 16, 17 supplies air to the set of air springs that have been contracted from the weight shift of the vehicle 1, while the other one of the first and second leveling valves 16, 17 purges air from the other set of air springs that have been extended from the weight shift of the vehicle without any cross-flow between the first 16 and second 17 leveling valves. In this state, the first and second leveling valves 16, 17 may overcompensate for the dynamic weight shift of the vehicle by either supplying too much air to one set of air springs or removing too much air from the other set of air springs, resulting in a slight pressure difference between the first and second sets of air springs. This slight pressure difference between the first and second sets of air springs may not trigger either control arm 16a, 17a to pivot away from the neutral position as the vehicle 1 pulls away from the turn, which would keep the vehicle 1 in an unlevel state if not for the mechanism described in the present disclosure. According to the present disclosure, because the first and second leveling valves 16, 17 communicate with each other when both control arms 16a, 17a are in the neutral position via cross-flow 38, the slight pressure difference between first and second sets of air springs is eliminated as air passes via the cross-flow line 38 from the set of air springs at higher pressure to the set of air springs at lower pressure, thereby reaching an equilibrium state.

Figure 2:
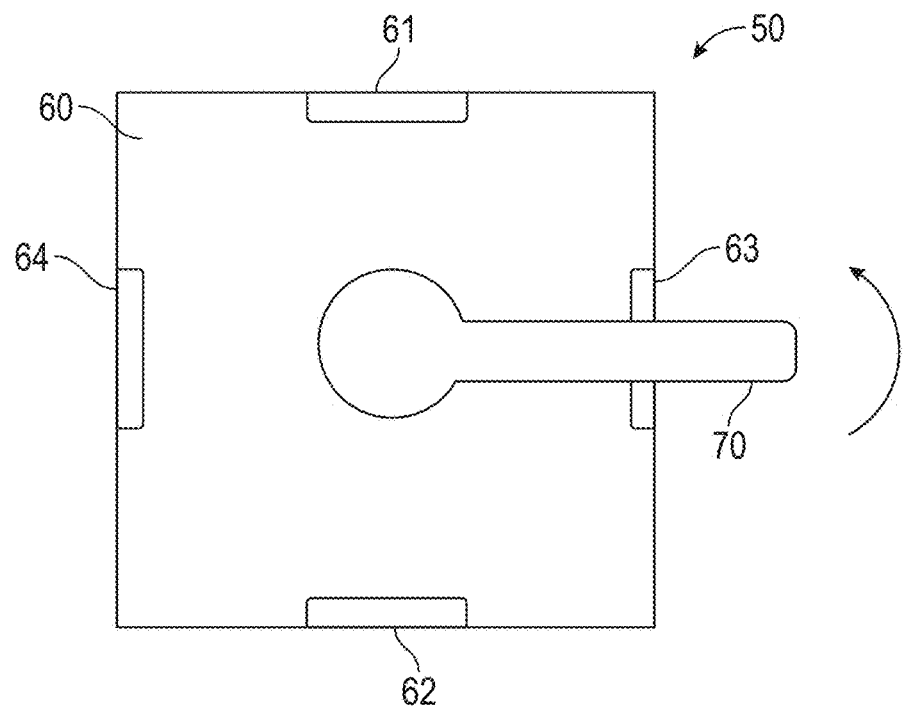
FIG. 2 is a top view of a leveling valve according to one configuration of the present invention.

FIG. 2 schematically illustrates a leveling valve 50 according to one configuration of the present invention. The leveling valve 50 includes a housing 60 and a control arm 70. The housing 60 includes a supply port 61 connected to the supply tank, an exhaust port 62 connected to the atmosphere, an air spring port 63 connected to the air springs on one respective side of the vehicle, and a cross-flow port 64 connected to a second leveling valve on another side of the vehicle. While FIG. 2 illustrates the housing 60 having one air spring port, the housing 60 may include two or more air spring ports to communicate with multiple sets of air springs disposed on a respective side of the vehicle. Further, the relative positioning of the ports with respect to each other and with respect to the control arm may be varied and is not intended to be limited to the configuration illustrated in FIG. 2.

As shown in FIG. 2, the control arm 70 is connected to the housing 60 and pivots about the housing 60 between a plurality of positions in response to compression and extension of the air springs disposed on one side of the vehicle. When the air springs compress, the control arm 70 pivots upward from a horizontal position to a first position, which establishes communication between the supply port 61 and the air spring port 63 of the housing. Consequently, air is supplied from the supply tank to the respective air springs, thereby increasing the air pressure of the air springs. When the respective air springs extend, the control arm 70 pivots downward from a horizontal position to a second position, which establishes communication between the exhaust port 62 and the air spring port 63 of the housing 60. Accordingly, air is removed from the air springs and released to the atmosphere, thereby decreasing the air pressure of the air springs. When the control arm 70 pivots away from the neutral position in either direction, the air spring port 63 does not communicate with the cross-flow port 64. At the neutral position, the control arm 70 is substantially oriented in a horizontal position such that the control arm 70 extends parallel to the ground surface. When the control arm 70 is set in the neutral position, the air spring port 63 communicates neither with the supply port 61 nor the exhaust port 62. The air spring port 63, instead, communicates with the cross-flow port 64 when the control arm 70 is set in the neutral position so that the leveling valve 50 may communicate with another leveling valve disposed on an opposite side of the vehicle (as shown in FIG. 1A-C).

According to one exemplary configuration, the leveling valve may include a rotary member (not shown), such as a disk, received in a central bore (not shown) of the housing, in which the central bore is pneumatically connected to each port of the housing. The rotary member is rotatably connected to the control arm so that pivoting movement of the control arm induces rotation of the rotary member. The rotary member may rotate between a plurality of positions to alter communication between the ports of the housing. Each leveling valve is a symmetrically dynamic equalized volume and pressure distributing valve having at least one rotary member (not shown) having different sized grooves or through holes so as to deliver or purge air to the air springs when actuated in a response position, or to cut off air flow to the purge and supply ports when actuated in a neutral position and to open pneumatic communication at the cross-flow port in the neutral position. Accordingly, if a leveling valve on one side of the vehicle is in a neutral position, but the leveling valve on the opposite side of the vehicle is not in a neutral position, then there is no pneumatic communication between the two leveling valves. Only once both leveling valves are actuated to the neutral position is pneumatic communication between the pneumatic circuits on the opposite sides of the vehicle established.

Establishing cross-flow when neither leveling valve is independently adjusting the height of a respective side of vehicle mitigates the imbalanced pressure differentials between the air springs on each side of the vehicle. It has been discovered that one factor contributing to these pressure differentials is gravity. For example, when a vehicle is negotiating a turn and experiences a dynamic lateral weight shift, one of the leveling valves responds by supplying air to the compressed air springs, whereas the other one of the leveling valves removes air from the extended air springs. However, the leveling valve that supplies air in response to the lateral weight shift tends to supply air with much greater force to overcome the force of gravity acting against the compressed air springs. As a result, the leveling valve often supplies more air to its set of air springs than the volume of air removed from the other set of air springs on the opposite of the vehicle. Although a pressure differential remains between the air springs on opposite sides of the vehicle, the control arms return to a horizontal, neutral position, in which the supply and purge ports of each leveling valve are closed (e.g., within dead band position), thereby not accounting for the overcompensated air supplied to one of the sets of air springs.

The air management system of the present invention provides the unexpected advantage of mitigating the pressure differential between the air springs on each side of the vehicle by linking at least two independent pneumatic circuits to form one common pneumatic circuit when both leveling valves are in a neutral mode. In the present context, a leveling valve is in a "neutral mode" when the leveling valve is neither supplying air from an air supply tank nor purging air to the atmosphere. Accordingly, the air management system of the present invention may adjust each side of the vehicle independently by preventing communication between the first and second pneumatic circuits when at least one of the leveling valves is not in a neutral mode. The air management system of the present invention may also link the first and second pneumatic circuits into one common circuit by establishing cross-flow communication between the first and second pneumatic circuits only when both leveling valves are in a neutral mode. Establishing cross-flow between the air springs on each side of the vehicle allows the overcompensated air springs having greater pressure to release air to the air springs on the other side of the vehicle via the cross-flow line, thereby promoting equilibrium between air springs on both sides of the vehicle. Ultimately, the ability to selectively provide cross-flow when all the leveling valves are set in a neutral mode allows the air management system to maintain a highly stable, safer and more comfortable vehicle ride with better traction.

Figure 3:
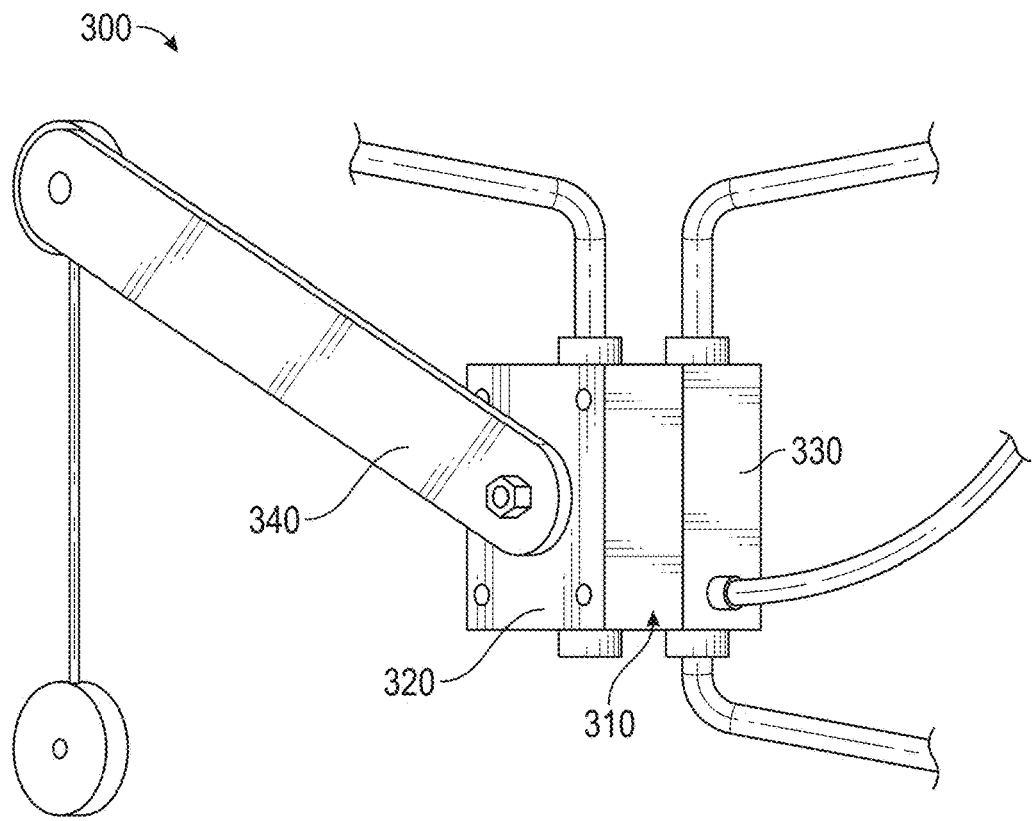
FIG. 3 is a perspective of a leveling valve according to one configuration of the present invention.
Figure 4:
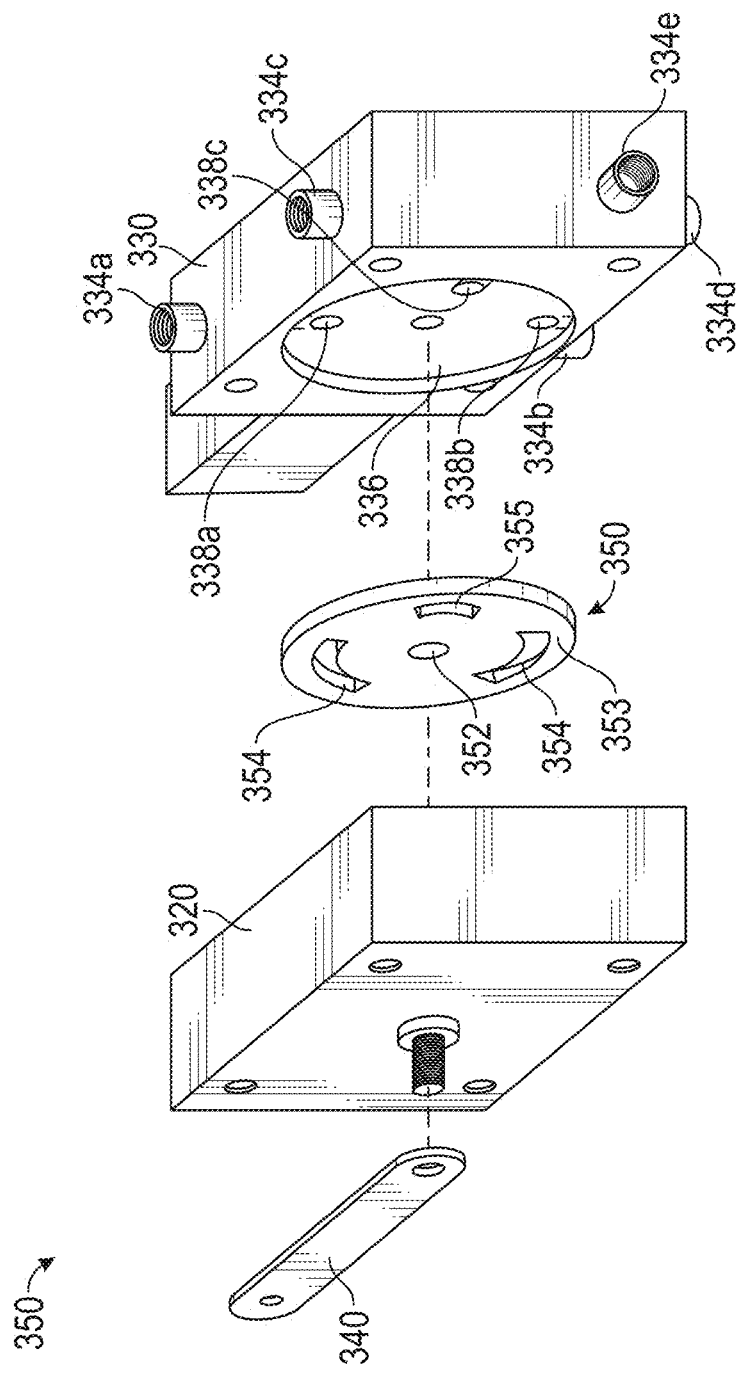
FIG. 4 is an exploded view of a leveling valve according to one embodiment of the present invention.

FIGS. 3 and 4 show different views of a mechanical-actuated valve according to one configuration of the present invention. The leveling valve 300 shown in FIGS. 3 and 4 includes a valve body 310 comprising an upper housing 320 mounted to a lower housing 330, wherein a control arm 340 is attached to a shaft extending through the upper housing 320. The upper housing 320 is mounted to the lower housing 330 by fasteners (not shown) that are received in mounting holes that extend through corners of the upper housing 320 and the lower housing 330.

Figure 5:
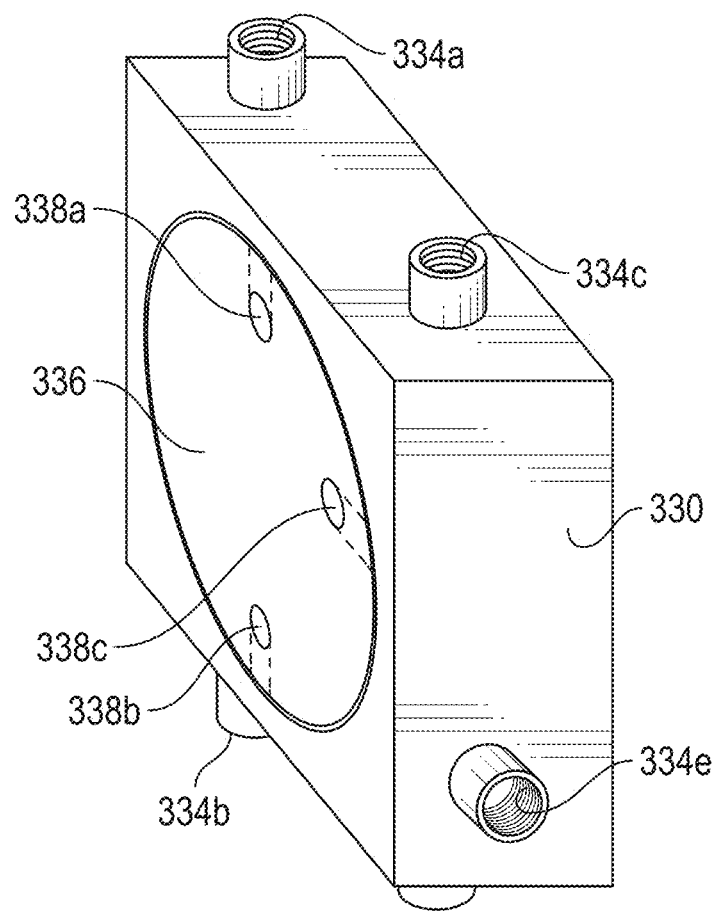
FIG. 5 is a perspective of a lower housing according to an embodiment of the present invention.

Referring to FIGS. 4 and 5, the lower housing 330 comprises at least five ports 334a-e, including a supply port 334a, which connects to an air tank (not shown), an exhaust port 334b for purging air from the air springs (not shown), a first port 334c that connects to a first set of air springs (not shown), a second port 334d that connects to a second set of air springs (not shown), and a cross-flow port 334e that connects to another leveling valve (not shown). The first and second ports 334c and 334d are arranged so that first spring port 334c on one side of the lower housing 330 coincides with a second spring port 334d on the other side of the lower housing 330. The ports 334a-d are further arranged so that supply port 334a on one side of the lower housing 330 coincides with the exhaust port 334b on an opposite side of lower housing 330.

The lower housing 330 includes separate airflow passages (not shown) to each port 334a-e of the lower housing 330, so that air supplied from the supply port 334a or air purged to the exhaust port 334b occurs independently from air flowing through the cross-flow port 334e. Referring to FIG. 5, the lower housing 330 includes a first surface 336 defining a plurality of circular-shaped cavities 338a-c. The supply port 334a is linked to a supply cavity 338a by one airflow passage formed in the lower housing 330, and the exhaust port 334b is linked to an exhaust cavity 338b by a second airflow passage formed in the lower housing 330. The cross-flow port 334e is linked to a cross-flow cavity 338c by a third air flow passage formed in the lower housing 330. The first and second spring ports 334c, 334d may be linked by a reservoir cavity (not shown) formed in the lowered housing 330.

FIGS. 4 and 6A-C show a rotary disk 350 according to one configuration of the present invention. Referring to FIG. 4, the rotary disk 350 is received in a central bore defined between the lower and upper housing. The rotary disk 350 includes a central aperture 352 configured to rotatably receive a post (not shown), which extends from the lower housing 330 and through the upper housing 320 to connect to the control arm. The rotary disk 350 is configured to rotate about the post (not shown) within a central bore of the lower housing 330, thereby defining the central aperture 352 as a pivot point. The rotary disk 350 includes two oblong-shaped slots 354 spaced around the central aperture 352 with disk surface 353 defined therebetween and along the periphery of the rotary disk 350. The disk surface 353 corresponds to regions of the rotary disk 350 that only includes the solid surface of the rotary disk 350, not any void spaces defined by the slots. Accordingly, when the disk surface 353 of the rotary disk 350 completely overlaps a respective cavity, air flow is restricted from entering through the respective cavity. The rotary disk 350 further includes a cross-flow slot 355, which is smaller than both the oblong-shaped slots 354.

Figure 6A:
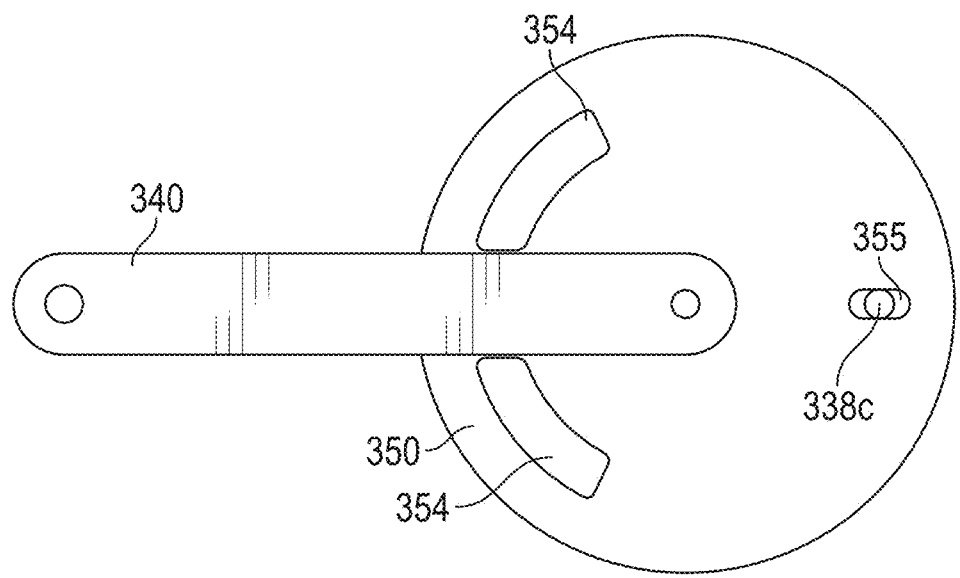
FIGS. 6A-6C are schematic views of a rotary disk according to an embodiment of the present invention.
Figure 6B:
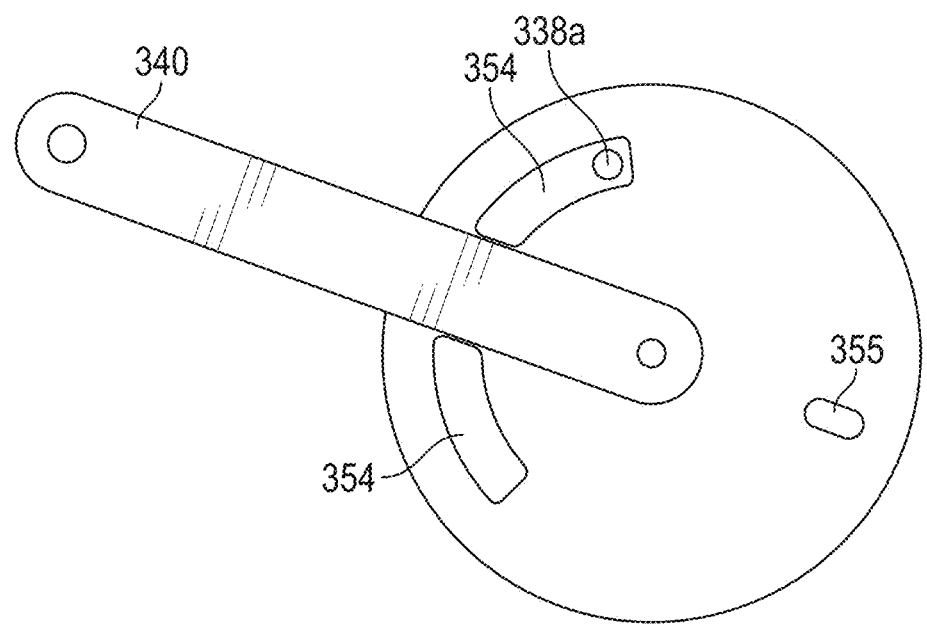
Figure 6C:
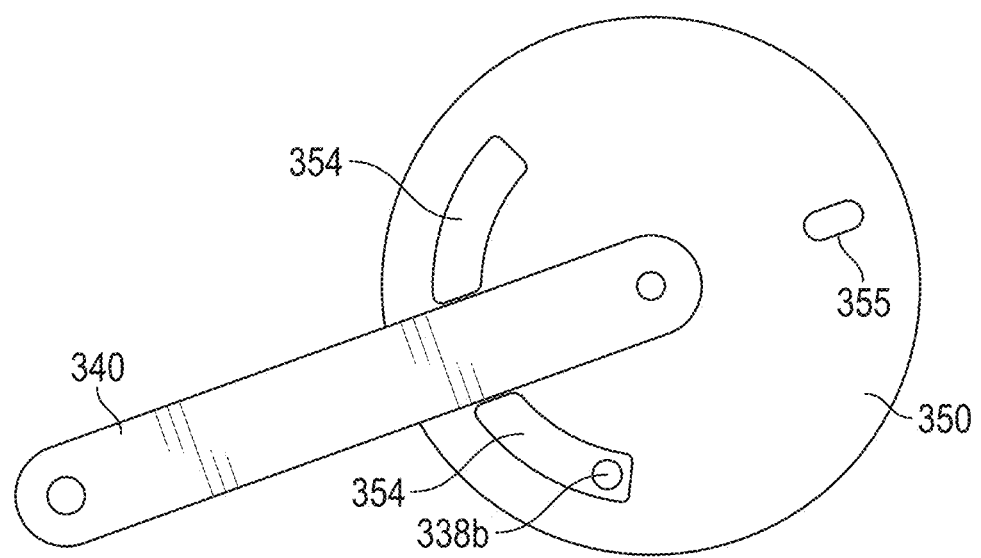

The angular position of the rotary disk 350 changes as the control arm 340 pivots about the valve body 310 of the valve 300. As shown in FIG. 6A, when the control arm 340 is set to a horizontal position, the rotary disk 350 is set to a neutral position, in which the disk surface 353 of the rotary disk 350 overlies both the supply cavity 338a and the exhaust cavity 338b of the lower housing 330. Thus, at the neutral position, the rotary disk 350 is set within the dead band range of rotation. Consequently, when the rotary disk 350 is set at the neutral position, the air springs are connected to neither the supply port 334a nor the exhaust port 334b. However, the cross-flow slot 355 overlies the cross-flow cavity so that the first and second springs are in communication with the cross-flow port 334e. As shown in FIG. 6B, due to clockwise rotation of the control arm 340, the rotary disk 350 rotates to an angular position in which the arrangement of slots 354, 355 connects the supply cavity 338a with the reservoir cavity (not shown) so that the air springs receive air from the supply tank, thereby increasing the air pressure of the air springs. As shown in FIG. 6C, due to counterclockwise rotation of the control arm 340, the rotary disk 350 rotates to an angular position in which the arrangement of slots 354, 355 connects the exhaust cavity 338b with the reservoir cavity (not shown) so that air is removed from the air springs to the atmosphere. In other configurations, one condition for clockwise movement of one rotary disk 350 may correspond to counterclockwise rotation of another rotary disk 350 according to the present invention. For example, clockwise rotation of the rotary arm may induce the rotary disk 350 to rotate to an angular position in which the arrangement of slots 354, 355 connects the exhaust cavity 338b with the spring reservoir cavity (not shown) so that the air springs purge air to the atmosphere, thereby decreasing the air pressure of the air springs. Furthermore, counterclockwise rotation of the rotary arm may induce the rotary disk to rotate to an angular position in which the arrangement of slots 354, 355 connects the supply cavity 338a with the spring reservoir cavity (not shown) so that air is supplied from the supply tank to the air springs.

FIGS. 10, 11, and 12A-C illustrate a lower housing 430 according one configuration of the present invention. The lower housing 430 is configured to mount to the upper housing 320 shown in FIGS. 3 and 4 to form a valve body of a leveling valve. Similar to the configuration shown in FIGS. 3-5, the lower housing 430 comprises at least five ports 434a-e, including a supply port 434a that connects to an air tank (not shown), an exhaust port 434b for purging air from the air springs (not shown), a first port 434c that connects to a first set of air springs (not shown), a second port 434d that connects to a second set of air springs (not shown), and a cross-flow port 434e that connects to another leveling valve (not shown). The lower housing 430 can optionally further include a sixth port 434f (shown in FIGS. 12A and 12B) that connects to a dump valve (not shown), wherein the dump valve is configured to remove all of the air from each air spring of the air management system simultaneously.

Figure 12A:
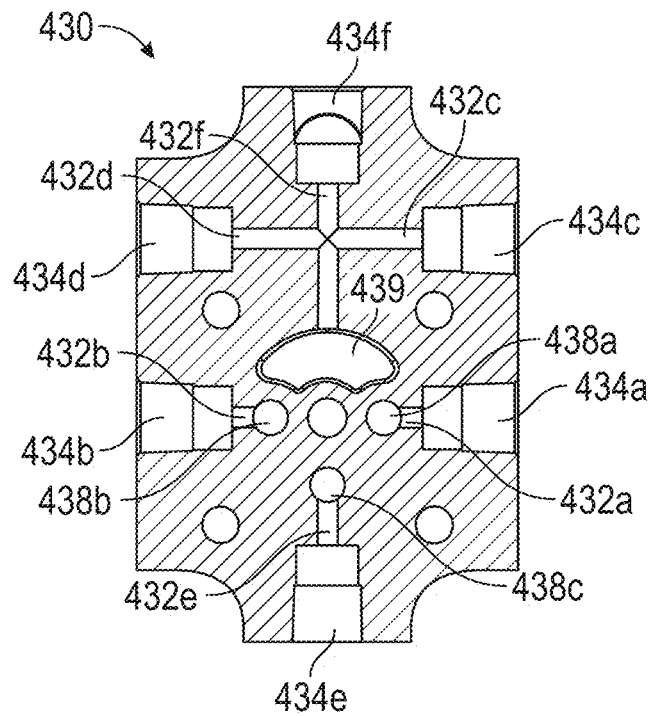
FIG. 12A is a top cross-sectional view of the lower housing taken along line Z-Z according to the present invention.
Figure 12B:
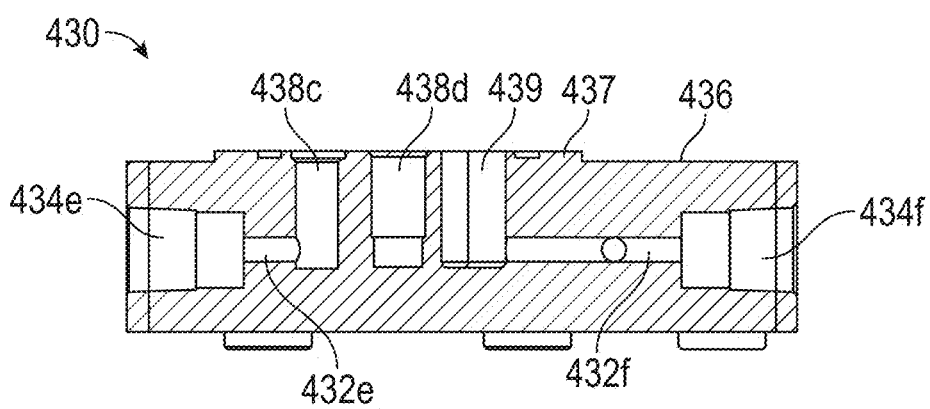
FIG. 12B is a side cross-sectional view of the lower housing taken along line Y-Y according to the present invention.
Figure 12C:
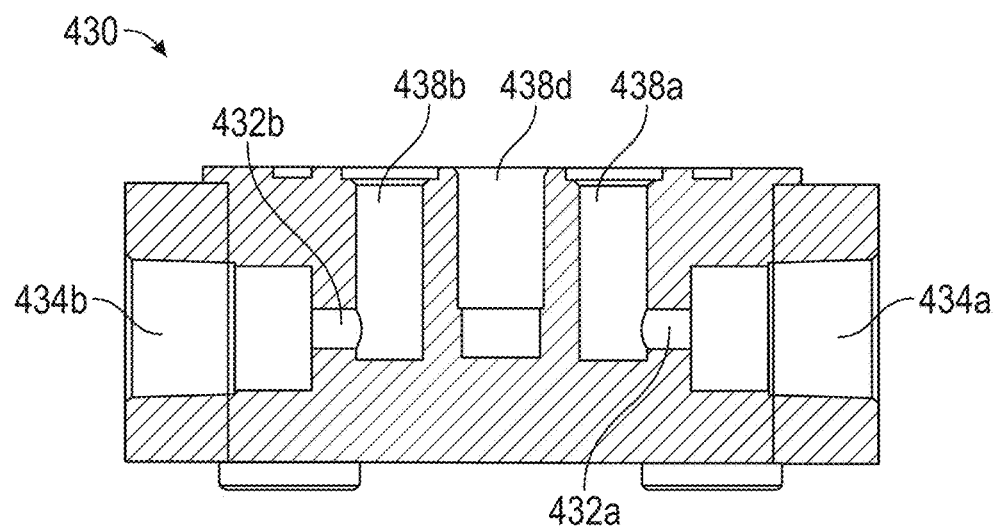
FIG. 12C is a side cross-sectional view of the lower housing taken along line X-X according to the present invention.

As shown in FIGS. 12A-C, the lower housing 430 includes separate airflow passages to each port 434a-f, including a supply passage 432a connected to the supply port 434a, an exhaust passage 432b connected to the exhaust port 434b, a first passage 432c connected to the first port 434c, a second passage 432d connected to the second port 434d, a cross-flow passage 432e connected to the cross-flow port 434e, and a dump passage 432f connected to the dump port 434f. The lower housing 430 includes a first surface 436 defining a plurality of circular-shaped blind holes 438a-c and a reservoir cavity 439. The blind holes 438a-c include a supply hole 438a linked to the supply port 434a by the supply passage 432a, an exhaust hole 438b linked to the exhaust port 434b by the exhaust passage 432b, and a cross-flow hole 438c linked to the cross-flow port 434e by the cross-flow passage 432e. The lower housing 430 further includes a central hole 438d configured to receive a post (not shown) that extends through the upper housing 320 to receive the control arm. The first passage 432c, the second passage 432d, and the dump passage 432f are interconnected together and extend from the reservoir cavity 439. In one example shown in FIG. 10, the lower housing 430 may include an elevated surface 437 protruded from the first surface 436, in which the holes 438a-c and cavity 439 are defined along the elevated surface 437. The elevated surface 437 of the lower housing 430 is configured to engage a lower surface of the upper housing 320 to define a chamber therein.

Figure 13:
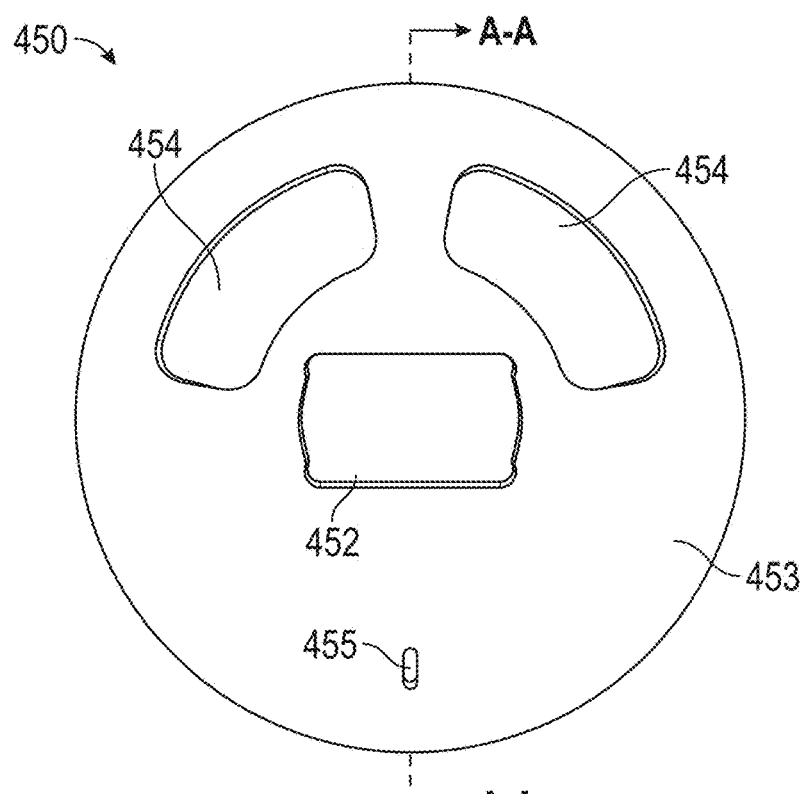
FIG. 13 is a top view of a rotary disk according to the present invention.

FIG. 13 illustrates a rotary disk 450 according to a configuration of the present invention. Similar to the configuration shown in FIGS. 4 and 6A-C, the rotary disk 450 includes a central aperture 452, two oblong-shaped slots 454, and a cross-flow slot 455 with disk surface 453 extending therebetween and along the periphery of the rotary disk 450. The central aperture 452 is disposed between the two oblong-shaped slots 454 and the cross-flow slot 455. The two oblong-shaped slots 454 are symmetrically spaced from a central axis A-A of the rotary disk 455, and the cross-flow slot 455 overlies the central axis A-A of the rotary disk 450, in which the central aperture 452 is disposed between the oblong-shaped slots 454 and the cross-flow slot 455. The cross-sectional area of the cross-flow slot 455 is substantially smaller than the cross-sectional area of each oblong-shaped slot 454. For example, the cross-sectional area of the cross-flow slot 455 is at least three, four, five, ten, twenty, thirty, forty or more times smaller than the cross-sectional area of the oblong-shaped slots 454. In some non-limiting embodiments (e.g., FIGS. 33-36), the width or diameter of the cross-flow slot 455 may vary across its depth thereof such that the width or diameter of the cross-flow slot 455 has a first transverse dimension at a first face of the rotary disk 450 and a second transverse dimension at a second face of the rotary disk 450, in which the first transverse dimension is greater than the second transverse dimension.

The rotary disk 450 is received on the elevated surface 437 of the lower housing 430, and the central aperture 452 receives a shaft (not shown) extending from the first surface 436 of the lower housing 430 to the upper housing (not shown) of the rotary valve. Similar to the configuration shown in FIGS. 4 and 6A-C, the rotary disk 450 is configured to rotate about the shaft between a plurality of positions including a neutral position, a first angular position, and a second angular position. At the neutral position, the disk surface 453 of the rotary disk 450 overlies both the supply hole 438a and the exhaust hole 438b of the lower housing 430 such that the air springs are connected to neither the supply port 434a nor the exhaust port 434b. Thus, the rotary disk 450 is set within the dead band range of rotation when set at a neutral position. At the neutral position, the cross-flow slot 455 overlies the cross-flow hole 438c so that the first and second springs are in communication with the cross-flow port 434e.

When the rotary disk 450 is rotated away from the neutral position in a clockwise direction to the first angular position, the oblong-shaped slots 454 connect the supply hole 438a with the reservoir cavity 439 so that the air springs receive air from the supply tank, thereby increasing the air pressure of the air springs. When the rotary disk 450 is set at the first angular position, the cross-flow slot 455 is rotated away from the cross-flow hole 438, such that the dead band 453 overlies the cross-flow hole 438c. When the rotary disk 450 is rotated away from the neutral position in a counter-clockwise direction to the second angular position, the oblong-shaped slots 454 connect the exhaust hole 438b with the reservoir cavity 439 so that air is removed from the air springs. When the rotary disk 450 is set at the second angular position, the cross-flow slot 455 is rotated away from the cross-flow hole 438c, such that dead band 453 overlies the cross-flow hole 438c.

Due to the sizing of the cross-flow slot 455, the rotary disk 450 only needs to be slightly rotated about 1° to 2° in either the clockwise or the counter-clockwise direction from the neutral position for the dead band 453 to completely overlie the cross-flow hole 438c. Thus, the rotary disk may transition quickly from allowing cross-flow between the first and second pneumatic circuits to controlling the air flow to one side of the vehicle independently without cross-flow taking place. While the rotary disk is rotating about 1° to 2° in either the clockwise or the counter-clockwise direction from the neutral position, the oblong-shaped slots 454 are neither in communication with the supply hole 438a nor the exhaust hole 438b of the lower housing 430. When the rotation speed of the rotary disk exceeds a predetermined threshold speed, the rotary disk 450 may rotate from the first angular position to the second angular position without allowing air to flow through the cross-flow hole 438c and the cross-flow port 434e during the transition. Accordingly, when the vehicle experiences subsequent dynamic weight shifts, the rotary disk may switch between supplying and removing air to and from the air springs without allowing cross-flow to take place between the first and second pneumatic circuits during the transition.

Figure 14A:
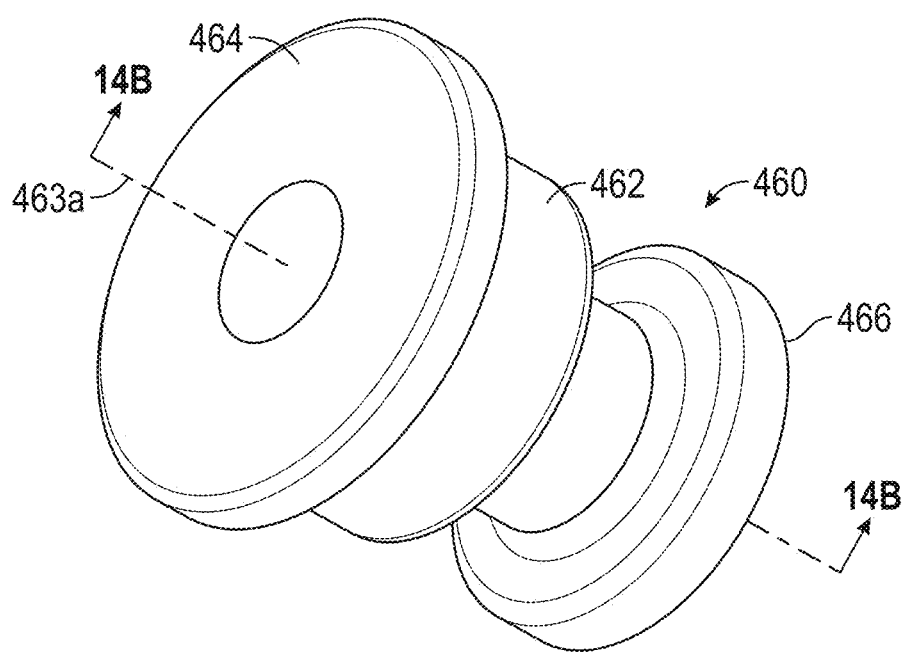
FIG. 14A is a perspective view of a first poppet to be used in the present invention.
Figure 14B:
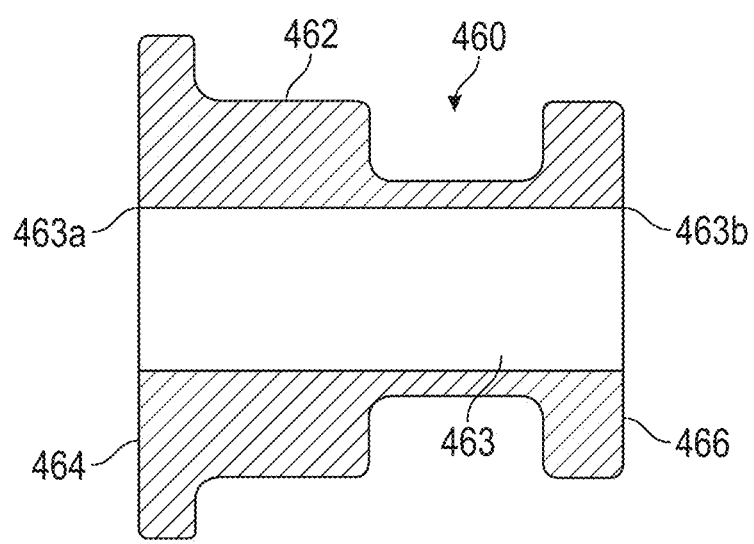
FIG. 14B is a cross-sectional view taken along line B-B of the first poppet to be used in the present invention.

FIGS. 14A and 14B illustrate a first poppet 460 according to one configuration used in the present invention. The first poppet 460 includes a cylindrical-shaped body 462 extending from a first end 464 to a second end 466. The first poppet 460 includes a passage 463 extending through the body 462 from an first opening 463a defined along the first end 464 to a second opening 463b defined along the second end 466. The size of the first opening 463a is equivalent to the size of the second opening 463b. The first poppet 460 is disposed in both the supply hole 438a and the exhaust hole 438b of the lower housing 430, in which the first end 464 projects out of the first surface 436 of the lower housing 430 and engages the rotary disk 450 to provide an air tight seal between the supply and exhaust holes 438a, 438b and the oblong-shaped slots 454. In some other configurations (not shown), the size of the first opening 463a may be different than the size of the second opening 463b such that the diameter or width of the passage 463 varies through its length thereof. In one example, the first opening 463a may comprise a first diameter, and the second opening 463b may comprise a second diameter, in which the second diameter is less than the first diameter.

Figure 15A:
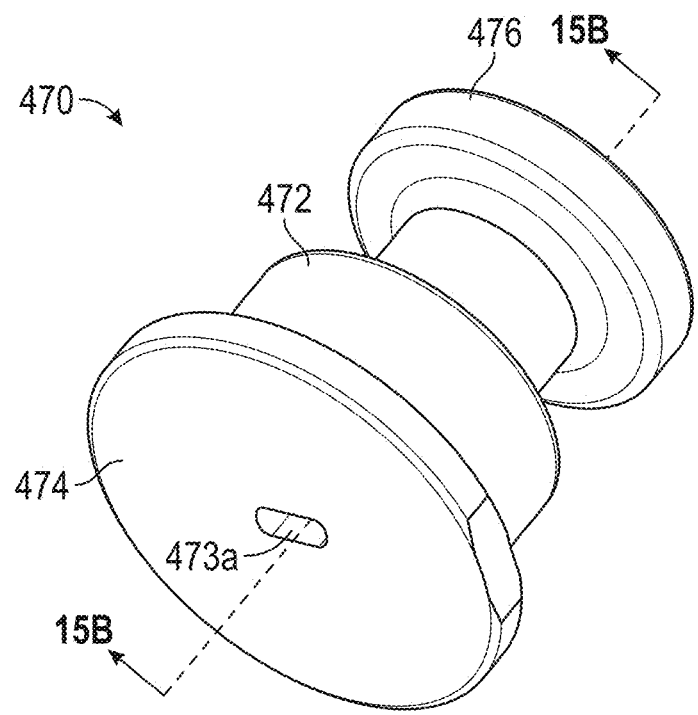
FIG. 15A is a perspective view of a second poppet according to the present invention.
Figure 15B:
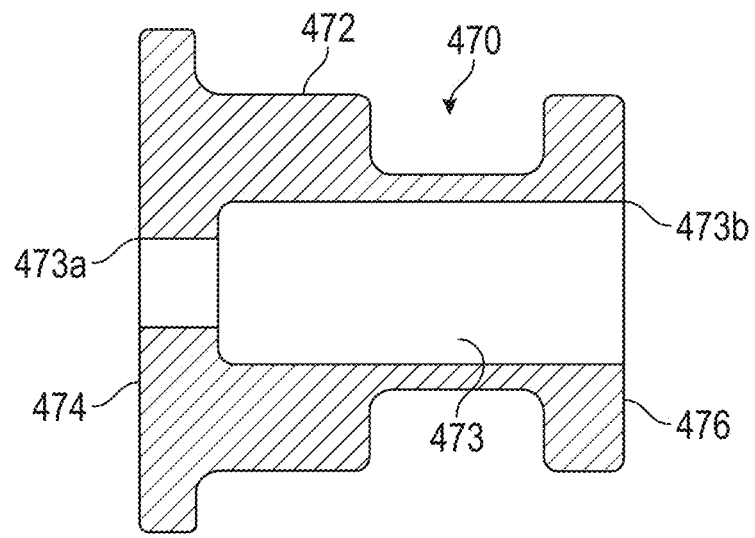
FIG. 15B is a cross-sectional view taken along line C-C of the second poppet according to the present invention.

FIGS. 15A and 15B illustrate a second poppet 470 according to one configuration of the present invention. Similar to the first poppet 460, the second poppet 470 includes a cylindrical-shaped body 472 extending from a first end 474 to a second end 476. The first poppet 470 includes a passage 473 extending through the body 472 from an first opening 473a defined along the first end 474 to a second opening 473b defined along the second end 476. Unlike the first poppet 460, the size of the first opening 473a in the second poppet 470 is smaller than the size of the second opening 473*b*. The size and shape of the first opening 473*a* of the second poppet 470 corresponds to the size and shape of the cross-flow slot 455 in the rotary disk 450. The second poppet 470 is disposed in the cross-flow hole 438*c* of the lower housing, in which the first end 474 projects of the first surface 436 of the lower housing 436 and engages the rotary disk 450 to provide an air tight seal between the cross-flow slot 455 of the rotary disk 450 and the cross-flow hole 438*c*.

In one non-limiting embodiment, the lower housing 430 may comprise a fourth blind hole (not shown) disposed along the first surface 436, whereby the fourth blind hole is aligned with the cross-flow hole 438*c* and the reservoir cavity 439 is disposed between the fourth blind hole and the cross-flow hole 438*c*. In some embodiments, the fourth blind hole is ninety degrees separated from the supply and exhaust holes 438*a*, 438*b* with respect to the central hole 438*d* and one-hundred-eighty degrees separated from the cross-flow hole 438*c* with respect to the central hole 438*d*. The fourth blind hole is not in pneumatic communication with any one of the supply passage 432*a*, exhaust passage 432*b*, first passage 432*c*, second passage 432*d*, cross-flow passage 432*e*, and the dump passage 432*f*. In some embodiments, a third poppet (not shown) may be disposed in the fourth blind hole. In some embodiments, the third poppet may comprise the same configuration as the first poppet 460 received in the cross-flow hole 438*c* such that the third poppet comprises a first end configured to project above the first surface 436 of the lower housing 430. When the rotary disk 450 is received on the first surface 436 of the lower housing 430, the third poppet is configured to engage the rotary disk 450 such that a bottom surface of the rotary disk 450 engages four poppets: the pair of first poppets 460 received in the supply and exhaust holes 438*a*, 438*b*, the second poppet 470 received in the cross-flow hole, and the third poppet received in the fourth blind hole. By engaging the four poppets that are displaced from each ninety degrees with respect to the center hole 438*d*, the rotary disk 450 is maintained at a level position.

Figure 43:
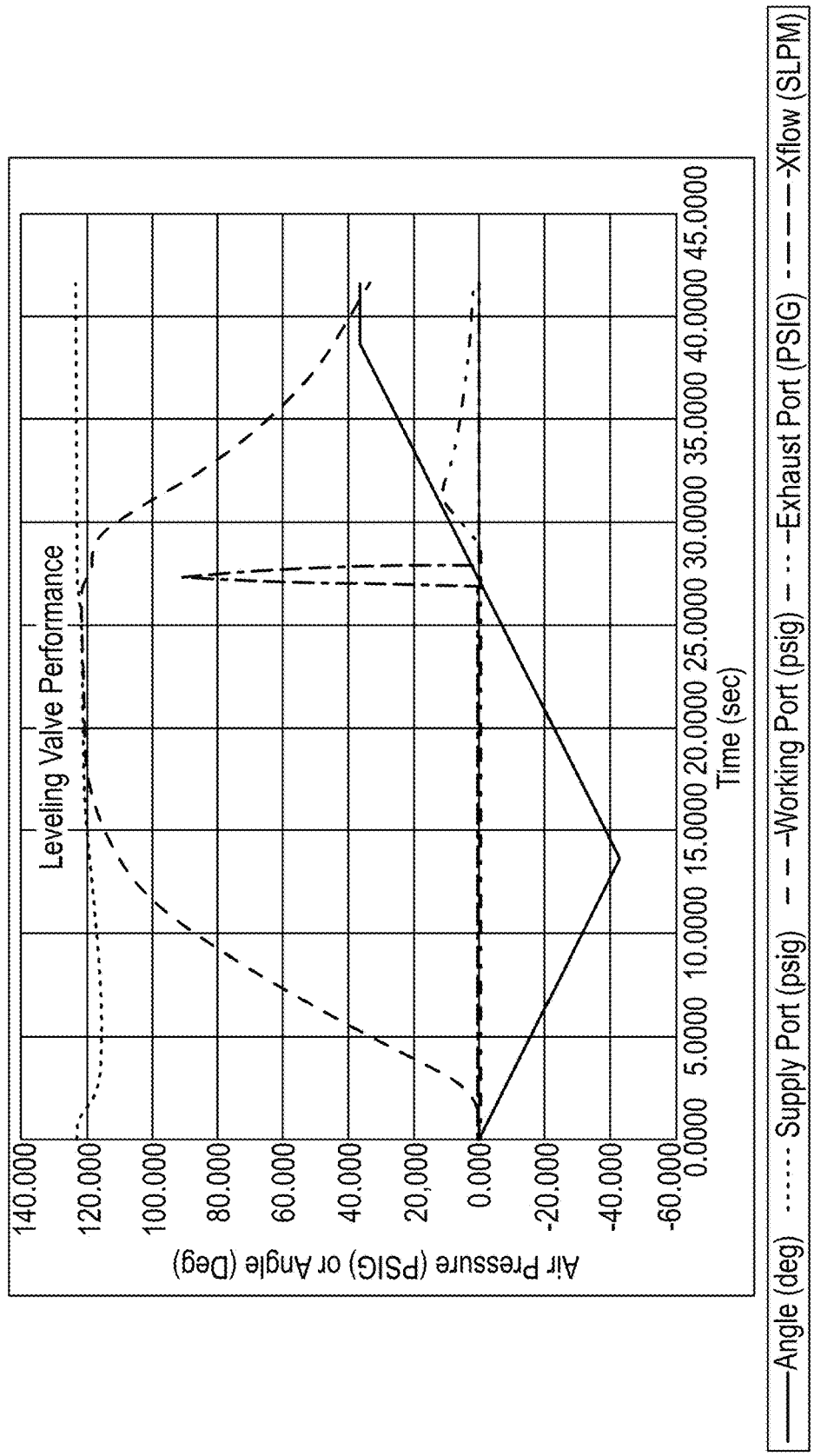
FIG. 43 is a graph showing the air pressure of the various valve ports at various operation stages of the leveling valve according to the present invention.

FIG. 43 illustrates the relationship between the angle of the control arm and the air pressure at the various ports of the lower housing of a leveling valve in an exemplary embodiment according to the present invention. As shown in FIG. 43, the x-axis reflects the time of motorized operation in seconds, and the y-axis indicates both the angle of the control arm in degrees (i.e., represented by the solid line) and the air pressure in pressure-per-square-inch-gauge (PSIG) of the various valve ports in response to the changing control arm angle (represented by the dotted or dashed lines). Referring to FIG. 43, as the vehicle dynamically encounters a changing road condition, i.e., when the control arm pivots initially away from the neutral position, indicated by the x-axis, the air pressure at the working port (i.e., spring port connected to the air spring) increases exponentially, while the air pressure at the supply port slightly dips. Accordingly, the leveling valve is configured to respond quickly at supplying air pressure to the air spring when the control arm pivots away from the neutral position to a supply position. Then, as the control arm initially pivots back toward the neutral position, as indicated at about 14 seconds on the x-axis in FIG. 43, the air pressure at the spring port is maintained at a constant level. Once the leveling arm returns back to the neutral position, as indicated at about 28 seconds on the x-axis in FIG. 43, the air pressure at the cross-flow port spikes to about 90 PSIG and the air pressure at the spring port decreases slightly. As a result, the pressure in the connected air spring decreases slightly so that air springs disposed on opposite sides of the vehicle become equal. Then, as the vehicle continues driving and encounters a different changing road condition, i.e., as the control arm rotates away from the neutral position in the opposite direction, starting about 29 seconds on the x-axis in FIG. 43, the air pressure at the exhaust port increases such that the air pressure at the spring port decreases exponentially, at a faster rate, compared to the decrease of air pressure when the control arm is set in the neutral position. Accordingly, the air pressure in the connected air spring reduces significantly in response to the control arm switching to an exhaust position. Thus, FIG. 43 demonstrates that the leveling valve according to the present invention operates according to three unique stages: (i) a supply mode, (ii) an exhaust mode, and (iii) a cross-flow mode. In addition, FIG. 43 demonstrates that there is no bleed over between the separate stages such that the leveling valve may operate in only one of the three modes at a single time.

Figure 44:
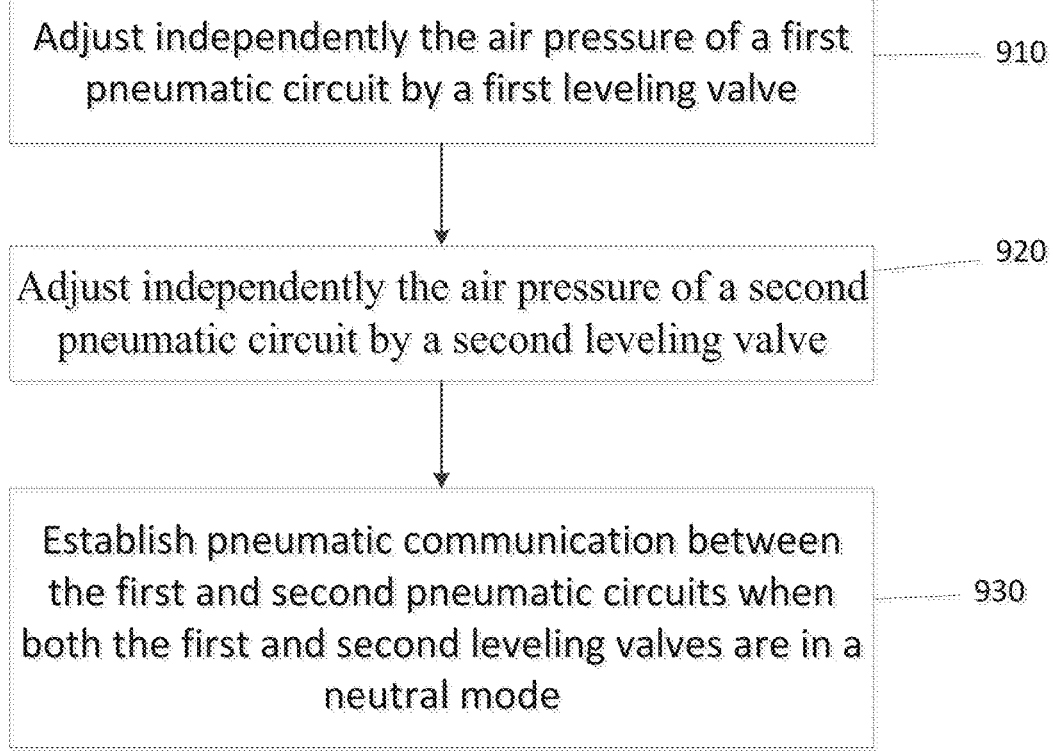
FIG. 44 is a flow chart illustrating a method for adjusting air pressure of an air management system comprising first and second pneumatic circuits according to the present invention.

According to various embodiments, FIG. 44 illustrates a method 900 for adjusting air pressure of an air management system 100 comprising one or more air supply tanks 32, 33, a first pneumatic circuit disposed on a first side of a vehicle, and a second pneumatic circuit disposed on a second side of the vehicle. As shown in FIG. 44, the method 900 comprises a step 910 of adjusting independently the air pressure of the first pneumatic circuit by a first leveling valve 16. In various embodiments, adjusting independently the air pressure of the first pneumatic circuit includes either supplying air from the one or more air supply tanks 32, 33 to the first pneumatic circuit or removing air from the first pneumatic circuit to the atmosphere. As shown in FIG. 44, the method 900 comprises a step 920 of adjusting independently the air pressure of the second pneumatic circuit by a second leveling valve 17. In various embodiments, adjusting independently the air pressure of the second pneumatic circuit includes either supplying air from the one or more air supply tanks 32, 33 to the second pneumatic circuit or removing air from the second pneumatic circuit to the atmosphere. As shown in FIG. 44, the method 900 comprises a step 930 of establishing pneumatic communication between the first pneumatic circuit and the second pneumatic circuit only when both the first leveling valve 16 and the second leveling valve 17 are set in a neutral mode. In various embodiments, the leveling valve in the neutral mode is neither supplying air from the one or more air supply tanks nor removing air to the atmosphere.

The air management system may include mechanically- or electronically-actuated leveling valves to control communication between the first and second pneumatic circuits. In one exemplary configuration, the air management system may include a leveling valve disposed at each air spring, in which each leveling valve includes a manifold and a plunger disposed in a chamber of the manifold. The plunger is configured to move in the chamber of the manifold between one or more positions including at least a first position to establish cross-flow between the first and second pneumatic circuits and a second position to adjust independently the height of a respective side of the vehicle. Rather than having a control arm to actuate air flow, the manifold may include an electronic actuator to move the plunger between the one or more positions so that air flow may be supplied or removed from the respective air spring. In one exemplary configuration, the air management system may have a central manifold that includes individual ports connected to each air spring of the air management system.

In one exemplary configuration, the leveling valves may consist of one or more solenoid valves that allow air to be adjusted to each side of the vehicle independently while selectively allowing cross-flow between the first and second pneumatic circuits to equalize air pressure between the first and second sets of air springs. The air management system may further include a controller in electrical communication (e.g. wireless or wired) with the leveling valves to control the operation of the electronically-actuated leveling valves. The air management system may further include air pressure sensors provided in the air lines to sense pressure changes and imbalances and communicate such data to a controller in electrical communication (e.g. wireless or wired) with the leveling valves or to one or more leveling valves themselves. The air management system may further include inputs based on ride height sensors for height control, flow sensors at one or more of the ports, and communication with electronic systems, e.g., any electronic stability control (ESC), including, but not limited to electronic stability program (ESP), dynamic stability control (DSC), vehicle stability control (VSC), automatic traction control (ATC), and/or roll stability control (RSC) systems of the vehicle 1. Linking actuation of the air management system to a controller that also linked to the ESC, ESP, DSC, VSC, ATC, or RSC of the vehicle enhances the overall safety of the vehicle by syncing braking and steering control with the operation of the air management system.

In various configurations, the controller of the air management system is in electrical communication with the leveling valves, sensors, and other vehicle electronic systems (e.g., ESC, ESP, DSC, VSC, ATC, etc). In various embodiments, the controller may receive measurement signals, such as height and pressure measurements of the air springs, transmitted from the sensors. Based on the measurement and data signals, the controller is configured to calculate a current state of each air spring of the air management system and a dynamic operating state of the vehicle. In one configuration, the controller is configured to calculate a pressure differential or a height differential between the air springs of the air management system based on the received measurement and data signals. The controller is configured to actuate the valve in the active mode when the pressure differential or the height differential between the air springs is above a predetermined threshold and actuate the valve in a neutral mode when the pressure differential or height differential is below a predetermined threshold. Accordingly, when there is a substantial height difference between respective sides of the vehicle, the controller is configured to transmit commands to the leveling valves to independently adjust the height of the air springs of its respective pneumatic circuit to bring the vehicle to a level condition at a faster rate. In various embodiments, the controller may transmit commands to the leveling valve to operate in an active mode at any vehicle speed. When there is only a slight height differential between the respective sides of the vehicle that does not trigger a rolling condition, the controller is configured to transmit a command to the leveling valves to be set in the neutral mode and mitigate any pressure differential between the air springs by establishing cross-flow between the air springs. In various embodiments, the controller transmit commands to the leveling valves to operate in the neutral mode at any vehicle speed, including speeds substantially above zero miles-per-hour or kilometers-per-hour.

Figure 7:
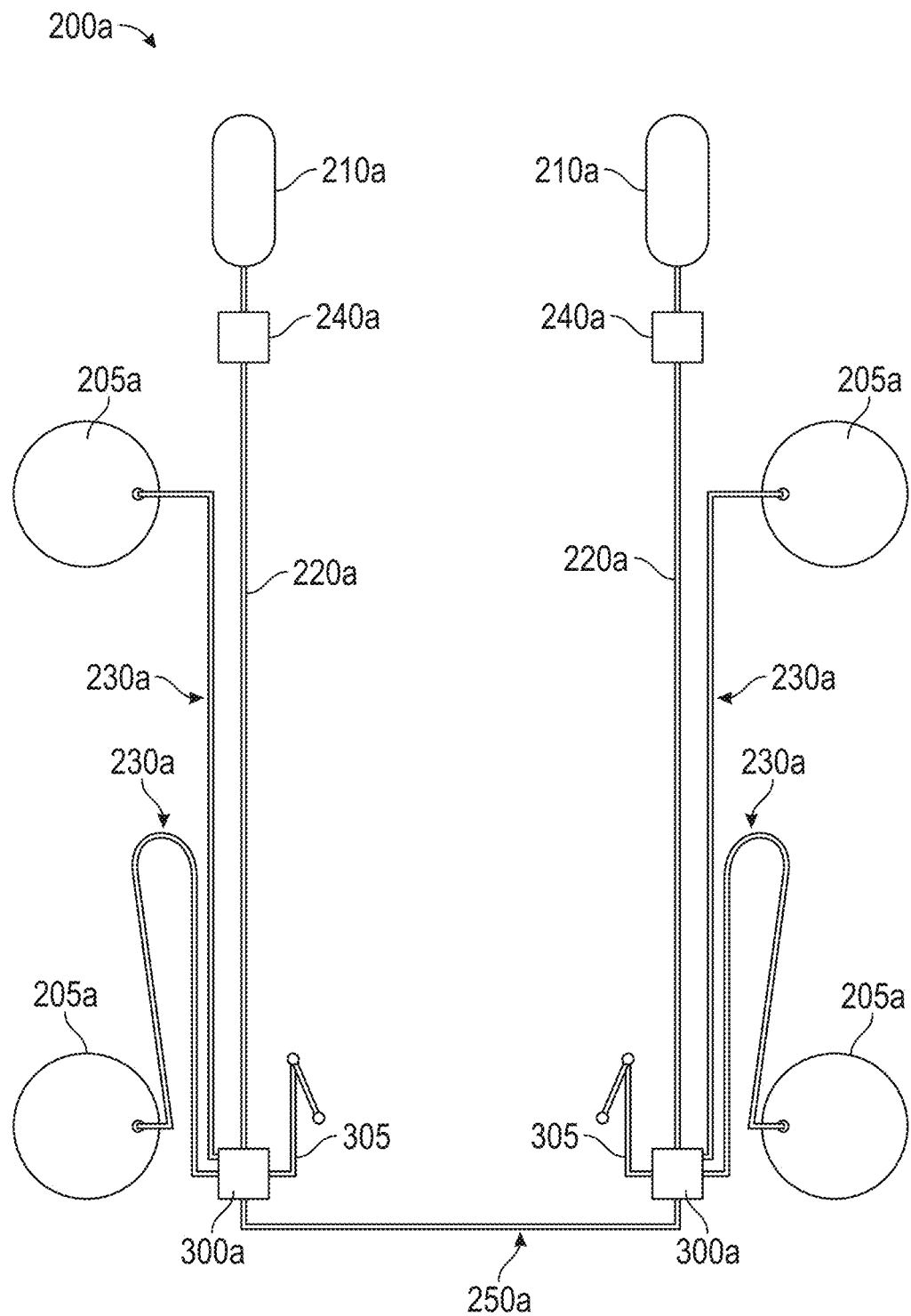
FIG. 7 is a schematic view of an air management system according to the present invention.
Figure 8:
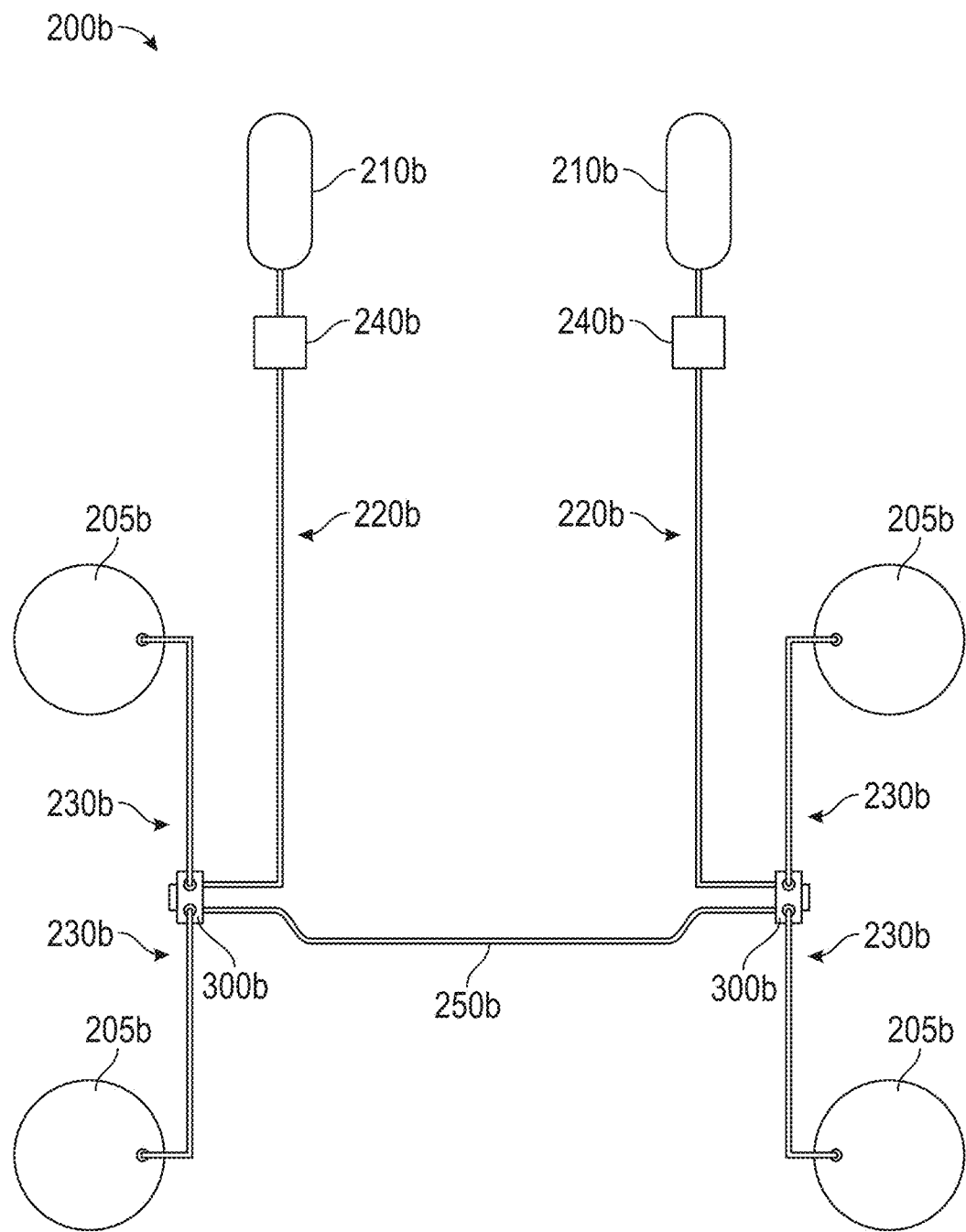
FIG. 8 is a schematic view of an air management system according to the present invention.
Figure 9:
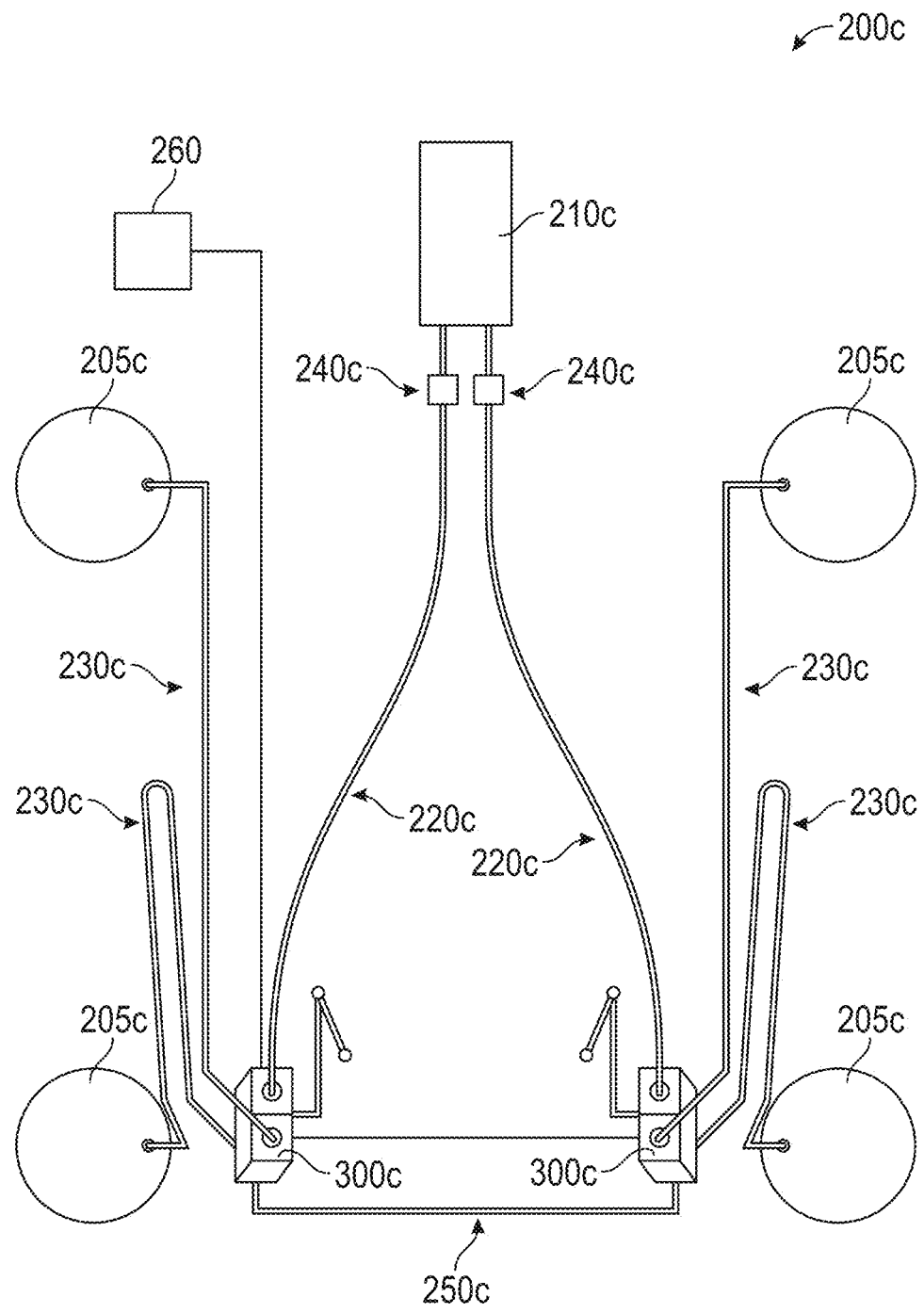
FIG. 9 is a schematic view of an air management system according to the present invention.
Figure 10:
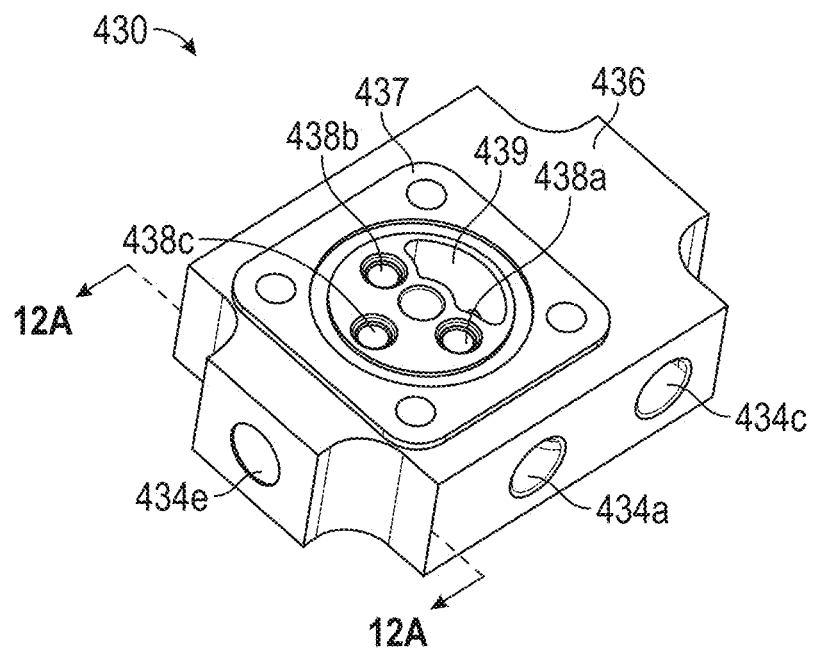
FIG. 10 is a perspective view of a lower housing according to the present invention.
Figure 11:
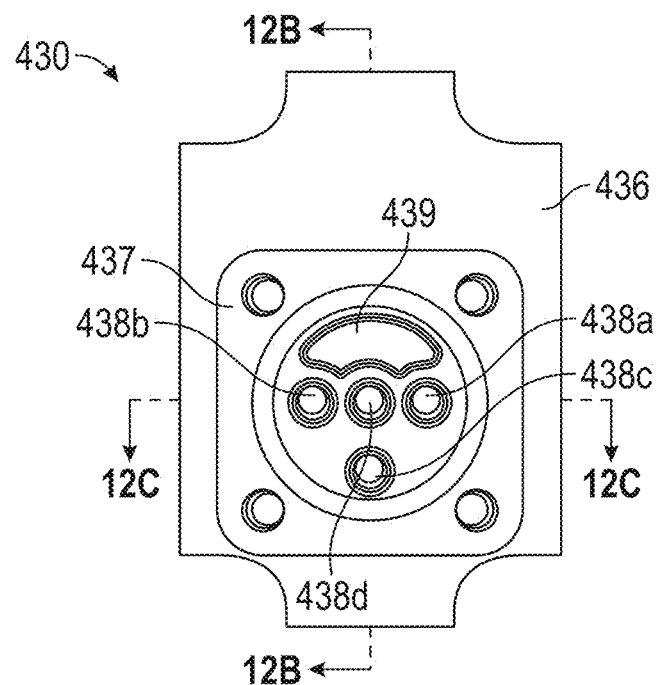
FIG. 11 is a top view of a lower housing according to the present invention.

FIGS. 7-9 illustrate air managements systems comprising a series of air lines, in which the lengths of all the airlines extending between a respective air spring and a control valve have an equal length and internal diameter. FIG. 7 illustrates an air management system 200a comprising a first pneumatic circuit, a second pneumatic circuit, and at least two leveling valves 300a. Each pneumatic circuit includes one or more air springs 205a, an air supply tank 210a, a supply line 220a extending between the leveling valve 300a and the supply tank 210a, and a set of delivery lines 230a connecting the one or more air springs 205a to the leveling valve 300a. The air management system 200a further includes a pressure protection valve 240a (not required for all air management systems) connected to each supply line 220a. In some configurations of the air management system 200a, the delivery lines 230a may have equal lengths and diameters, and the supply lines 220a may have equal lengths and diameters. Each leveling valve 300a is mechanically actuated by a control arm 305 and configured to independently adjust the air flow to one of the first or second pneumatic circuits. The leveling valves 300a are linked together by a cross-flow line 250a to establish fluid communication between the first and second pneumatic circuits when all leveling valves are set in the neutral mode. Thus, the leveling valves 300a are configured to provide cross-flow between first and second pneumatic circuits when neither air is supplied from the air tank to the air springs nor air is removed from the air springs to the atmosphere.

FIG. 8 illustrates an air management system 200b comprising a first pneumatic circuit, a second pneumatic circuit, and at least two leveling valves 300b. Each pneumatic circuit includes one or more air springs 205b, an air supply tank 210b, a supply line 220b extending between the leveling valve 300b and the supply tank 210b, and a set of delivery lines 230b connecting the one or more air springs 205b to the leveling valve 300b. In some configurations of the air management system 200b, the delivery lines 230b may have equal lengths and diameters, and the supply lines 220b may have equal lengths and diameters. The air management system 200b further includes a pressure protection valve 240b connected to each supply line 220b. As shown in FIG. 8, the leveling valves 300b are electronically-actuated leveling valves connected together by a cross-flow line 250b. The electronically-actuated leveling valve is configured to provide cross-flow between first and second pneumatic circuits when neither air is supplied from the air tank to the air springs nor air is removed from the air springs to the atmosphere, i.e., in the neutral mode.

FIG. 9 illustrates an air management system 200c comprising a first pneumatic circuit, a second pneumatic circuit, and at least two leveling valves 300c. The air management system 200c comprises one or more air springs 205c, a supply air tank 210c that is connected to each leveling valve 300c by a respective supply line 220c, in which a pressure protection valve 240c is incorporated into the supply line 220c. Each leveling valve 300c is connected to the one or more air springs 205c by a series of delivery lines 230c. In some configurations of the air management system 200c, the delivery lines 230c may have equal lengths and diameters, and the supply lines 220c may have equal lengths and diameters. The leveling valves 300c are connected together by a cross-flow line 250c. As shown in FIG. 9, the leveling valves 300c are electronically-actuated leveling valves and are in electrical communication with a control unit 260. The electrical communication may be established by a wired connection or a wireless connection. The electronically-actuated leveling valve is configured to provide cross-flow between first and second pneumatic circuits when neither air is supplied from the air tank to the air springs nor air is removed from the air springs to the atmosphere, i.e., in the neutral mode.

Figure 16:
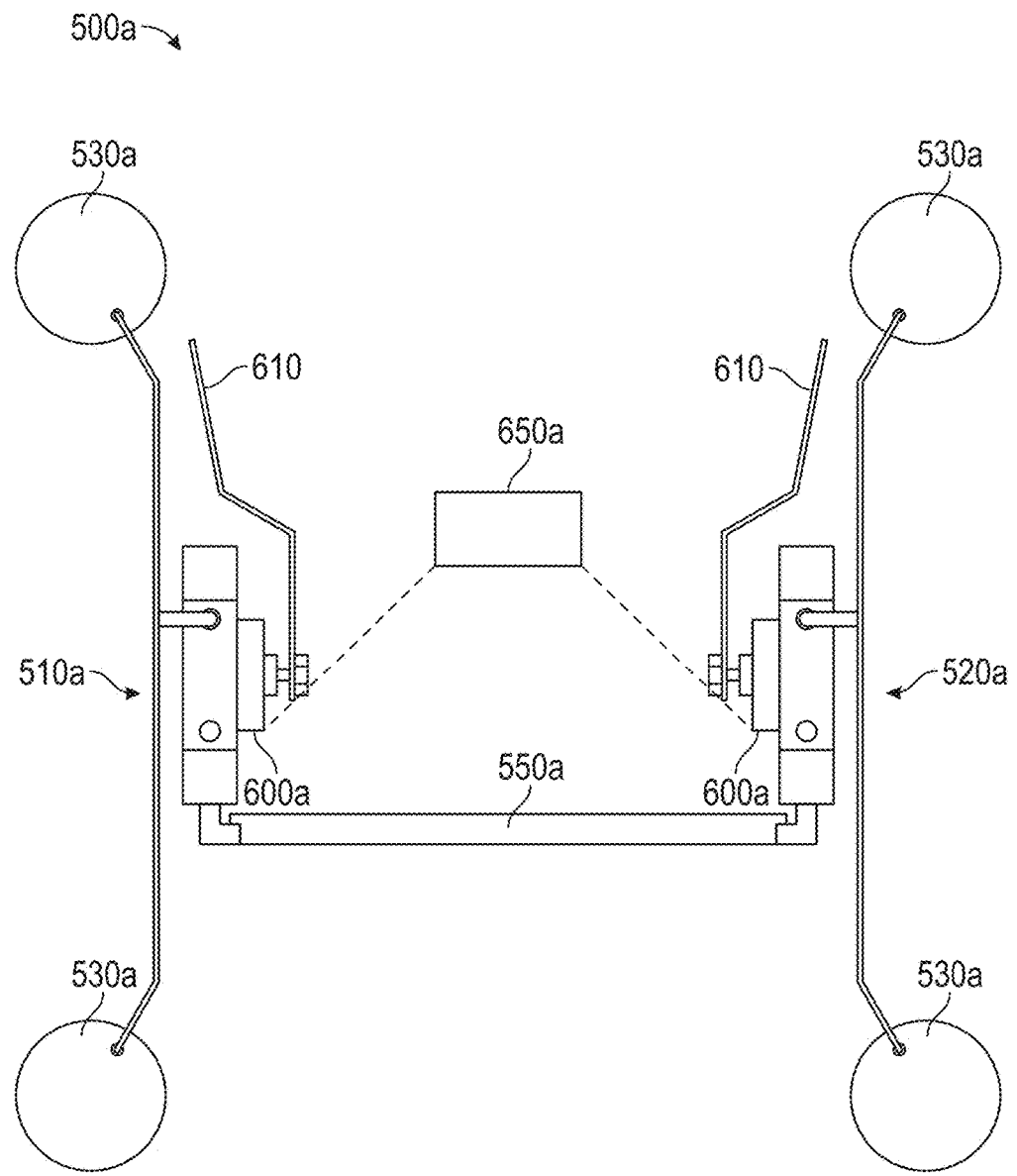
FIG. 16 is a schematic view of an air management system according to the present invention.
Figure 17:
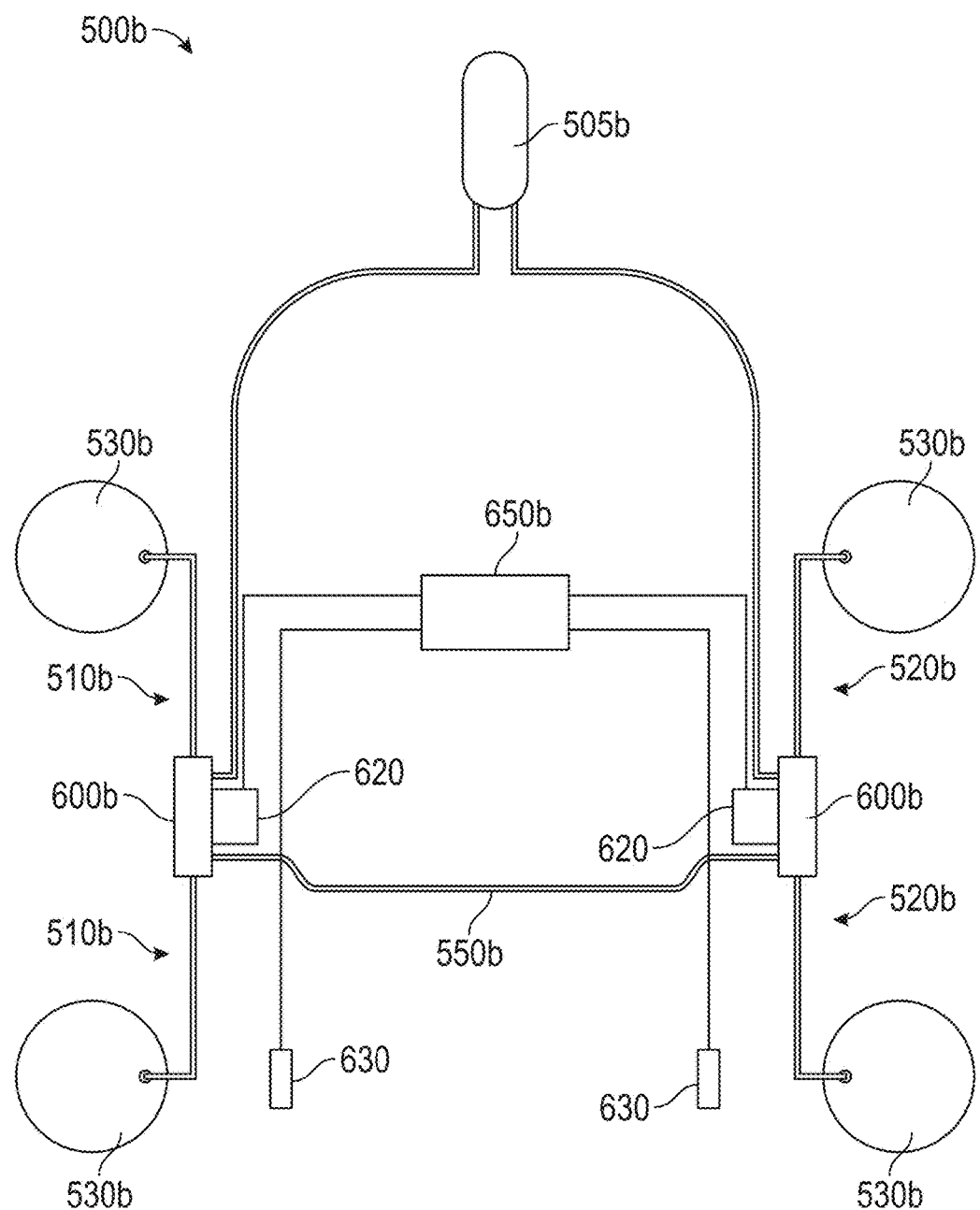
FIG. 17 is a schematic view of an air management system according to the present invention.
Figure 18:
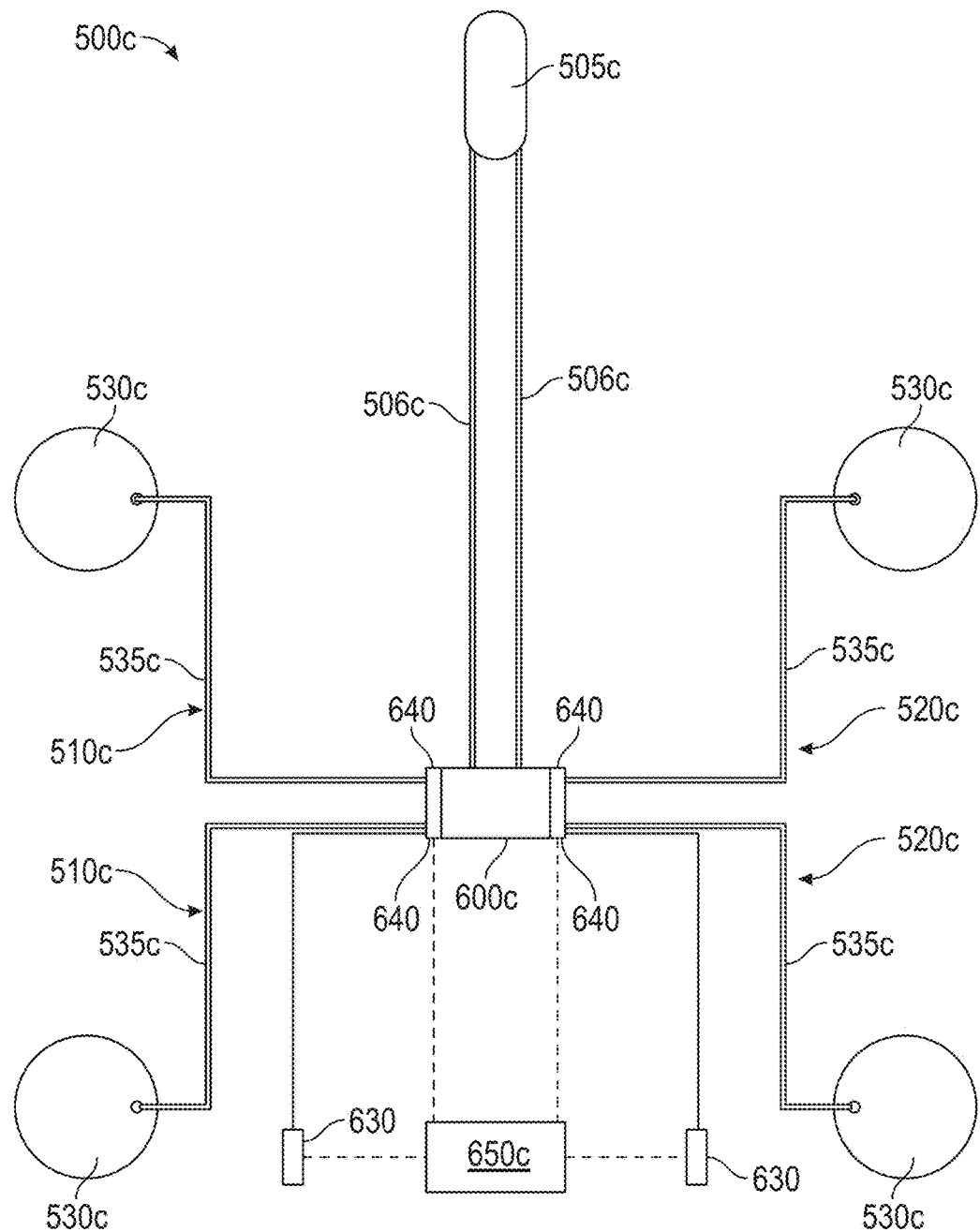
FIG. 18 is a schematic view of an air management system according to the present invention.

FIGS. 16-18 illustrate air management systems that sync control of air flow with an electronic control unit. FIG. 16 shows an air management system 500a comprising a first pneumatic circuit 510a, a second pneumatic circuit 520a, and at least two leveling valves 600a. Each pneumatic circuit 510a, 520a, includes one or more air springs 530a. Each leveling valve 600a is configured to independently adjust the air flow to one of the first or second pneumatic circuits. The leveling valves 600a are linked together by a cross-flow line 550a to establish fluid communication between the first and second pneumatic circuits 510a, 520a when all leveling valves 600a are set in the neutral mode. Each leveling valve 600a is mechanically actuated by a control arm 610 and includes a control arm sensor (not shown) disposed in the housing of the leveling valve 600a to detect the position of the control arm. In one example, the control arm sensor may be a potentiometer. The control arm sensor is in electrical communication with a control unit 650a, which may be integrated into ESC, ESP, DSC, VSC, ATC, or RSC of the vehicle. The electrical communication may be established by a wired connection or a wireless connection. The control arm sensor is configured to detect the position of the control arm and transmit the position of the control arm to the control unit 650a as a control arm position input. The control unit 650a is configured to determine vehicle height at each respective side of the vehicle based on the control arm position input.

FIG. 17 shows an air management system 500b comprising an air supply tank 505b, a first pneumatic circuit 510b connected to the supply tank 505b, a second pneumatic circuit 520b connected to the supply tank 505b, and at least two leveling valves 600b, in which each leveling valve is configured to control independently the air flow to one of the first or second pneumatic circuits 510b, 520b. In other configurations of the air management system 500b, the air management system may have more than one air supply tank 505b. Each pneumatic circuit 510b, 520b, includes one or more air springs 530b. Each leveling valve 600b includes a valve element (not shown) configured to move between a plurality of positions including a neutral position, a supply position, and an exhaust position. In one example, the valve element may be a poppet, a plunger, etc. When the valve element is set in the neutral position, the port neither supplies air to the air springs from the air tank nor removes air from the air springs to the atmosphere. Each leveling valve 600b is electronically actuated by an electronic actuator 620. In one example, the electronic actuator 620 may be a solenoid, a motor, etc. As shown in FIG. 17, the leveling valves 600b are connected together by a cross-flow line 550b to establish fluid communication between the first and second pneumatic circuits 510b, 520b when all valve elements are set in the neutral position. The air management system further includes a plurality of leveling sensors 630, including at least one leveling sensor 630 disposed at each side of the vehicle to detect vehicle height positions, air pressure of a respective air spring, or any other information pertinent to vehicle stability. The level sensors 630 are in electrical communication with a control unit 650b. The electrical communication may be established by a wired connection or a wireless connection. Each leveling sensor 630 is configured to transmit measurements to the control unit 650b as a vehicle leveling input. The control unit 650b is configured to determine vehicle height at each respective side of the vehicle based on the vehicle leveling input. The control unit 650b is further configured to control the electronic actuators 620 at each leveling valve 600b to trigger movement of the valve element to a desired position, thereby controlling the air flow to the first and second pneumatic circuits.

In one configuration, the control unit 650b is configured to actuate the leveling valves 600b to establish cross-flow when the pressure differential or height differential between the air springs of the first and second pneumatic circuits 510b, 520b are within a predetermined threshold. The control unit 650 is configured to actuate the valves 600b in the active mode to independently adjust the air pressure of its associated pneumatic circuit when the pressure differential or height differential between the air springs of the first and second pneumatic circuits 510b, 520b are greater than a predetermined threshold. The control unit 650b may determine the pressure or height differential of the air springs 530b based on measurement signals received from the sensors 630.

FIG. 18 shows an air management system comprising an air supply tank 505c, a first pneumatic circuit 510c, a second pneumatic circuit 520c, and a manifold 600c that, in certain embodiments, is disposed at or near the center of the vehicle. In other configurations of the air management system 500c, the air management system may have more than one air supply tank 505c. The manifold 600c is connected to the supply tank 505c by one or more supply lines 506c. Each pneumatic circuit 510c, 520c, includes one or more air springs 530c. The manifold 600c includes a plurality of ports 640, including at least one port 640 connected to each air spring 530c by a delivery line 535c. The manifold 600c includes a valve element (not shown) disposed at each port 640 to control the flow of air through the port. In one example, the valve element may be a poppet, a plunger, etc. The valve element is configured to move between a plurality of positions including a neutral position, a supply position, and an exhaust position. When the valve element is set in the neutral position, the port neither supplies air to the air springs from the air tank nor removes air from the air springs to the atmosphere. The manifold 600c further includes a cross-flow passage (not shown) to establish fluid communication between the first and second pneumatic circuits 510c, 520c when all the valve elements are set in the neutral position. The manifold 600c further includes an electronic actuator (not shown) disposed at each port to trigger movement of the valve element. In one example, the electronic actuator may be a solenoid, a motor, etc. The air management system 500c further includes a plurality of leveling sensors 630, including at least one leveling sensor 630 disposed at each side of the vehicle to detect vehicle height positions, air pressure of a respective air spring, or any other information pertinent to vehicle stability. The level sensors 630 are in electrical communication with a control unit 650c. The electrical communication may be established by a wired connection or a wireless connection. Each leveling sensor 630 is configured to transmit measurements to the control unit 650c as a vehicle leveling input. The control unit 650c is configured to determine vehicle height at each respective side of the vehicle based on the vehicle leveling input. The control unit 650c is further configured to control the electronic actuators at each port 640 to trigger the movement of the valve element to a desired position, thereby controlling the air flow to the first and second pneumatic circuits 510c, 520c.

In one configuration, the control unit 650c is configured to actuate the manifold 600c to establish cross-flow when the pressure differential or height differential between the air springs of the first and second pneumatic circuits 510c, 520c are within a predetermined threshold. The control unit 650c is configured to actuate the manifold 600c in the active mode to independently adjust the air pressure of its associated pneumatic circuit when the pressure differential or height differential between the air springs of the first and second pneumatic circuits 510c, 520c are greater than a predetermined threshold. The control unit 650c may determine the pressure or height differential of the air springs 530b based on measurement signals received from the sensors 630.

Figure 19:
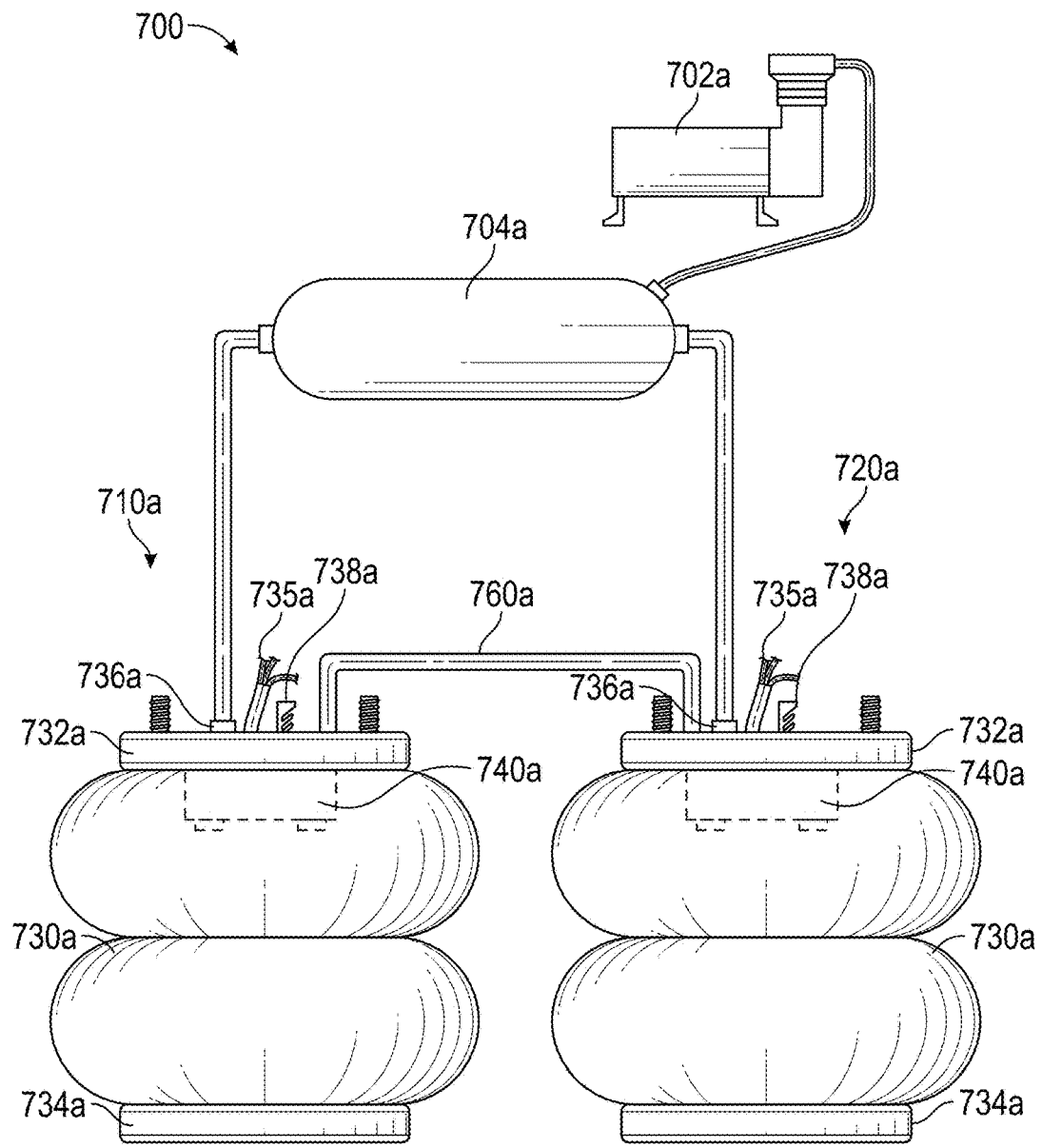
FIG. 19 is a schematic view of an air management system according to the present invention.
Figure 20:
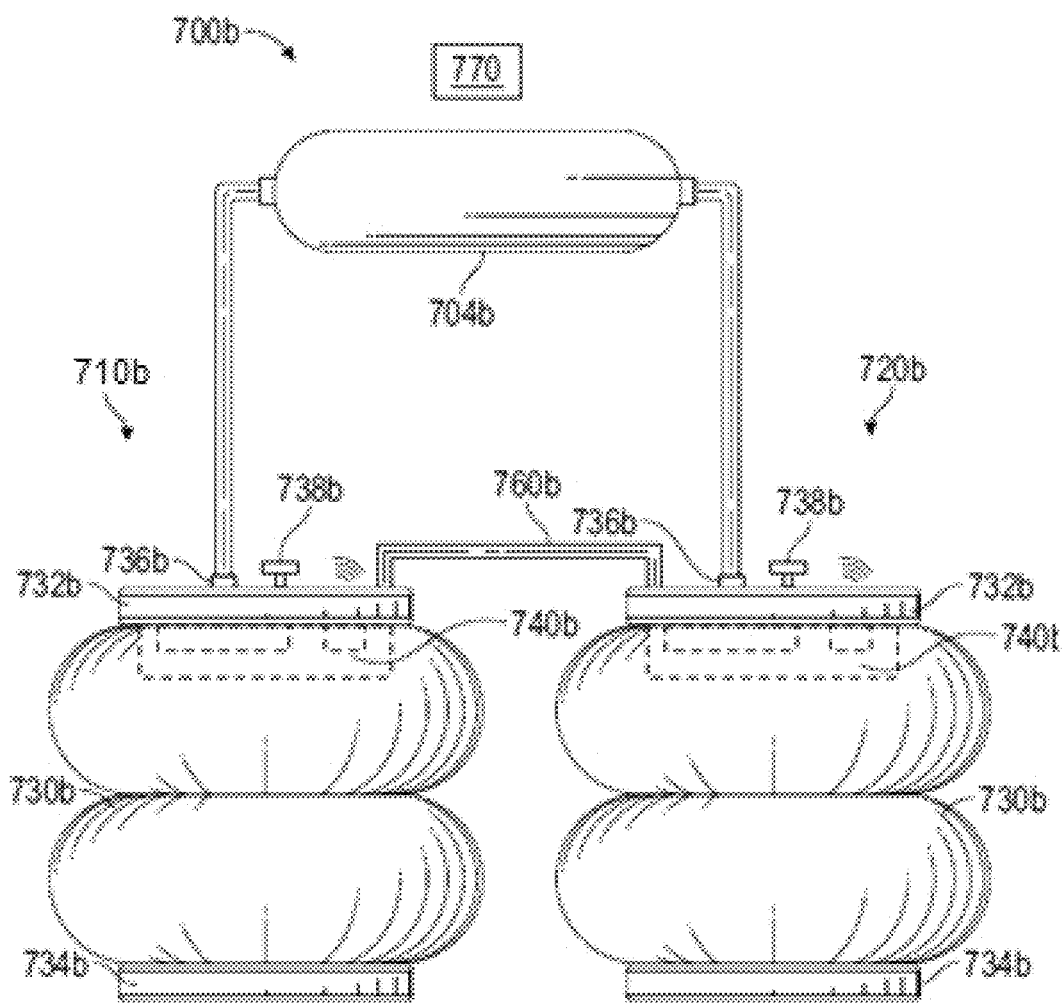
FIG. 20 is a schematic view of an air management system according to the present invention.

FIGS. 19 and 20 illustrate air management systems that sync control of air flow with a control unit associated with each air spring. FIG. 19 shows an air management system 700 comprising an air source 702a, a supply air tank 704a, a first pneumatic circuit 710a disposed on a first side of the vehicle, and a second pneumatic circuit 720a disposed on a second side of the vehicle. Each pneumatic circuit 710a, 720a, includes one or more air springs 730a. Each air spring 730a comprises a control unit 740a disposed within a chamber of the air spring 730a. The control unit 740a comprises a housing mounted to a top plate 732a of the air spring 730a. By being disposed within the air spring 730, the control unit 740a is not exposed to the outside environment, thereby being protected from damage caused by debris or inclement weather conditions. The control unit 740a is configured to adjust the height of the air spring 730b to a desired height that is determined based on one or more operating conditions monitored by the control unit 740a. The control unit 740a may take into account conditions of other air springs 730a of the air management system 700 in determining the desired height for its associated air spring 730a, but the control unit 740a adjusts the height of its associated air spring 730a independent to the other control units 740a of the air management system 700. As shown in FIG. 19, a cross-flow line 760a connects the control unit 740a of an air spring 730a in the first pneumatic circuit 710a to a control unit 740a of an air spring 730a in the second pneumatic circuit 720a. Each control unit 740a is configured to provide cross-flow between the two air springs 730a of the first and second pneumatic circuits 710a, 720a when neither air is supplied from the air source 702a to the air springs 730a nor air is removed from the air springs 730a to the atmosphere, i.e., in the neutral mode.

Figure 22:
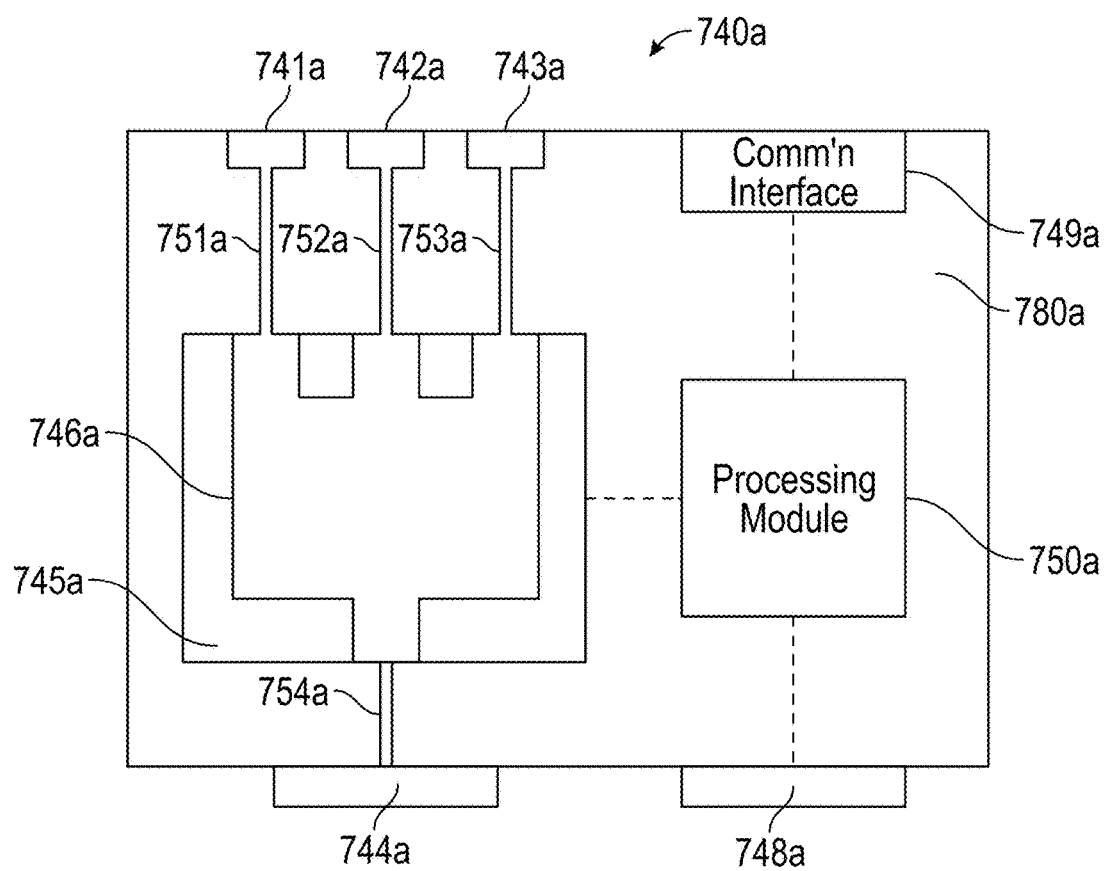
FIG. 22 is a schematic view of a control unit according to the present invention.

Referring to FIGS. 19 and 22, the control unit 740a comprises an inlet port 741a disposed along a first surface of the housing 780a, an outlet port 742a disposed along the first surface of the housing 780a, a cross-flow port 743a disposed along a first surface of the housing 780a, and a delivery port 744a disposed along a second surface of the housing 780a. The control unit 740a comprises a valve chamber 745a and a plurality of passages 751a-754a connecting the delivery port 744a, the inlet port 741a, the outlet port 742a, and the cross-flow port 743a to the valve chamber 745a. The inlet port 741a is configured to connect to a fitting 736a disposed on the top plate 732a, thereby establishing pneumatic communication between the air supply tank 704a and the control unit 740a. The outlet port 742a is configured to connect to an exhaust port 738a disposed on the top plate 732a, thereby establishing pneumatic communication between the atmosphere and the control unit 740a. The cross-flow port 743a is configured to connect to the cross-flow line 760a, thereby establishing pneumatic communication between a control unit 740a of a first air spring 730a and a control unit 740a of a second air spring 730a. The delivery port 744a is configured to establish pneumatic communication between the valve chamber 745a and the chamber of the air spring 730a such that air may be supplied into or released from the chamber of the air spring 730a.

As shown in FIG. 22, the control unit 740a comprises a valve 746a disposed in the valve chamber 745a for selectively controlling the supply and exhaust of air to and from the chamber of the air spring 730a. The valve 746a is configured to switch between a plurality of modes, including a first mode in which the air is released out of the chamber of the air spring 730a, a second mode in which the air is supplied into the chamber of the air spring 730a, a neutral mode in which the chamber of the air spring 730a is pneumatically connected to the cross-flow line 760a. In the first mode, the valve 746a establishes pneumatic communication between the inlet port 741a and the delivery port 744a. In the second mode, the valve 746a establishes pneumatic communication between the outlet port 742a and the delivery port 744a. When the valve 746a is set in the first or second modes, the valve 746a is independently adjusting the height of its associated air spring 730a (i.e., active mode) such that the valve 746a is not in pneumatic communication with other air springs 730a of the air management system 700. In the neutral mode, the valve 746a establishes pneumatic communication between the cross-flow port 743a and the delivery port 744a, resulting in cross-flow between its associated air spring 730a and a second air spring 730a disposed on an opposite side of the vehicle.

The valve 746a may take any suitable form or configuration, such as a two-way, three-way, or variable position valve, to selectively control the flow of air in and out of the chamber of the air spring 730a at a plurality of flow rates. In one example (not shown), the valve 746a comprises a rotary member disposed in the valve chamber and an electronic actuator operatively linked to the rotary member. In one configuration, the electronic actuator is a stepper motor. The rotary member is configured to rotate between a plurality of positions including a first position establishing pneumatic communication between the inlet port and the delivery port, a second position establishing pneumatic communication between the outlet port and the delivery port, and a third position establishing pneumatic communication between the delivery port and the cross-flow port. The electronic actuator (e.g., stepper motor) is configured to receive energy from a power source and actuate movement of the rotary member between the plurality of positions. In some configurations, the rotary member is a disk comprising a plurality of holes configured to selectively overlie the plurality of passages at the first, second, and third positions, and the stepper motor includes a shaft that is rotatably coupled to the disk. In some configurations, the stepper motor is configured to actuate movement of the rotary member to a plurality of positions such that the volumetric flow rate for supplying or removing air from the chamber may vary at each respective position of the rotary member. Accordingly, the stepper motor may actuate movement of the rotary member to a first position, in which air is supplied or removed from the chamber of the air spring 730a at a first rate, and the stepper motor may actuate movement of the rotary member to a second position, in which air is supplied or removed from the chamber of the air spring 730a at a second rate that is greater or less than the first rate.

In another example (not shown), the valve 746a may include a plunger received in the valve chamber 745a and a solenoid operatively connected to the plunger. The plunger is configured to slide within the valve chamber 745a between a plurality of positions, including a first position establishing pneumatic communication between the inlet port and the delivery port, a second position establishing pneumatic communication between the outlet port and the delivery port, and a third position establishing pneumatic communication between the delivery port and the cross-flow port. The solenoid is configured to receive energy from a power source and actuate movement of the plunger between the plurality of positions. In some configurations, the solenoid is configured to actuate movement of the plunger to a plurality of positions such that the volumetric flow rate for supplying or removing air from the chamber may vary at each respective position of the plunger.

Figure 26A:
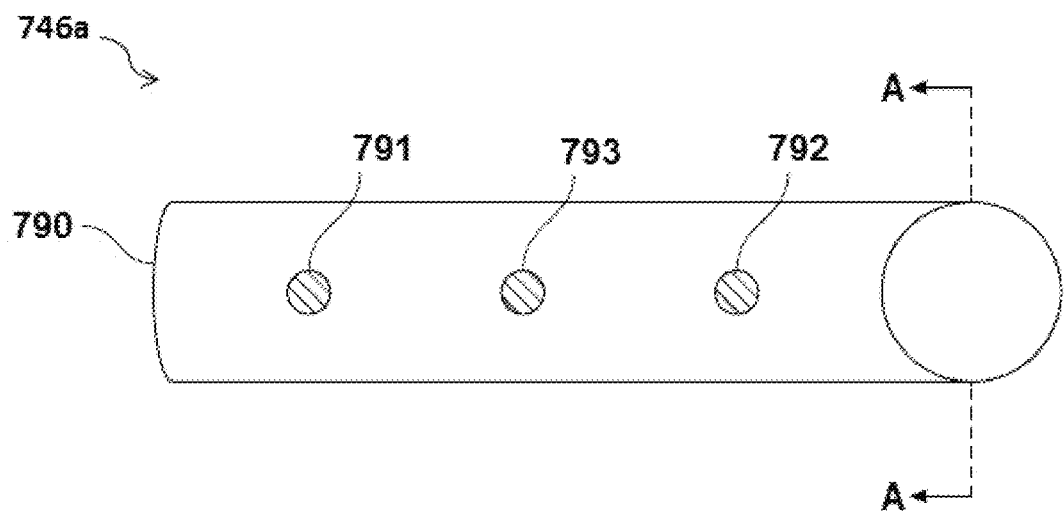
FIG. 26A is a schematic view of a valve according to the present invention.
Figure 26B:
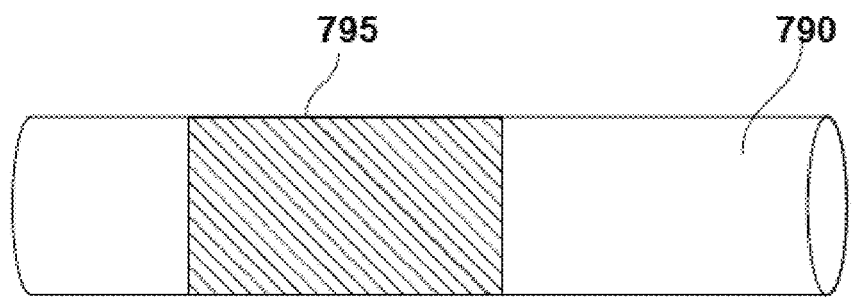
FIG. 26B is a cross-section view of a valve according to the present invention taken along line A in FIG. 26A.
Figure 27:
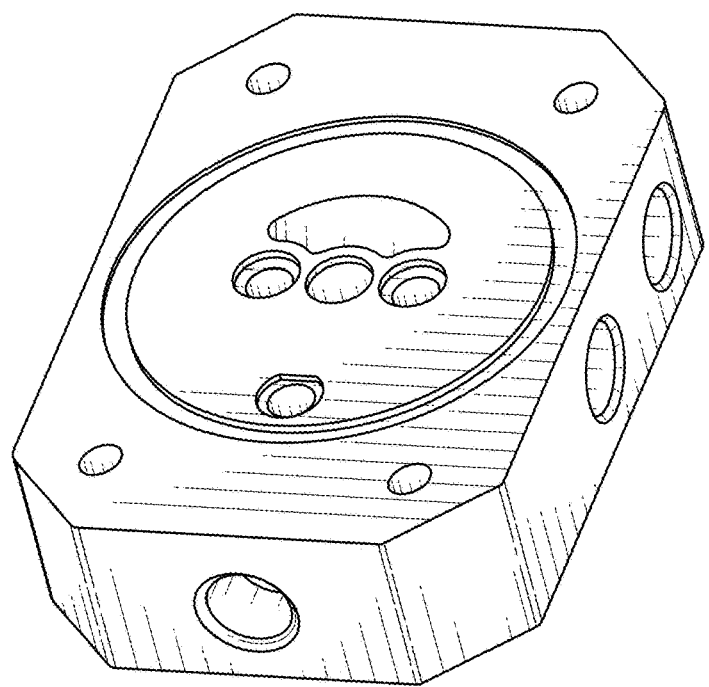
FIG. 27 is a top perspective view of a lower housing according to the present invention.
Figure 28:
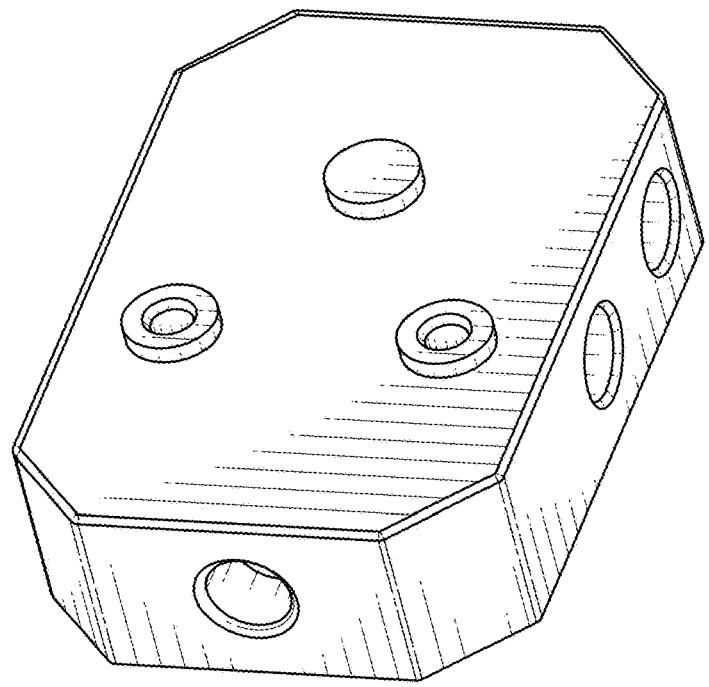
FIG. 28 is a bottom perspective view of a lower housing according to the present invention.
Figure 29:
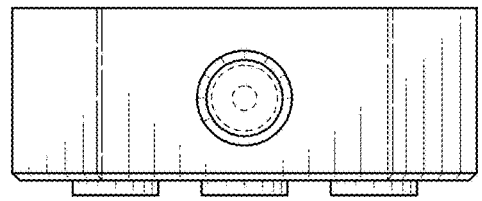
FIG. 29 is an end view of a lower housing according to the present invention.
Figure 30:
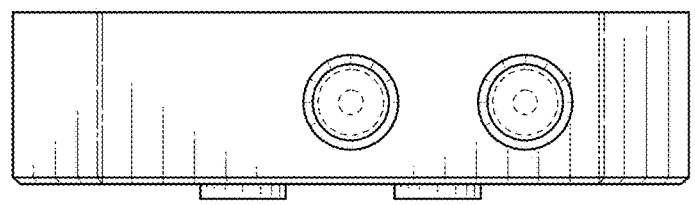
FIG. 30 is a side view of a lower housing according to the present invention.
Figure 31:
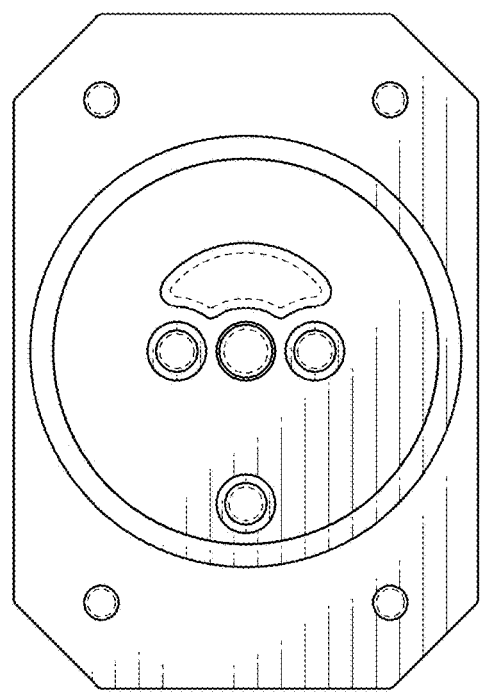
FIG. 31 is a top plan view of a lower housing according to the present invention.
Figure 32:
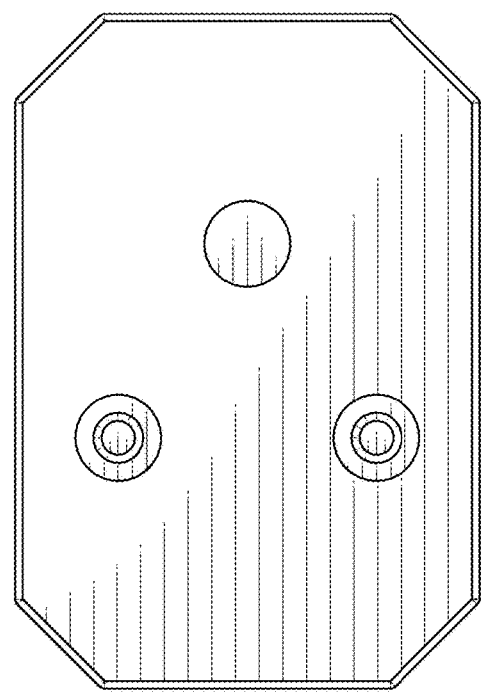
FIG. 32 is a bottom plan view of a lower housing according to the present invention.
Figure 33:
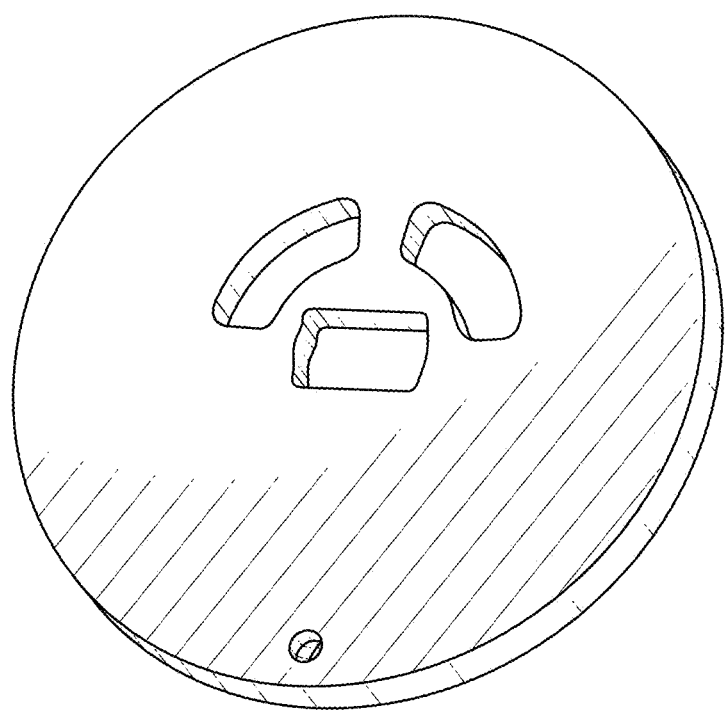
FIG. 33 is a perspective view of a rotary disk according to the present invention.
Figure 34:
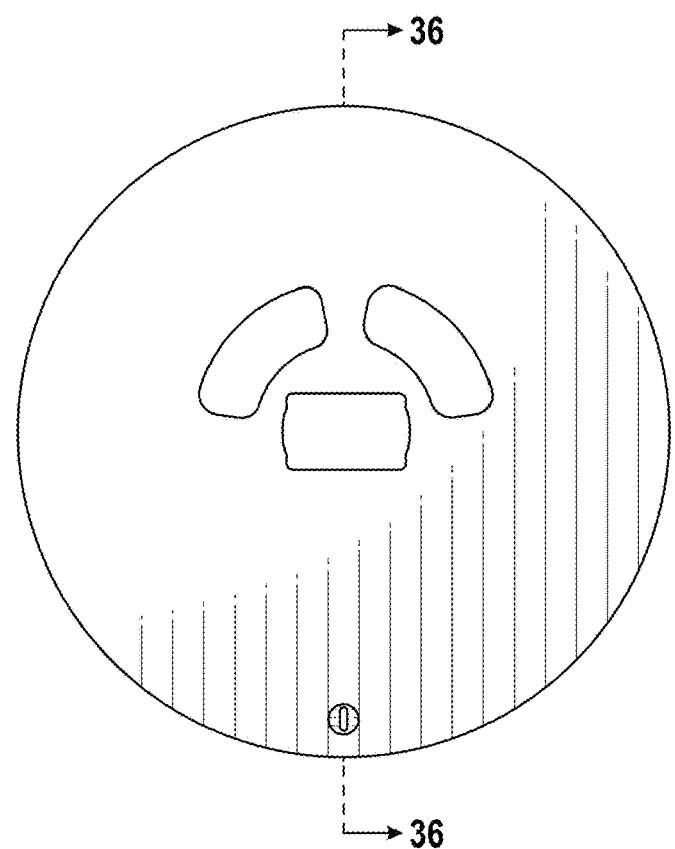
FIG. 34 is a top plan view of a rotary disk according to the present invention.
Figure 35:
FIG. 35 is a side view of a rotary disk according to the present invention.
Figure 36:
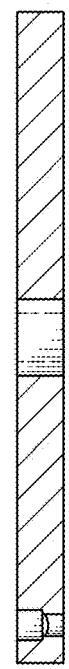
FIG. 36 is a side cross-sectional view of a rotary disk according to the present invention taken along line 36 in FIG. 34.
Figure 37:
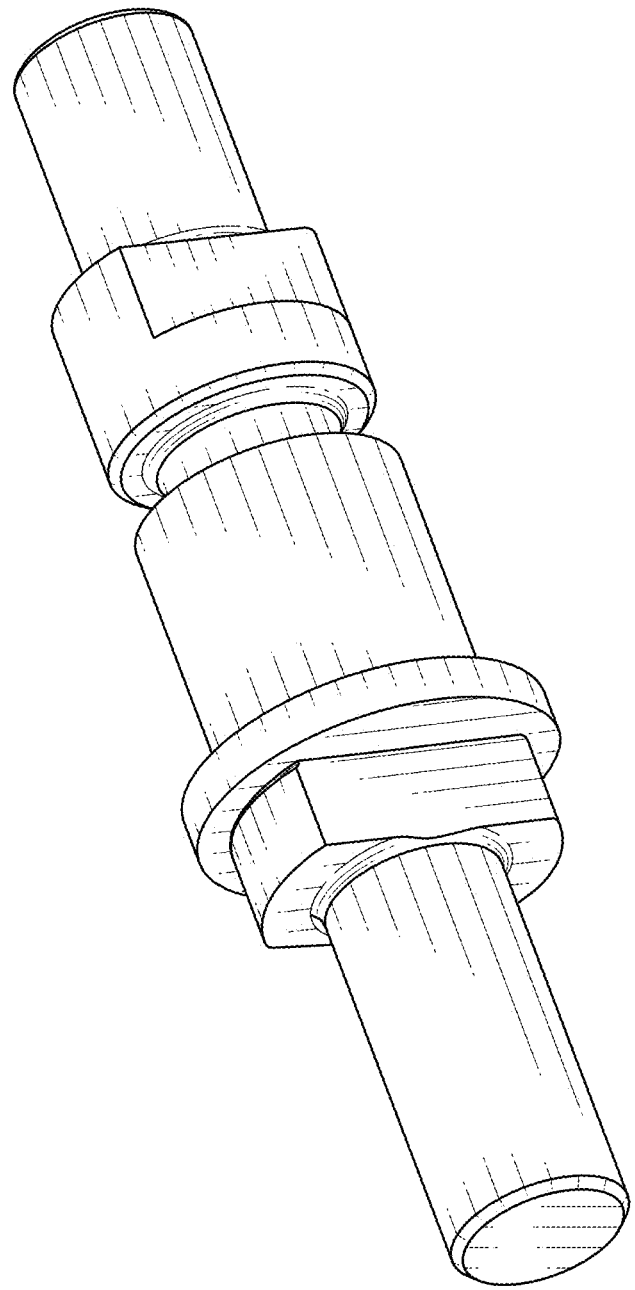
FIGS. 37 and 38 are perspective views of a shaft according to the present invention.
Figure 38:
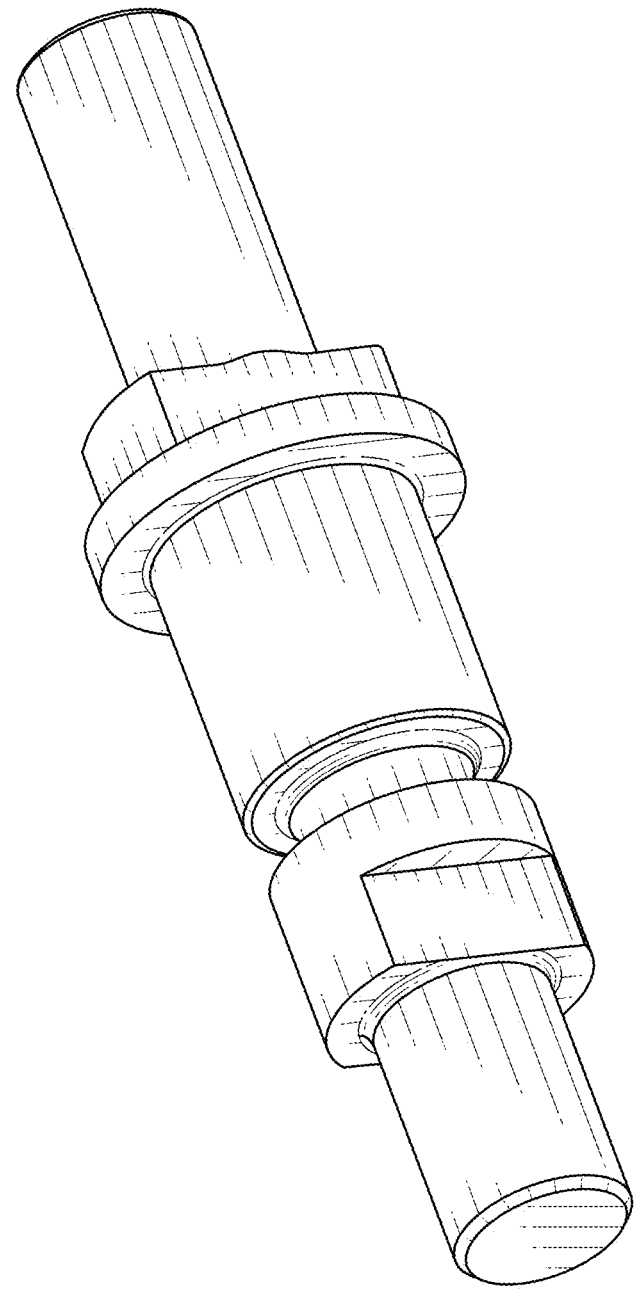
Figure 39:
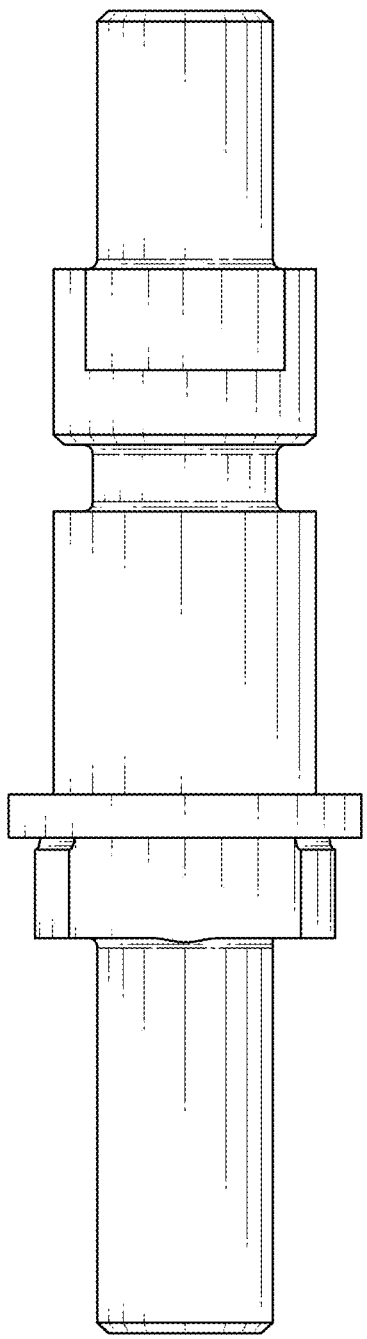
FIG. 39 is a side view of a shaft according to the present invention.
Figure 41:
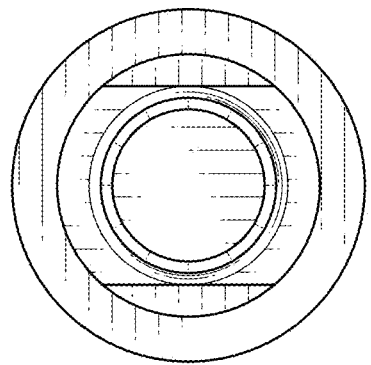
FIG. 41 is a top end view of a shaft according to the present invention.
Figure 40:
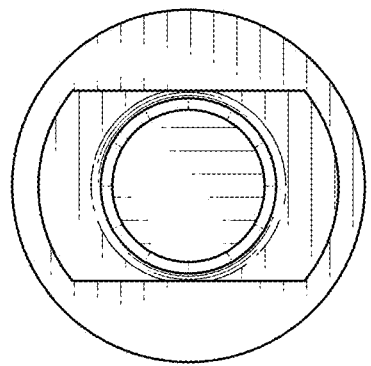
FIG. 40 is a bottom end view of a shaft according to the present invention.
Figure 42:
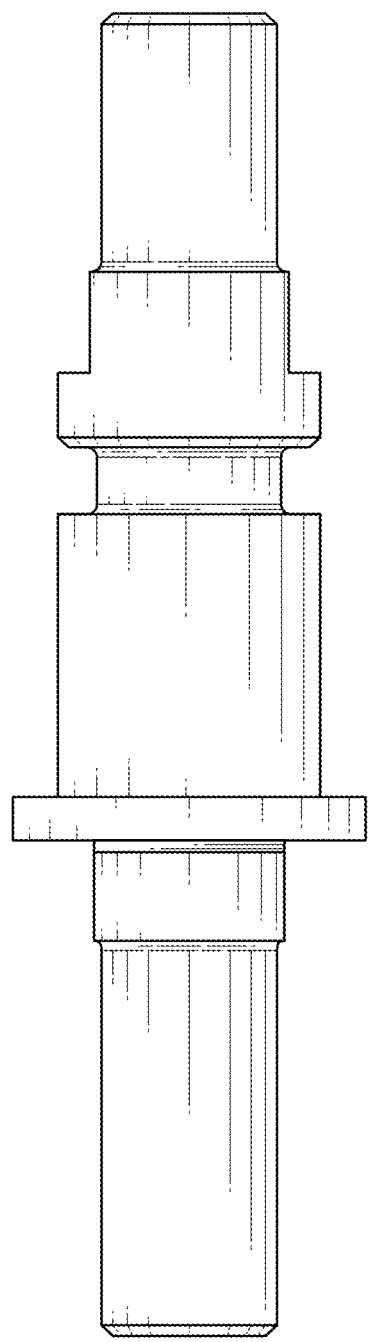
FIG. 42 is a side view of a shaft according to the present invention.

In another example as shown FIGS. 26A and 26B, the valve 746a may include a cylindrical-shaped manifold 780 and a throttle element 790 telescopically received in the manifold 780 such that the throttle element 790 is in sliding engagement with the interior surface of the manifold 780. In one configuration, the manifold 780 includes a plurality of openings 781-783 disposed along a surface of the manifold 780. The plurality of openings 781-783 include a first opening 781 disposed approximate a first end of the manifold 780, a second opening 782 disposed approximate a second end of the manifold 780, a third opening 783 disposed between the first and second openings 781, 782. The first opening 781 is configured to provide pneumatic communication between the inlet port 741a and the delivery port 744a of the control unit 740a. The second opening 782 is configured to provide pneumatic communication between the chamber of the air spring and the outlet port 742a of the control unit 740a. The third opening 783 is configured to provide pneumatic communication between the cross-flow port 743a and the chamber of the air spring.

In one configuration, the throttle element 790 is configured to receive an electric signal and slide along the longitudinal axis of the manifold 780 in response to receiving an electric signal. By sliding along the longitudinal axis of the manifold 780, the throttle element 790 is configured to control the exposure of the first, second, and third openings 781-783 such that the valve 746a is configured to selectively supply air, remove air, or establish cross-flow for the associated air spring 730a. The displacement of the throttle element 790 further controls the rate of air flow through the control unit 740a. The throttle element 790 may further be set in a position that isolates the air spring 730a from all other components of air management system 700 such that the air pressure of the air spring 730a remains static.

In another configuration (not shown), the throttle element is configured to rotate about the longitudinal axis of the manifold in response to receiving an electric signal. By rotating about the longitudinal axis of the manifold, the manifold is configured to control exposure of the first, second, and third openings such that the valve 746a is configured to selectively supply or remove air from the chamber of the air spring. The valve 746a may include an electronic actuator configured to trigger movement of the throttle element along the longitudinal axis of the manifold.

In another configuration (not shown), the manifold includes a plurality of openings disposed along a surface of the manifold. The plurality of openings include a first opening disposed approximate a first end of the manifold, a second opening disposed approximate a second end of the manifold, a third opening disposed between the first and second openings and disposed on an opposite side of the manifold to the first and second openings, and a fourth opening disposed between the first and second openings. The first opening is in direct pneumatic communication with the inlet port 741a. The second opening is in direct pneumatic communication with the outlet port 742a. The third opening is in direct pneumatic communication with the delivery port 744a. The fourth opening is in direct pneumatic communication with the cross-flow port 743a. In one configuration, the throttle element is configured to receive an electric signal and slide along the longitudinal axis of the manifold in response to receiving an electric signal. By sliding along the longitudinal axis of the manifold, the throttle element is configured to control the exposure of the first, second, third, and fourth openings such that the valve 746a is configured to selectively supply air, remove air, or establish cross-flow for the associated air spring 730a. The displacement of the throttle element further controls the rate of air flow through the control unit 740a. The throttle element may further be set in a position that isolates the air spring from all other components of the air management system 700 such that the air pressure of the air spring remains static.

In another configuration (not shown), the throttle element is configured to rotate about the longitudinal axis of the manifold in response to receiving an electric signal. By rotating about the longitudinal axis of the manifold, the manifold is configured to control exposure of the first, second, and third openings such that the valve 746a is configured to selectively supply or remove air from the chamber of the air spring. The valve 746a may include an electronic actuator configured to trigger movement of the throttle element along the longitudinal axis of the manifold.

The control unit 740a comprises one or more sensors 748a, a communication interface 749a, and a processing module 750a operatively linked to the one or more sensors 748a and the communication interface 749a. In some configurations, the control unit 740a may comprise a power source (not shown), such as a rechargeable battery and/or a supercapacitor integrated with the housing 780a of the control unit 740a or external to the housing 780a of the control unit 740a, to provide operating power to the one or more sensors, communication interface, and processing module. The power source may be operatively linked to the power supply of the vehicle to receive a recharging current. In other configurations (not shown), the housing of the control unit 740a may extend above the top plate such that the valve chamber, the valve, and the processing module are mounted above the top plate and disposed outside the chamber of the air spring.

The one or more sensors 748a may be any suitable configuration or device for sensing a condition of the vehicle or any of the components of the air management system. In one example, the one or more sensors 748a include a height sensor configured to continuously monitor the axial distance between the top plate 732a and a base plate 734a of the air spring 730a. The height sensor is configured to generate a signal indicating a height or distance associated with the air spring 730a, such as the axial distance between the top plate 732a and the base plate 734a. In one configuration, the height sensor may be a ultrasonic sensor, in which sensor transmits ultrasonic waves, detects the waves reflected from base plate 734a, and determines the axial separation between the top and base plate based on the detected waves. In another configuration, the height sensor may be an infrared sensor, in which the sensor transmits an infrared light by a transmitter, receives a reflected infrared light by a receiver, and determines the axial separation between the top and base plates based on the amount of infrared radiation reflected back to the receiver. The height sensor may be any other suitable type or configuration for monitoring the height of the air spring 730a, such as a potentiometer, linear position transducer, a laser sensor, or an electromagnetic wave sensor. In another example, the one or more sensors may include a pressure sensor configured to continuously monitor the internal air pressure of the air spring 730a and generate a signal indicating the internal air pressure of the air spring 730a. In one configuration, the pressure sensor is a pressure transducer.

The communication interface 749a may be any suitable device or component for relaying analog or digital signals to, from, and between the processing module 750a and the control units 740a of other air springs 730a of the air management system 700 and/or other vehicle operating systems. In the illustrated configuration shown in FIG. 19, the air spring 730a includes a plurality of leads 735a that connect the control unit 740a to the control units 740a of other air springs 730a of the air management system 700 and other vehicle operating systems, such as a Controller Area Network (CAN), CAN Repeater(s), Roll Stability Control (RSC), Electronic Stability Control (ESC), Anti-lock Braking System (ABS), Automatic Traction Control (ATC), Automatic Emergency Braking system (AEB), Electronic Braking System (EBS), collision avoidance systems, collision warning system, collision mitigation system, etc. The communication interface 749a is configured to receive any signals received from the wired leads 735a and relay those signals to the processing module 750a. The communication interface 749a is configured to receive any signals generated by the processing module 750a and transmit those signals over the wired leads to the control units 740a of other air springs 730a of the air management system 700 and other vehicle operating systems. Accordingly, the control unit 740a for each air spring 730a may be in electrical communication with the control units 740a of the other air springs 730a of the air management system 700 such that the control unit may directly transmit and receive data or commands to and from the control units 740a of the other air springs 730a without relaying the signals through other system components.

The processing module 750a of the control unit 740a may be any suitable device or component for receiving input signals from the one or more sensors 748a and the communication interface 749a and outputting commands to adjust height of the air spring 730a to a desired height based on the received input signals. The processing module 750a may comprise one or more processors, central processing units, application specific integrated circuits, microprocessors, digital signal processors, microcontrollers or microcomputers. The processing module 750a may further comprise memory, such as read-only memory, to store all necessary software that embodies the control strategy and mathematical formulations for the operation of the control unit 740a. The processing module 750a may comprise an oscillator and clock circuit for generating clock signals that allow the processing module 750a to control the operation of the control unit 740a. The processing module 750a may comprise a driver module, such as a driving circuit, operatively linked to the valve such that the processing module may selectively actuate valve. The processing module 750a may signal the driver module to actuate the valve in any suitable manner, such as by pulse width modulation or hit-and-hold actuation. For example, the processing module 750a may alter the rotation of the valve by modulating the electronic signal transmitted from the driver module to the electronic actuator of the valve. The processing module 750a may comprise a sensor interface for receiving signals generated by the one or more sensors. The processing module 750a may comprise an analog-to-digital converter linked to the sensor interface so that analog signals received from the one or more sensors may be converted to digital signals. In turn, the digital signals are processed by the processing module 750a to determine one or more conditions of the air spring 730a, such as spring height or internal air pressure. Accordingly, the processing module 750a is configured to receive all the necessary inputs to calculate a desired air pressure for the air spring 730a, determine the necessary air flow rate to alter the air pressure of the air spring 730a, and convey commands in terms of supplying or purging air to the valve 746a of the control unit 740a.

The control unit 740a operates as a closed-loop control system to adjust the height of its associated air spring 730a to a desired height based on the monitored operating conditions of the vehicle. In operation, the processing module 750a receives inputs from the one or more sensors 748a, such as the height sensor and the pressure sensor, to determine the height and the internal air pressure of the air spring 730a. The processing module 750a commands the communication interface 749a to transmit signals indicating the spring height and the internal air pressure of the air spring 730a to the control units 740a of the other air springs 730a of the air management system 700. In return, the communication interface 749a may receive data signals from the control units 740a of the other air springs 730a and relay those data signals as inputs to the processing module 750a. The processing module 750a then determines the desired air pressure for its associated air spring 730a based on inputs from the one or more sensors 748a and data signals received from the other air springs 730a of the air management system 700. In determining the desired air pressure for its associated air spring 730a, the processing module 750a may take into account the differences in air pressures between all the air springs 730a of the air management system 700 so that the processing module 750a may determine the vehicle pitch and roll rates. The processing module 750a determines the flow rate needed to adjust the internal air pressure of its associated air spring 730a based on the vehicle roll and pitch rates. In one configuration, the calculated flow rate is based on how fast the height of the air spring 730a is changing in response to a load or displacement (i.e., height differential rate). Based on the height differential rate and the internal pressure of the air spring 730a and the differences between heights of the air springs 730a of the air management system 700, the processing module 750a is configured to determine the desired air pressure and flow rate needed to adjust the air spring 730a to provide optimal stability and comfort for the vehicle. After determining the desired air pressure and flow rate, the processing module 750a is configured to control the flow rate of air being exhausted from or supplied to its associated air spring 730a. While each control unit 740a may determine the desired air pressure for its associated air spring 730a based at least partly on the spring heights of the other air springs 730a, each control unit 740a acts independent to other control units 740a of the air management system. Accordingly, the air pressure for each air spring 730a of the air management system may be adjusted at a different rate, which ultimately orients the vehicle in a stable position at a faster rate.

In one configuration, each control unit 740a is configured to provide cross-flow between the first and second pneumatic circuits 710a, 720a when neither air is supplied from the supply tank 704a to the air springs 730a nor air is removed from the air springs 730a to the atmosphere. In operation, each time that the processing module 750a determines that the height or the air pressure of its associated air spring 730a does not need to be adjusted independently, the processing module 750a actuates the valve 746a to switch to its neutral state establishing pneumatic communication between the delivery port 744a and the cross-flow port 743a. The processing module 750a may determine to actuate the valve 746a to its neutral mode based on sensor input signals from its associated sensors 748a and data signals from the control units 740a of the other air springs 730a. In one configuration, the processing module 750a is configured to take into account a difference between a spring height of its associated air spring 730a and a second spring height of the second air spring 730a in determining to actuate the valve between the active mode and the neutral mode. In one configuration, the processing module 750a is configured to take into account a difference between the air pressure of its associated air spring 730a and a second air pressure of the second air spring 730a in determining to actuate the valve 746a between the active mode and the neutral mode. Once each control unit 740a actuates its associated valve 746a to its neutral mode, then pneumatic communication is established between the air spring 730a in the first pneumatic circuit 710a and the air spring 730a in the second pneumatic circuit 720a via the cross-flow line 760a. Accordingly, pressure differences between air springs 730a disposed on opposite sides of the vehicle are eliminated, providing a more stable ride for the vehicle. In various embodiments, the control unit 740 is configured to provide cross-flow between the first and second pneumatic circuits when the vehicle is traveling at any speed, include velocities substantially above zero miles-per-hour or kilometers-per-hour, so that the pressure differences between air springs 730a disposed on opposite sides of the vehicle are eliminated at any time during vehicle operation.

In one configuration, the processing module 750a is configured to receive measurement signals, such as height and pressure measurements of the air spring 730a, from the one or more sensors 748a and data signals from the communication interface 749a. The data signals may include measurement signals from control units 740a of other air springs 730a of the air management system 700. Based on the measurement and data signals, the processing module 750a is configured to calculate a current state of its associated air spring 730a, the current state of the other air springs 730a of the air management system 700, and a dynamic operating state of the vehicle. Based on the calculated current states of the air springs 730a and the dynamic operating state of the vehicle, the processing module 750a is configured to determine to actuate the valve 746a between the active mode and the neutral mode. In one configuration, the processing module 750a is configured to calculate a pressure differential or a height differential between the air springs 730a of the air management system 400 based on the received measurement and data signals. The processing module 750a is configured to actuate the valve 746a in the active mode when the pressure differential or the height differential between the air springs 730a is above a predetermined threshold and actuate the valve in a neutral mode when the pressure differential or height differential is below a predetermined threshold. Accordingly, when there is a substantial height difference between respective sides of the vehicle, the control unit 740a is configured to independently adjust the height of its air spring to bring the vehicle to a level condition at a faster rate. The control unit 740a may actuate the valve 746a in an active mode at any vehicle speed. On the other hand, when there is only a slight height differential between the respective sides of the vehicle that does not trigger a rolling condition, the control unit 740a is configured to mitigate any pressure differential between the air springs by establishing cross-flow between the air springs. The control unit 740a may actuate the valve in a neutral mode at any vehicle speed.

The current state of an air spring may include the current height of the air spring, the current internal pressure of the air spring, the height differential rate of the air spring, and/or the internal pressure differential rate of the air spring. The dynamic operating state of the vehicle may include the vehicle pitch rate and the vehicle roll rate. Vehicle pitch is a relative displacement between the front and rear of a vehicle, which may be represented by a rotation about a lateral axis passing through the center of mass of the vehicle. Accordingly, the vehicle pitch rate refers to the angular motion velocity of the vehicle about its lateral axis, the axis extending from one side to the opposite side of the vehicle. Vehicle roll is a relative displacement between two sides of a vehicle, which may be represented by a rotation about a longitudinal axis passing through the center mass of the vehicle. Accordingly, the vehicle roll rate refers to the angular motion velocity of the vehicle body relative to its longitudinal axis, i.e., the axis that extends from the back of the vehicle to front.

FIG. 20 shows an air management system 700b comprising a supply air tank 704b, a first pneumatic circuit 710b disposed on a first side of the vehicle, and a second pneumatic circuit 720b disposed on a second side of the vehicle. Each pneumatic circuit 710b, 720b, includes one or more air springs 730b. Each air spring 730b comprises a control unit 740b disposed within a chamber of the air spring 730b. The air management system 700b further comprises a system controller 770 that is operatively linked to the air springs 730b. The system controller 770 allows the air management system 700b to selectively supply air to or remove air from each air spring 730b of the air management system 700b. As shown in FIG. 20, a cross-flow line 760b connects the control unit 740b of an air spring 730b in the first pneumatic circuit 710b to a control unit 740b of an air spring 730b in the second pneumatic circuit 720b. The system controller 770 is configured to command each control unit 740b to provide cross-flow between the two air springs 730b of the first and second pneumatic circuits 710b, 720b when neither air is supplied from the supply tank 704b to the air springs 730b nor air is removed from the air springs 730b to the atmosphere, i.e., in the neutral mode.

Figure 23:
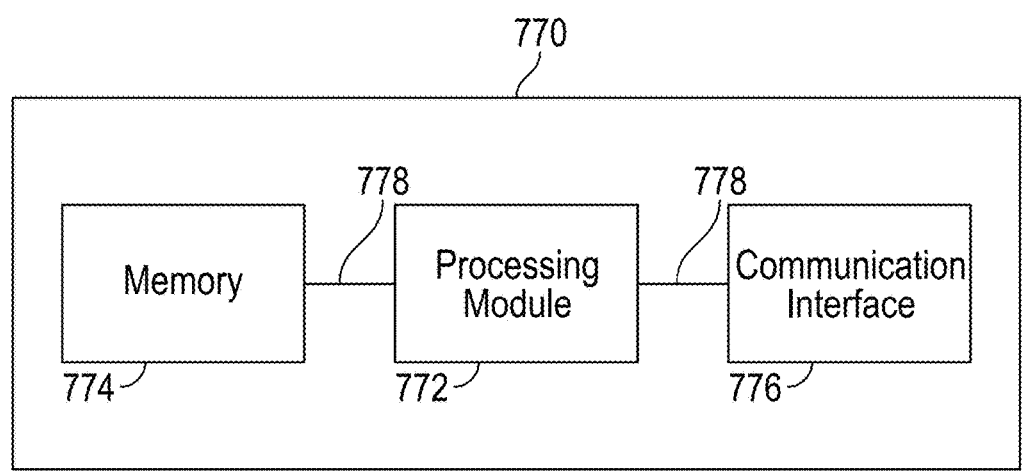
FIG. 23 is a schematic view of a system controller according to the present invention.

As shown in FIG. 23, the system controller 770 comprises a processing module 772 that may consist of one or more processors, central processing units, application specific integrated circuits, microprocessors, digital signal processors, microcontrollers or microcomputers. The system controller 770 comprises memory 774, such as read-only memory or random-access memory, to store all necessary software that embodies the control strategy and mathematical formulations for the operation of the system controller. The system controller 770 comprises a communication interface 776 for relaying signals to, from, and between the processing module 772 and the control units of other air springs 730b of the air management system 700b and/or other vehicle operating systems. The system controller 770 comprises a bus 778 that couples the various components of the system controller to the processing module 772. Accordingly, the system controller 770 is configured to receive all the necessary inputs to calculate a desired air pressure for each air spring 730b of the air management system 700b, determine the necessary air flow rate to alter the air pressure of each air spring 730b of the air management system 700b, and convey commands in terms of supplying or purging air to the control unit 740b of each air spring 730b of the air management system 700b.

Figure 24:
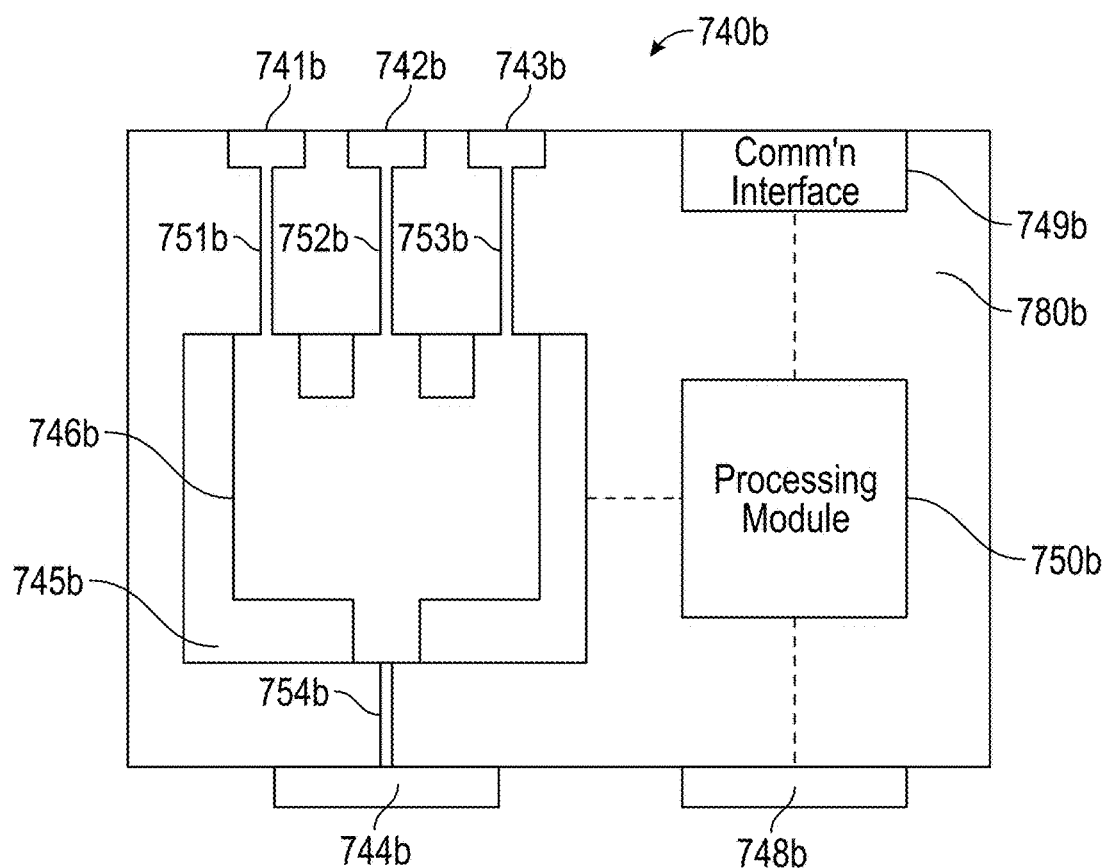
FIG. 24 is a schematic view of a control unit according to the present invention.

Similar to the control unit 740a shown in FIG. 22, the control unit 740b shown in FIG. 24 comprises an inlet port 741b disposed along a first surface of the housing 780b, an outlet port 742b disposed along the first surface of the housing 780b, a cross-flow port 743b disposed along a first surface of the housing 780b, a delivery port 744b disposed along a second surface of the housing 780b, a valve 746b disposed in a valve chamber 745b, one or more sensors 748b, a communication interface 749b, and a processing module 750b operatively linked to the one or more sensors 748b and the communication interface 749b. The control unit 740b differs from the control unit 740a shown in FIG. 22 in that the communication interface 749b comprises an antenna (not shown) that is configured to communicate wirelessly to the system controller 770.

The system controller 770 and the control units 740b are linked together to operate as a closed-loop control system to adjust the height of each air spring 730b to a desired height based on the monitored operating conditions of the vehicle. In operation, each control unit 740b transmits signals indicating the spring height and the internal air pressure of its associated air spring 730b to the system controller 770. In return, the system controller 770 determines the desired air pressure and the desired volumetric flow rate to remove and supply air to and from each air spring 730b based on the signals received from the control units 740b. In determining the desired air pressure for each air spring 730b, the system controller 770 may take into account the differences in air pressures and spring heights between all the air springs 730b of the air management system 700b. After determining the desired air pressure and flow rate for each air spring 730b, the system controller 770 transmits commands to the control unit of each air spring 730b of the air management system 700b, in which the command includes actuating the valves 746b of each control unit 740b between the active and neutral modes.

In one configuration, the system controller 770 is configured to provide cross-flow between the first and second pneumatic circuits 710b, 720b when neither air is supplied from the supply tank 704b to the air springs 730b nor air is removed from the air springs 730b to the atmosphere. In operation, each time that the system controller 770 determines that the height of the air springs 730b do not need to be adjusted independently, the system controller 770 transmits command signals to the control units 740b to actuate its respective valve 746b to its neutral mode. The system controller 770 may determine to command each control unit 740b to switch to its neutral mode based on height measurement signals received from the control units 740b. Once each control unit 740b actuates its associated valve 746b to its neutral mode, then pneumatic communication is established between the air spring 730b in the first pneumatic circuit 710b and the air spring 730b in the second pneumatic circuit 720b via the cross-flow line 760b. Accordingly, pressure differences between air springs 730b disposed on opposite sides of the vehicle are eliminated, providing a more stable ride for the vehicle.

Figure 21A:
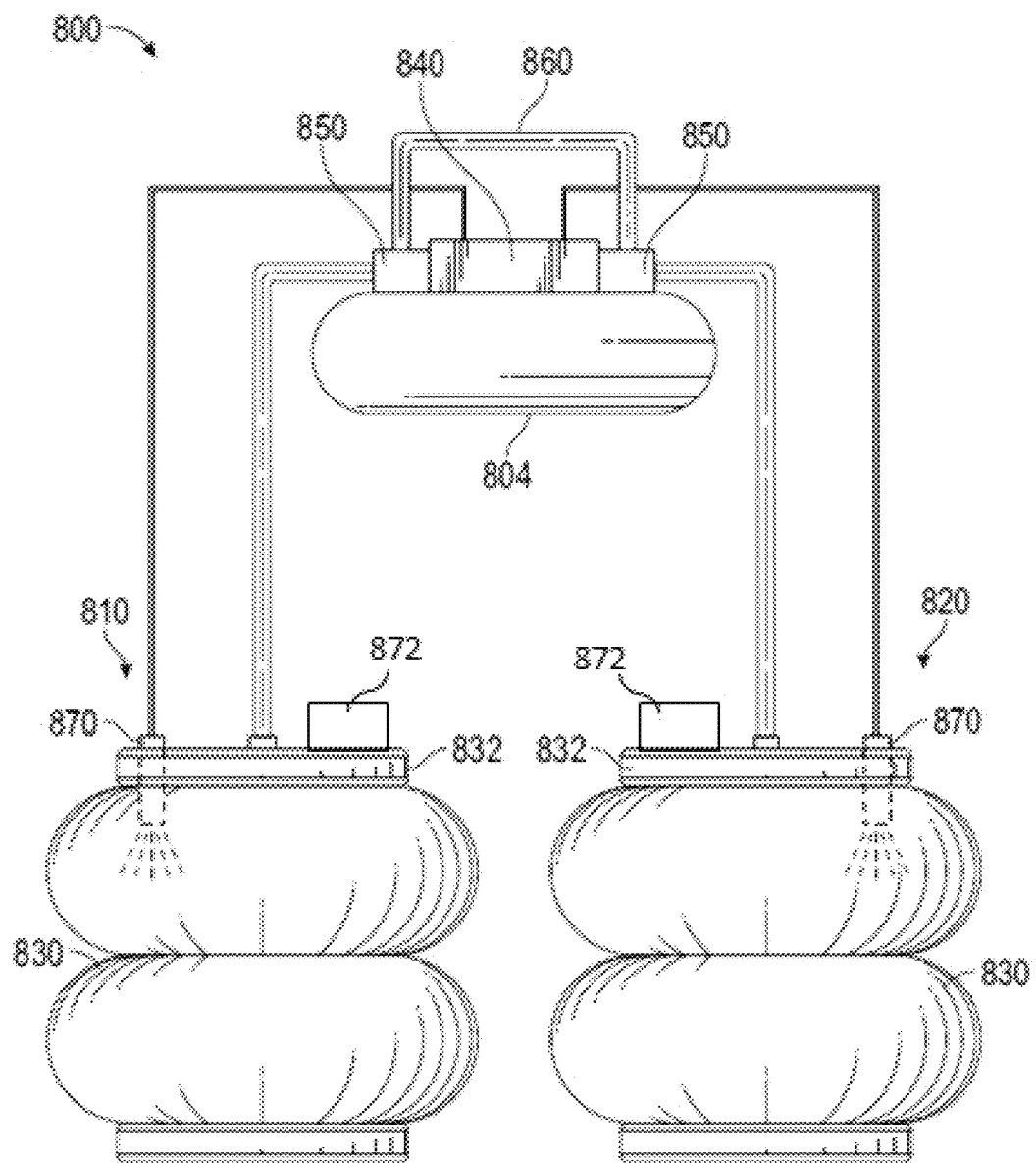
FIG. 21A is a schematic view of an air management system according to the present invention.

FIG. 21A shows an air management system 800 comprising a supply air tank 804, a first pneumatic circuit 810 disposed on a first side of the vehicle, and a second pneumatic circuit 820 disposed on a second side of the vehicle. Each pneumatic circuit 810, 820 includes one or more air springs 830. The air management system 800 further comprises a system controller 840 and a plurality of valves 850 operatively linked to the system controller 840. Referring to FIG. 21A, one of the valves 850 is deposed in the first pneumatic circuit 810, and the other one of the valves 850 is disposed in the second pneumatic circuit 820. The system controller 840 allows the air management system 800 to selectively supply air to or remove air from each air spring 830 of the air management system 800 by actuating the plurality of valves 850.

As shown in FIG. 21A, a cross-flow line 860 connects one valve 850 in the first pneumatic circuit 810 to a valve 850 in the second pneumatic circuit 820, thereby establishing a pneumatic communication between the air springs 830 of the first and second pneumatic circuits 810, 820. Each valve 850 is configured to switch between a plurality of states, including a first mode in which air is released out of the air spring 830, a second mode in which the air is supplied into the spring 830, a neutral mode in which the air spring 830 is pneumatically connected to the cross-flow line 860. The system controller 840 is configured to command each valve 850 to switch to a neutral mode to provide cross-flow between the two air springs 830 of the first and second pneumatic circuits 810, 820 when neither air is supplied from the supply tank 804 to the air springs 830 nor air is removed from the air springs 830 to the atmosphere.

Referring to FIG. 21A, a height sensor 870 is disposed in the top plate 832 of each air spring 830 and is configured to continuously monitor the height of its associated air spring 830. The height sensor 870 may be any suitable device for monitoring the axial height of the air spring, such as the examples described above. Each height sensor 870 is wired to the system controller 840 so that each height sensor 870 may transmit signals indicating the height of its associated air spring 830 to the system controller 840. In other configurations, the air management system 800 may include an air pressure sensor disposed in the top plate of the 832 of each air spring 830. The air pressure sensor is configured to monitor the air pressure of its associated air spring 830 and generate a signal indicating the air pressure of its associated air spring.

Figure 25:
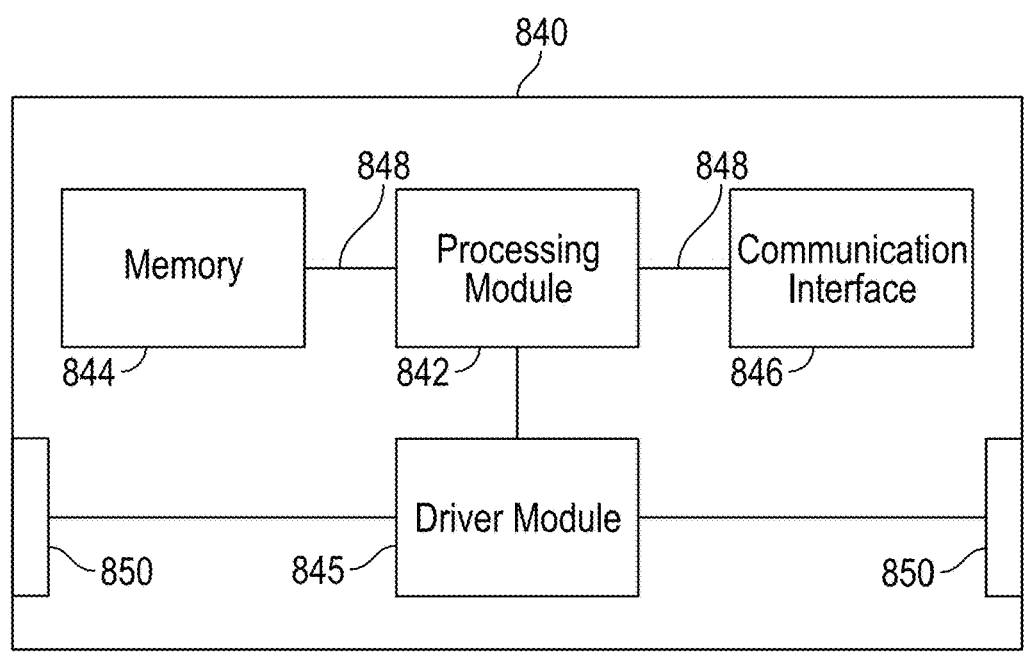
FIG. 25 is a schematic view of a system controller according to the present invention.

Similar to the system controller shown in FIG. 23, the system controller 840 shown in FIG. 25 comprises a processing module 842 for determining the desired air pressure and flow rate for each air spring 830 of the air management system 800, a communication interface 846 for relaying signals to and from the processing module 842 and the height sensors of the air springs 830, a memory 844 for storing all necessary software that embodies the control strategy and mathematical formulations for the operation of the system controller 840, and a bus 848 connecting the communication interface 846 and memory 84 to the processing module 842. The system controller 840 further comprises a driver module 845, such as a driving circuit, operatively linking the processing module 842 to each valve 850 such that the system controller 840 may selectively actuate valve 850. The processing module 842 of the system controller 840 may signal the driver module 845 to actuate the valve 850 in any suitable manner, such as by pulse width modulation or hit-and-hold actuation. Accordingly, the system controller 840 is configured to receive all the necessary inputs to calculate a desired air pressure for each air spring of the air management system 800, determine the necessary air flow rate to alter the air pressure of each air spring 830 of the air management system 800, and actuate at least one of the valves 850 to adjust the air pressure and height of at least one of the springs 830 of the air management system 800.

In one configuration, the system controller 840 is configured to provide cross-flow between the first and second pneumatic circuits 810, 820 when neither air is supplied from the supply tank 804 to the air springs 830 nor air is removed from the air springs 830 to the atmosphere. In operation, each time that the system controller 840 determines that air does not need to be removed or added to the air springs 830, the system controller 840 actuates each valve 850 to its neutral mode. The system controller 840 may determine to actuate the valves 850 to the neutral mode when the pressure differentials between the air springs 830 are within a predetermined tolerance. The system controller 840 may calculate the pressure differentials between the air springs 830 based on signals received from the pressure sensors of the air springs 830. The system controller 840 may determine to actuate the valve 850 to its neutral mode based on height measurement signals received from the height sensors 870. The system controller 840 may take into account the height differences between the air springs 830 when determining whether to actuate the valves to an active mode (i.e., the first or second modes) or a neutral mode. Once each valve 850 is actuated to its neutral mode, then pneumatic communication is established between the air spring 830 in the first pneumatic circuit 810 and the air spring 830 in the second pneumatic circuit 820 via the cross-flow line 860. Accordingly, pressure differences between air springs 830 disposed on opposite sides of the vehicle are eliminated, providing a more stable ride for the vehicle.

Figure 21B:
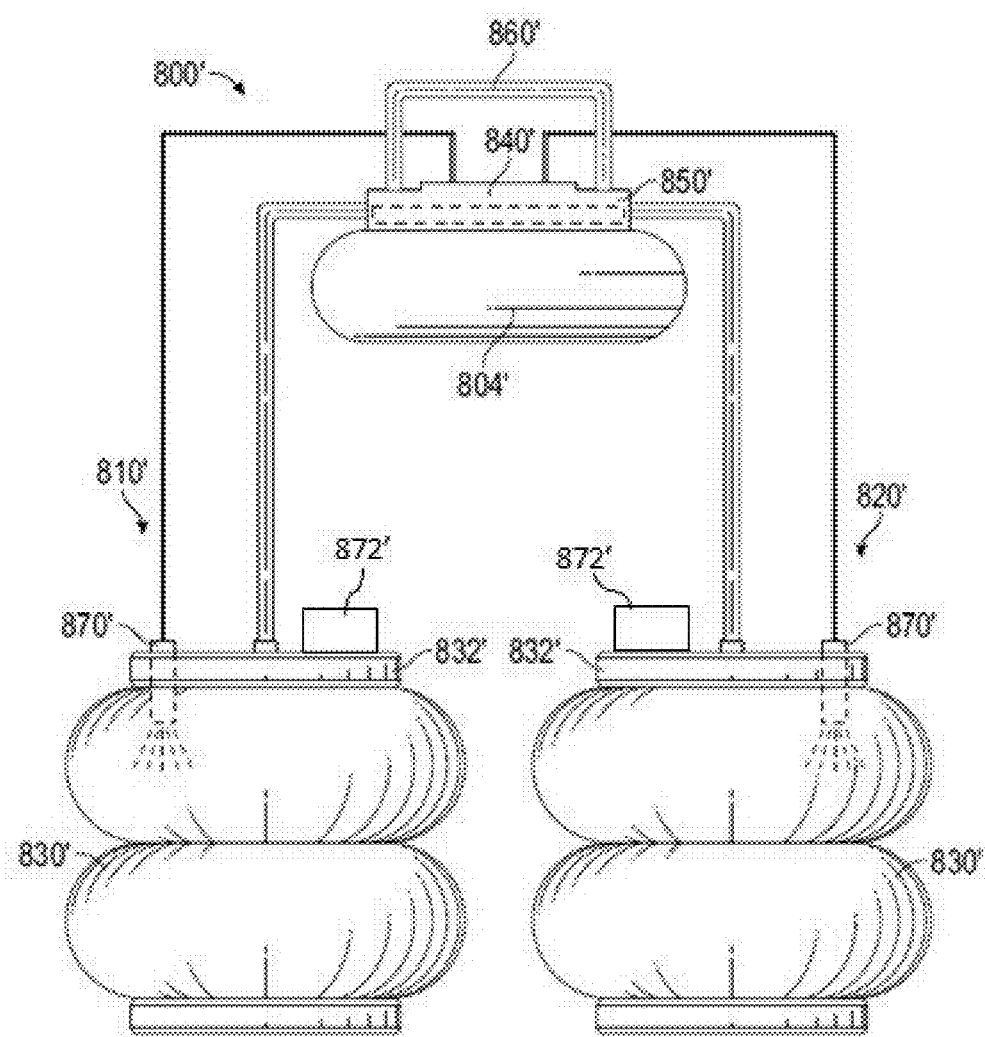
FIG. 21B is a schematic view of an air management system according to the present invention.

FIG. 21B illustrates an air management system 800' according to one configuration of the present invention. The air management system 800' is similar to the air management system 800 of FIG. 21A except that the system controller 840' comprises a single valve 850' that is pneumatically connected to each air spring 830 of the air management system 800'. Accordingly, the system controller 840' may selective supply or remove air from the air springs 830 through the use of only one valve 850'. In one configuration, the system controller 840' is configured to calculate a difference between the air pressures of the air springs 830 based on received measurement signals from the sensor. If the system controller 840' determines that the difference between the air pressures of the air springs 830 is within a predetermined tolerance, then system controller 840' actuates the valve 850' to set the air pressure of each air spring 830 to the same air pressure.

Figure 45:
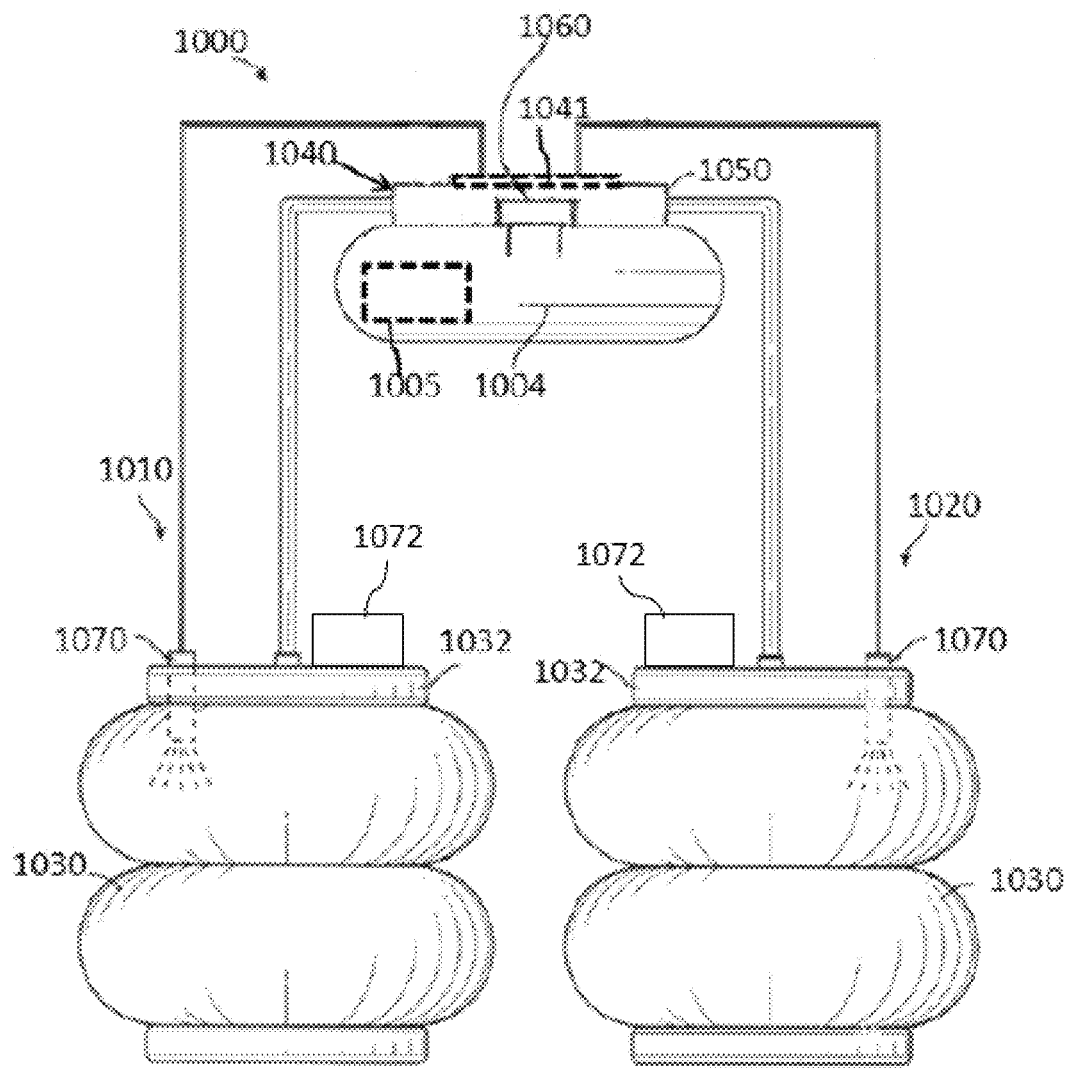
FIG. 45 is a schematic view of an air management system according to the present disclosure.

FIG. 45 shows an air management system 1000 comprising a supply air tank 1004, a first pneumatic circuit 1010 disposed on a first side of the vehicle, and a second pneumatic circuit 1020 disposed on a second side of the vehicle. Each pneumatic circuit 1010, 1020 includes one or more air springs 1030. In one example, the air management system 1000 includes an air compressor 1005 located within the air tank 1004 and configured to generate air pressure such that the air tank 1004 can supply air to the first and second pneumatic circuits 1010, 1020. In other examples, the air management system 1000 includes an air compressor disposed outside the air tank 1004 and connected to the air tank 1004 via a hose. The air management system 1000 further comprises a system controller 1040 comprising a manifold housing 1050 integrally attached to the supply air tank 1004, a valve unit 1060 disposed in the manifold housing 1050, and a printed circuit board 1041 secured to a top side of the manifold housing 1050. As illustrated in FIG. 51A and described in more detail herein, the manifold housing 1050 comprises a plurality of ports and passages to establish communication between the supply tank 1004, the pneumatic circuits 1010, 1020, and the atmosphere, and the valve unit 1060 comprises a plurality of valves configured to selectively supply air from the air tank 1004, remove air to the atmosphere, or establish cross-flow for each of the first and second pneumatic circuits 1010, 1020. The system controller 1040 is configured to selectively supply air to or remove air from each air spring 1030 of the air management system 1000 by actuating the plurality of valves in the valve unit 1060.

Some non-limiting examples of the manifold housing 1050, 1050B and the valve unit 1060, 1065 are further described in FIGS. 51A, 51B. Referring to FIG. 51A, the manifold housing 1050 includes a first port 1051 connected to the first pneumatic circuit 1010, a second port 1052 connected to the second pneumatic circuit 1020, an exhaust port 1057 configured to exhaust air to the atmosphere, and first and second tank ports 1058A, 1058B configured to supply air from the air tank 1004. The manifold housing 1050 further comprises a first passage 1053 connecting the first tank port 1058A to the first port 1051 and a second passage 1054 connecting the second tank port 1058B to the second port 1052. The manifold housing 1050 further comprises an exhaust passage 1055 and a cross flow passage 1056 connected to both the first and second passages 1053 and 1054. In some examples, the manifold housing 1050 is formed from aluminum metal.

As shown in FIG. 51A, the valve unit 1060 comprises a plurality of valves, e.g., valves 1061-1063, including but not limited to: a first valve 1061, a second valve 1062, and a third valve 1063. In one example, each of the valves 1061-1063 comprises multiple solenoid valves to selectively establish pneumatic communication between any one of the supply tank 1004 and the exhaust port 1057 and any one of the first and second pneumatic circuits 1010, 1020. The first valve 1061 includes a first solenoid valve 1061A and a second solenoid valve 1061B disposed at an intersection between first passage 1053 and the cross flow passage 1056. The second valve 1062 includes a first solenoid valve 1062A and a second solenoid valve 1062B disposed at an intersection between the second passage 1054 and the cross flow passage 1056. The third valve 1063 includes a first solenoid valve 1063A, a second solenoid valve 1063B, and a third solenoid valve 1063C disposed at an intersection between the exhaust passage 1055 and the cross flow passage 1056.

In one example, the plurality of valves 1061-1063 are synced to operate under a plurality of modes so that the valves 1061-1063 selectively establish pneumatic communication between any one of the supply tank 1004 or the exhaust port 1057 and any one of the first or second pneumatic circuits 1010, 1020. The plurality of modes include a closed mode, in which the all the solenoid valves in valves 1061-1063 are closed, so that air is not transferred between any one of the supply tank 1004 or the exhaust port 1057 and any one of the first and second pneumatic circuits 1010, 1020. The plurality of modes includes a cross-flow mode, in which cross flow is established between the first and second pneumatic circuits 1010, 1020. At the cross-flow mode, the first solenoid valves 1061A, 1062A of the first and second valves 1061, 1062 and the first and second solenoid valves 1063A, 1063B of the third valve 1063 are opened, and the second solenoid valves 1061B, 1062B of the first and second valves 1061, 1062 and the third solenoid valve 1063C of the third valve 1063 are closed.

The plurality of modes includes a first inflate mode, in which air is supplied only to the first pneumatic circuit 1010 without any air flow to or from the second pneumatic circuit 1020. At the first inflate mode, the first and second solenoid valves 1061A, 1061B of the first valve 1061 are open, while the rest of the solenoid valves in the second and third valves 1062, 1063 are closed. The plurality of modes include a second inflate mode, in which air is supplied only to the second pneumatic circuit 1020 without any air flow to or from the first pneumatic circuit 1010. At the second inflate mode, the first and second solenoid valves 1062A, 1062B of the second valve 1062 are open, while the rest of the solenoid valves in the first and third valves 1061, 1063 are closed. The plurality of modes include a third inflate mode, in which air is supplied to both the first and second pneumatic circuits 1061, 1062. At the third inflate mode, the first and second solenoid valves 1061A-B, 1062A-B of the first and second valves 1061, 1062 are open, while all the solenoid valves 1063A-C of the third valve 1063 are closed.

The plurality of modes includes a first purge mode, in which air is removed only from the first pneumatic circuit 1010 without any air flow to or from the second pneumatic circuit 1020. At the first purge mode, the first solenoid valve 1061A of the first valve 1061, the first and third solenoid valves 1063A, 1063C of the third valve 1063 are open, while the second solenoid valve 1061B of the first valve 1061, the second solenoid valve 1063B of the third valve 1063, and all the solenoid valves 1062A, 1062B of the second valve 1062 are closed. The plurality of modes includes a second purge mode, in which air is removed only from the second pneumatic circuit 1020 without any air flow to or from the first pneumatic circuit 1010. At the second purge mode, the first solenoid valve 1062A of the second valve 1062, the second and third solenoid valves 1063B, 1063C of the third valve 1063 are open, while the second solenoid valve 1062B of the second valve 1062, the first solenoid valve 1063A of the third valve 1063, and all the solenoid valves 1061A, 1061B of the first valve 1061 are closed. The plurality of modes includes a dump mode, in which air is removed from both the first and second pneumatic circuits 1010, 1020. At the dump mode, all the solenoid valves 1063A-C of the third valve and the first solenoid valve 1061A, 1062A of the first and second valves 1061, 1062 are open, while the second solenoid valves 1061B, 1062B of the first and second valves 1061, 1062 are closed.

The plurality of modes includes a first combination mode, in which air is removed from the first pneumatic circuit 1010 and air is supplied to the second pneumatic circuit 1020. At the first combination mode, the first solenoid valve 1061A of the first valve 1061, the first and second solenoid valves 1062A, 1062B of the second valve 1062, and the first and third solenoid valves 1063A, 1063C of the third valve 1063 are open, while the second solenoid valve 1061B of the first valve 1061 and the second solenoid valve 1063B of the third valve 1063 are closed. The plurality of modes includes a second combination mode, in which air is removed from the second pneumatic circuit 1020 and air is supplied to the first pneumatic circuit 1010. At the second combination mode, the first solenoid valve 1062A of the second valve 1062, the first and second solenoid valves 1061A, 1061B of the first valve 1061, and the second and third solenoid valves 1063B, 1063C of the third valve 1063 are open, while the second solenoid valve 1062B of the second valve 1062 and the first solenoid valve 1063A of the third valve 1063 are closed.

Referring to FIG. 51B, the manifold housing 1050B includes a first port 1051 connected to the first pneumatic circuit 1010, a second port 1052 connected to the second pneumatic circuit 1020, an exhaust port 1057 configured to exhaust air to the atmosphere, and a tank port 1058 configured to supply air from the air tank 1004. The manifold housing 1050B further comprises a supply passage 1053B pneumatically connecting the tank port 1058 to the valve unit that includes four-way valve 1065, an exhaust passage 1055B pneumatically connecting the exhaust port 1057 to the valve unit that includes four-way valve 1065, and a flow passage 1056B connecting the valve unit that includes four-way valve 1065 with the first and second ports 1051, 1052.

As shown in FIG. 51B, the valve unit is a four-way valve 1065 that includes a first flow valve 1065A, a second flow valve 1065B, a third flow valve 1065C, and a fourth flow valve 1065D disposed at an intersection between the supply passage 1053B, exhaust passage 1055B, and flow passage 1056B. In one example, each of the flow valves 1065A-D is a solenoid valve, similar to the examples (e.g., valve 746a shown in FIG. 26A) described above, and each is configured to switch between multiple positions to selectively establish pneumatic communication between any one of the supply tank 1004 and the exhaust port 1057 and any one of the first and second pneumatic circuits 1010, 1020.

In one example, the first, second, third, and fourth flow valves 1065A-D are synced to operate under a plurality of modes such that the four-way valve 1065 may selectively establish pneumatic communication between any one of the supply tank 1004 or the exhaust port 1057 and any one of the first or second pneumatic circuits 1010, 1020. The plurality of modes include a closed mode, in which the all the flow valves 1065A-D are closed, so that air is not transferred between any one of the supply tank 1004 or the exhaust port 1057 and any one of the first and second pneumatic circuits 1010, 1020. The plurality of modes includes a cross-flow mode, in which cross flow is established between the first and second pneumatic circuits 1010, 1020. At the cross-flow mode, the third and fourth flow valves 1065C, 1065D are switched to a position establishing communication between the first and second ports 1051 and 1052, and the first and second flow valves 1065A, 1065D are closed.

The plurality of modes include a first inflate mode, in which air is supplied only to the first pneumatic circuit 1010 without any air flow to or from the second pneumatic circuit 1020. At the first inflate mode, the first and third flow valves 1065A, 1065C are switched to a position establishing communication between the supply passage 1053B and the flow passage 1056B, while the second and fourth flow valves 1065B, 1065D are closed. The plurality of modes include a second inflate mode, in which air is supplied only to the second pneumatic circuit 1020 without any air flow to or from the first pneumatic circuit 1010. At the second inflate mode, the first and fourth flow valves 1065A, 1065D are switched to a position establishing communication between the supply passage 1053B and the flow passage 1056B, while the second and third flow valves 1065B, 1065C are closed. The plurality of modes include a third inflate mode, in which air is supplied to both the first and second pneumatic circuits 1061, 1062. At the third inflate mode, the first, third, and fourth flow valves 1065A, 1065C, and 1065D are switched to a position establishing communication between the supply passage 1053B and the flow passage 1056B, while the second flow valve 1065B is closed.

The plurality of modes includes a first purge mode, in which air is removed only from the first pneumatic circuit 1010 without any air flow to or from the second pneumatic circuit 1020. At the first purge mode, the second and third flow valves 1065B, 1065C are switched to a position establishing communication between the exhaust passage 1055B and the flow passage 1056B, while the first and fourth flow valves 1065A, 1065D are closed. The plurality of modes includes a second purge mode, in which air is removed only from the second pneumatic circuit 1020 without any air flow to or from the first pneumatic circuit 1010. At the second purge mode, the second and fourth flow valves 1065B, 1065D are switched to a position establishing communication between the exhaust passage 1055B and the flow passage 1056B, while the first and third flow valves 1065A, 1065C are closed. The plurality of modes includes a dump mode, in which air is removed from both the first and second pneumatic circuits 1010, 1020. At the dump mode, the second, third, and fourth flow valves 1065B-D are switched to a position establishing communication between the exhaust passage 1055B and the flow passage 1056B, while the first flow valve 1065A is closed.

The plurality of modes includes a first combination mode, in which air is removed from the first pneumatic circuit 1010 and air is supplied to the second pneumatic circuit 1020. At the first combination mode, the second and third flow valves 1065B, 1065C are switched to a position establishing communication between the exhaust passage 1055B and the flow passage 1056, while the first and fourth flow valves 1065A, 1065D are switched to a position establishing communication between the supply passage 1053B and the flow passage 1056B. The plurality of modes includes a second combination mode, in which air is removed from the second pneumatic circuit 1020 and air is supplied to the first pneumatic circuit 1010. At the second combination mode, the second and fourth flow valves 1065B, 1065D are switched to a position establishing communication between the exhaust passage 1055B and the flow passage 1056, while the first and third flow valves 1065A, 1065C are switched to a position establishing communication between the supply passage 1053B and the flow passage 1056B.

Referring to FIG. 45, a height sensor 1070 is disposed in the top plate 1032 of each air spring 1030 and is configured to continuously monitor the height of its associated air spring 1030. The height sensor 1070 may be any suitable device for monitoring the axial height of the air spring, such as the examples described above. Each height sensor 1070 is wired to the system controller 1040 so that each height sensor 1070 may transmit signals indicating the height of its associated air spring 1030 to the system controller 1040. In one example, the height sensor 1070 is wired to the printed circuit board 1041 such that the processing module 1042 of the system controller 1040 receives inputs from the height sensor 1070 via the communication interface 1044. In other, non-limiting examples, the height sensor 1070 may be wirelessly connected to the system controller 1040 such that the communication interface 1044 receives wireless signals from the height sensor 1070.

Referring to FIG. 45, an inertial sensor unit 1072 is optionally disposed on the top plate 1032 of each air spring 1030. The inertial sensor unit 1072 may include the same type of sensors as the aspect described in FIG. 55, which includes an accelerometer, a gyroscope, and a magnetometer. Each inertial sensor unit 1072 may transmit signals indicating the acceleration, angular velocity, and the magnetic force with respect to one or more axes of the vehicle to the system controller 1040. In some examples, the inertial sensor unit 1072 is wired to the system controller 1040 such that the inertial sensor unit 1072 transmits signals along a cable. In some examples, the inertial sensor unit 1072 transmits signals wirelessly to the system controller 1040.

Similar to the examples described in FIGS. 23 and 25, the system controller 1040 of FIG. 52 comprises a printed-circuit-board that includes a processing module 1042 for determining the desired air pressure and flow rate for each air spring 1030 of the air management system 1000, a communication interface 1044 for relaying signals to and from the processing module and the height sensors of the air springs 1030, a memory 1046 for storing all necessary software that embodies the control strategy and mathematical formulations for the operation of the system controller 1040, and a bus 1048 connecting the communication interface 1044 and memory 1046 to the processing module 1042. As shown in FIG. 52, the system controller 1040 further comprises a driver module 1045, such as a driving circuit, operatively linking the processing module 1042 to each valve (e.g., valves 1061-1064) of the valve unit 1060 such that the system controller 1040 may selectively actuate each respective valve. The processing module 1042 of the system controller 1040 may signal the driver module 1045 to actuate the respective valve in any suitable manner, such as by pulse width modulation or hit-and-hold actuation. Accordingly, the system controller 1040 is configured to receive all the necessary inputs to calculate a desired air pressure for each air spring of the air management system 1000, determine the necessary air flow rate to alter the air pressure of each air spring 1030 of the air management system 1000, and actuate at least one of the valves to adjust the air pressure and height of at least one of the springs 1030 of the air management system 1000.

Figure 46:
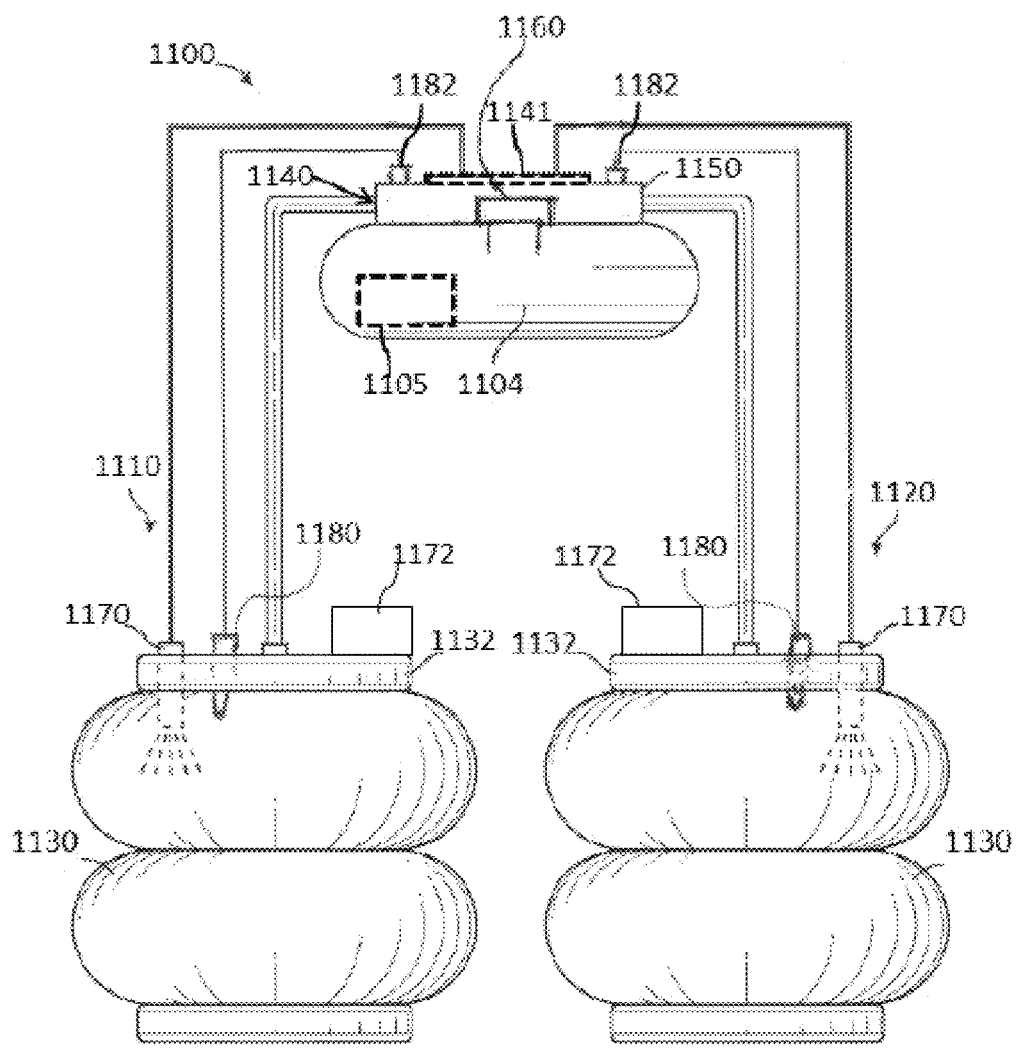
FIG. 46 is a schematic view of an air management system according to the present disclosure.

FIG. 46 shows an air management system 1100 comprising a supply air tank 1104, a first pneumatic circuit 1110 disposed on a first side of the vehicle, and a second pneumatic circuit 1120 disposed on a second side of the vehicle. Each pneumatic circuit 1110, 1120 includes one or more air springs 1130. In one example, the air management system 1100 includes an air compressor 1105 located within the air tank 1004 and configured to generate air pressure such that the air tank 1104 can supply air to the first and second pneumatic circuits 1110, 1120. In such a configuration, the air management system 1100 provides further advantages in terms of compact design, protection from environmental elements, and significant noise reduction allowing the air management system to be used in any type of vehicle. Accordingly, the present disclosure provides a method of reducing noise, protecting system components and increasing longevity, and providing universal installation capabilities to the air management system.

When the air compressor 1105 is located in the air tank 1004, the air compressor 1105 may be rigidly installed in the air tank 1004 so as to reduce, inhibit or prevent noise and vibrations of the compressor and avoid damage to the compressor, tank, valves, lines, and other air management system 1100 components from dynamic driving vibrations and impacts. For example, a movement-resistant (fixed) installation is performed using brackets, braces, rods, longitudinal frame rails, fasteners, interlocking mounting members on the outer surface of the air compressor 1105 and on the inner surface the air tank 1004.

In other examples, the air management system 1100 includes an air compressor disposed outside the air tank 1104 and connected to the air tank 1104 via a hose. Similar to the example described in FIG. 45, the air management system 1100 further comprises a system controller 1140 comprising a manifold housing 1150 integrally attached to the supply air tank 1104, a valve unit 1160 disposed in the manifold housing 1150, and a printed circuit board 1141 secured to a top side of the manifold housing 1150. Similar to the example described in FIGS. 51A, 51B, the manifold housing 1150 comprises a plurality of ports and passages to establish communication between the supply tank 1104, the pneumatic circuits 1110, 1120, and the atmosphere, and the valve unit 1160 comprises a plurality of valves configured to selectively supply air from the air tank 1104, remove air to the atmosphere, or establish cross-flow for each of the first and second pneumatic circuits 1110, 1120. Similar to the examples described in FIGS. 45 and 52, the system controller 1140 is configured to selectively supply air to or remove air from each air spring 1130 of the air management system 1100 by actuating the plurality of valves in the valve unit 1160.

Referring to FIG. 46, the air management system 1100 further comprises a height sensor 1170, a first proportional control sensor 1180 disposed in the top plate 1132 of each air spring 1130, and second proportional control sensors 1182 disposed in the manifold housing 1150. The height sensor 1170 is configured to continuously monitor the height of its associated air spring 1130 and relay signals indicating the height of the air spring 1130 to the system controller 1140. The first proportional control sensor 1180 is configured to monitor the air pressure of its associated air spring 1130 and relay signals indicating the air pressure of the air spring 1130 to the system controller 1140. The second proportional sensor 1182 is configured to measure the air pressure of a respective port (e.g., first port 1051, second port 1052) connected to one of the pneumatic circuits (e.g., first pneumatic circuit 1110, 1120). Accordingly, the system controller 1140 may calculate the height of the air springs 1130 based on signals received from the height sensor 1170, and then, determine the desired air pressure for each associated air spring 1030 based on calculated heights and the desired flow rate needed to adjust the air spring 1030 to provide optimal stability and comfort for the vehicle. Then, the controller 1140 transmits commands to the valve unit 1160, thereby selectively actuating the individual valves to provide the desired flow rate to each air spring 1130. After actuating the valves of the valve unit 1160, the system controller 1140 may receive signals from the first and second proportional control sensors 1180, 1182 to determine the altered air pressure of the air springs 1130. Thus, the proportional control sensors 1180, 1182 provide feedback to the system controller 1140 so that the system controller 1140 can determine the lag time for air to travel between the valve unit 1160 and each air spring 1130 based on signals received from the proportional control sensor 1180.

Referring to FIG. 46, an inertial sensor unit 1172 is optionally disposed on the top plate 1132 of each air spring 1130. The inertial sensor unit 1172 may include the same type of sensors as the aspect described in FIG. 55, which includes an accelerometer, a gyroscope, and a magnetometer. Each inertial sensor unit 1172 may transmit signals indicating the acceleration, angular velocity, and the magnetic force with respect to one or more axes of the vehicle to the system controller 1140. In some examples, the inertial sensor unit 1172 is wired to the system controller 1140 such that the inertial sensor unit 1172 transmits signals along a cable. In some examples, the inertial sensor unit 1172 transmits signals wirelessly to the system controller 1140.

Figure 47:
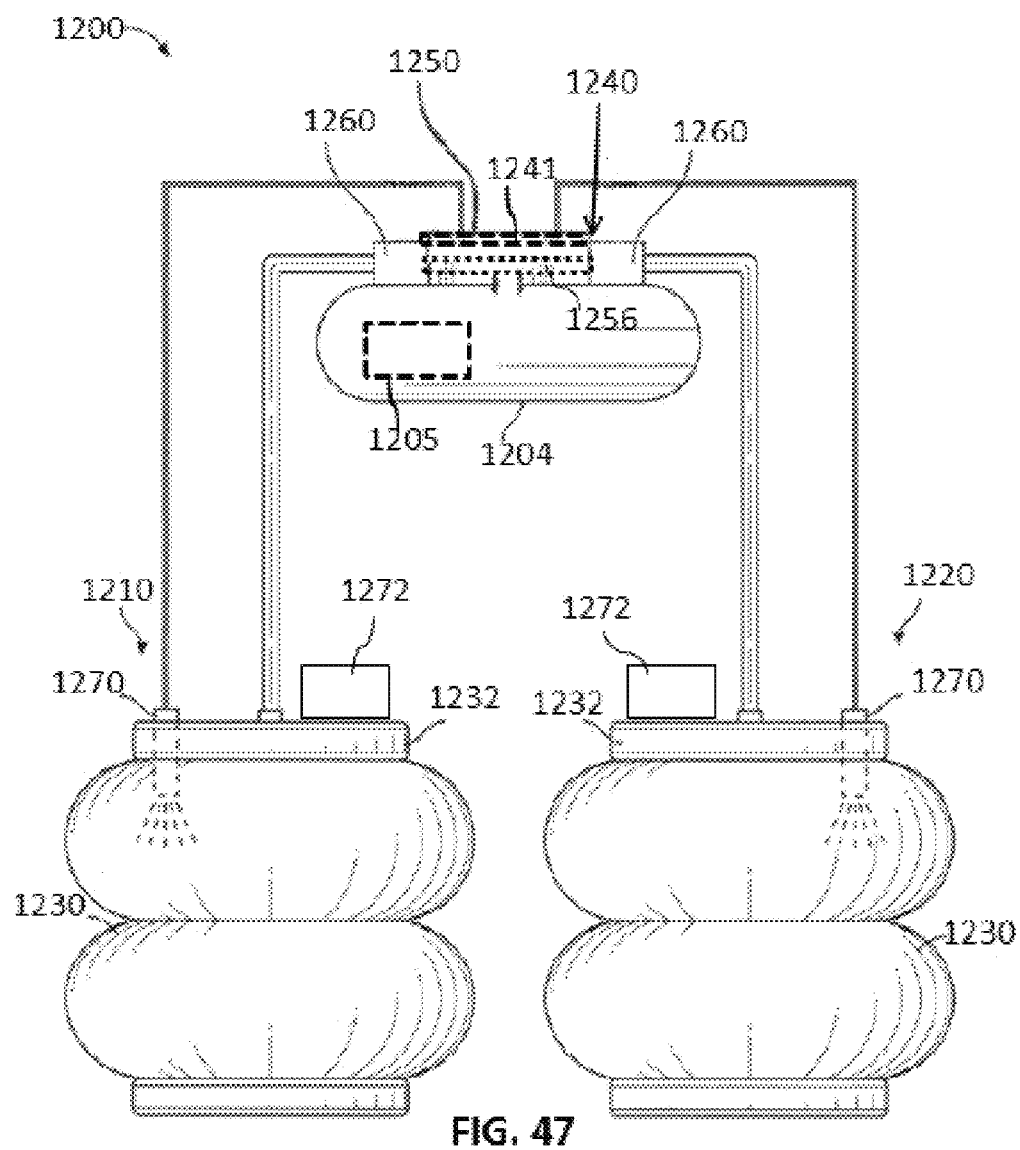
FIG. 47 is a schematic view of an air management system according to the present disclosure.

FIG. 47 shows an air management system 1200 comprising a supply air tank 1204, a first pneumatic circuit 1210 disposed on a first side of the vehicle, and a second pneumatic circuit 1220 disposed on a second side of the vehicle. Each pneumatic circuit 1210, 1220 includes one or more air springs 1230. In one example, the air management system 1200 includes an air compressor 1205 located within the air tank 1204 and configured to generate air pressure such that the air tank 1204 can supply air to the first and second pneumatic circuits 1210, 1220. In other examples, the air management system 1200 includes an air compressor disposed outside the air tank 1204 and connected to the air tank 1204 via a hose. The air management system 1200 further comprises a system controller 1240 comprising a manifold housing 1250 integrally attached to the supply air tank 1204, a pair of leveling valves 1260 disposed at each end of the manifold housing 1250, and a printed circuit board 1241 secured to the top side of the manifold housing 1250. As will be described in more detail in FIG. 53, the manifold housing 1250 comprises a plurality of ports and passages to establish communication between the supply tank 1204, the pneumatic circuits 1210, 1220, and the atmosphere. In one example, the manifold housing 1250 includes a cross-flow passage 1256 establishing pneumatic communication between the leveling valves 1260 on each end of the system controller 1240. Each leveling valve 1260 is configured to selectively supply air from the air tank 1204 to one of the pneumatic circuits 1210, 1220, remove air from the one of the pneumatic circuits 1210, 1220 to the atmosphere, or establish cross-flow for between first and second pneumatic circuits 1210, 1220. Similar to the examples described in FIGS. 45 and 46, the system controller 1240 is configured to selectively supply air to or remove air from each air spring 1230 of the air management system 1200 by actuating the valves 1260.

Referring to FIG. 47, an inertial sensor unit 1272 is optionally disposed on the top plate 1232 of each air spring 1230. The inertial sensor unit 1272 may include the same type of sensors as the aspect described in FIG. 55, which includes an accelerometer, a gyroscope, and a magnetometer. Each inertial sensor unit 1272 may transmit signals indicating the acceleration, angular velocity, and the magnetic force with respect to one or more axes of the vehicle to the system controller 1240. In some examples, the inertial sensor unit 1272 is wired to the system controller 1240 such that the inertial sensor unit 1272 transmits signals along a cable. In some examples, the inertial sensor unit 1272 transmits signals wirelessly to the system controller 1240.

Figure 53:
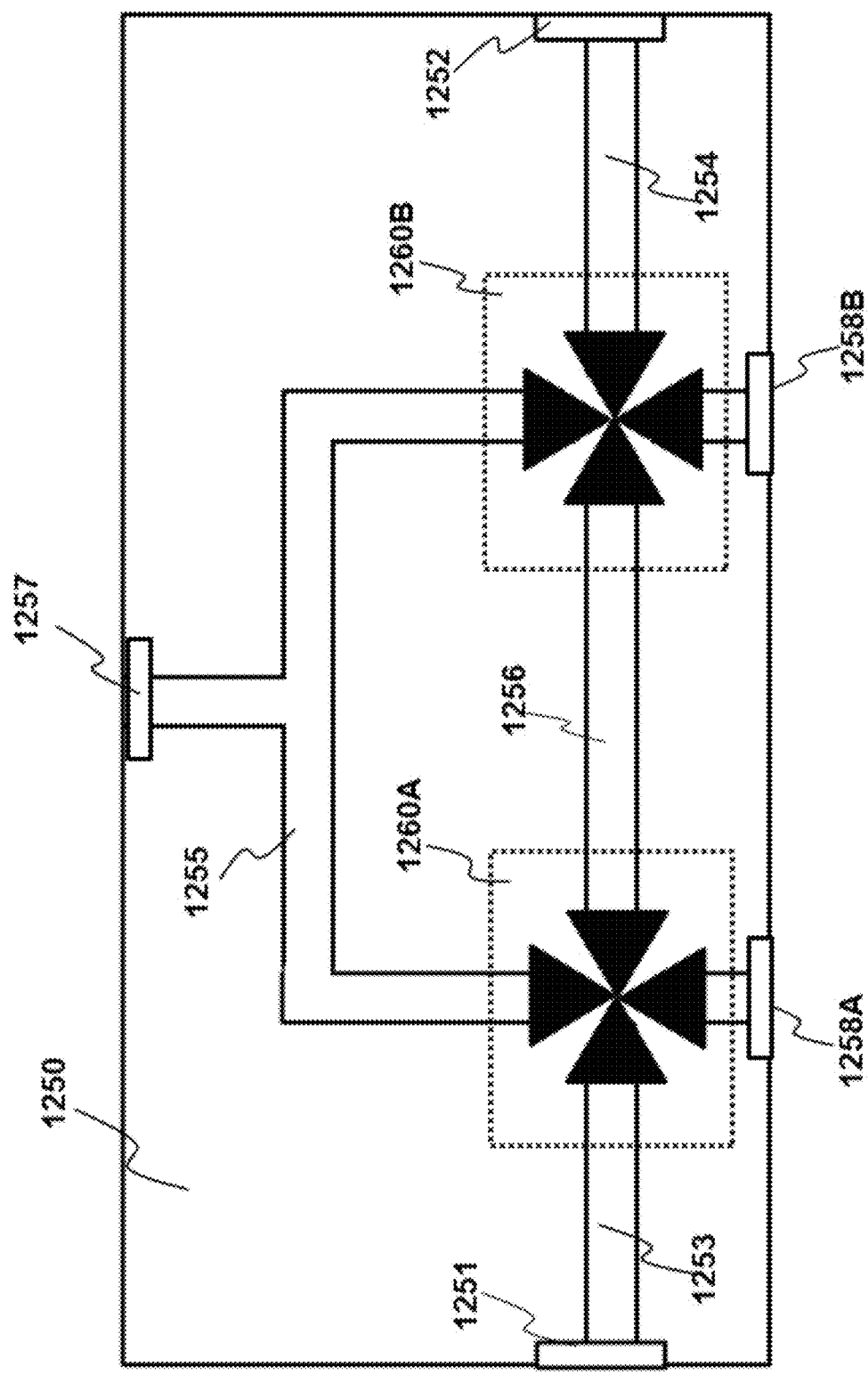
FIG. 53 is a schematic view of a manifold housing according to the present disclosure.

One non-limiting example of the manifold housing 1250 and the leveling valves 1260 are further described in FIG. 53. Similar to the example described in FIG. 51A, the manifold housing 1250 includes a first port 1251 connected to the first pneumatic circuit 1210, a second port 1252 connected to the second pneumatic circuit 1220, an exhaust port 1257 configured to exhaust air to the atmosphere, and first and second tank ports 1258a, 1258b configured to supply air from the air tank 1204. The manifold housing 1250 further comprises a first passage 1253 connecting the first tank port 1258A to the first port 1251 and a second passage 1254 connecting the second tank port 1258B to the second port 1252. The manifold housing 1250 further comprises an exhaust passage 1255 connected to both the first and second passages 1253, 1254 and a cross flow passage 1256 connected to both the first and second passages 1253, 1254.

As shown in FIG. 53, the leveling valves 1260A, 1260B include a first leveling valve 1260A connected to the first passage 1253 and a second leveling valve 1260B connected to the second passage 1254. Each leveling valve 1260A, 1260B is a four-way valve such that the leveling valve 1260A, 1260B can independently adjust the air supplied or removed from one of the respective pneumatic circuits 1210, 1220 and establish cross-flow with the other valve when air is neither supplied or removed from the first and second pneumatic circuits 1210, 1220. In some examples, each valve 1260A, 1260B is one of a rotary valve, a solenoid valve, and a poppet valve, whereby each valve 1260A, 1260B is electronically actuated by the system controller to manipulate air flow through the housing 1250. In some examples, the first valve 1260A may permit communication between the tank port 1258A and the first port 1251 while blocking air from reaching the exhaust passage 1255 and the cross-flow passage 1256. The first valve 1260A may also permit communication between the exhaust port 1257 and the first port 1251 while blocking air from the tank port 1258A and the cross-flow passage 1256. The second valve 1260B may permit communication between the tank port 1258B and the second port 1252 while blocking air from reaching the exhaust passage 1255 and the cross-flow passage 1256. The second valve 1260B may also permit communication between the exhaust port 1257 and the second port 1252 while blocking air from the tank port 1258B and the cross-flow passage 1256. Both the first and second valves 1260A, 1260B may permit communication between the first and second ports 1251, 1252 and the cross-flow passage 1256, while blocking air from the tank ports 1258A, 1258B and to the exhaust port 1257.

Figure 48:
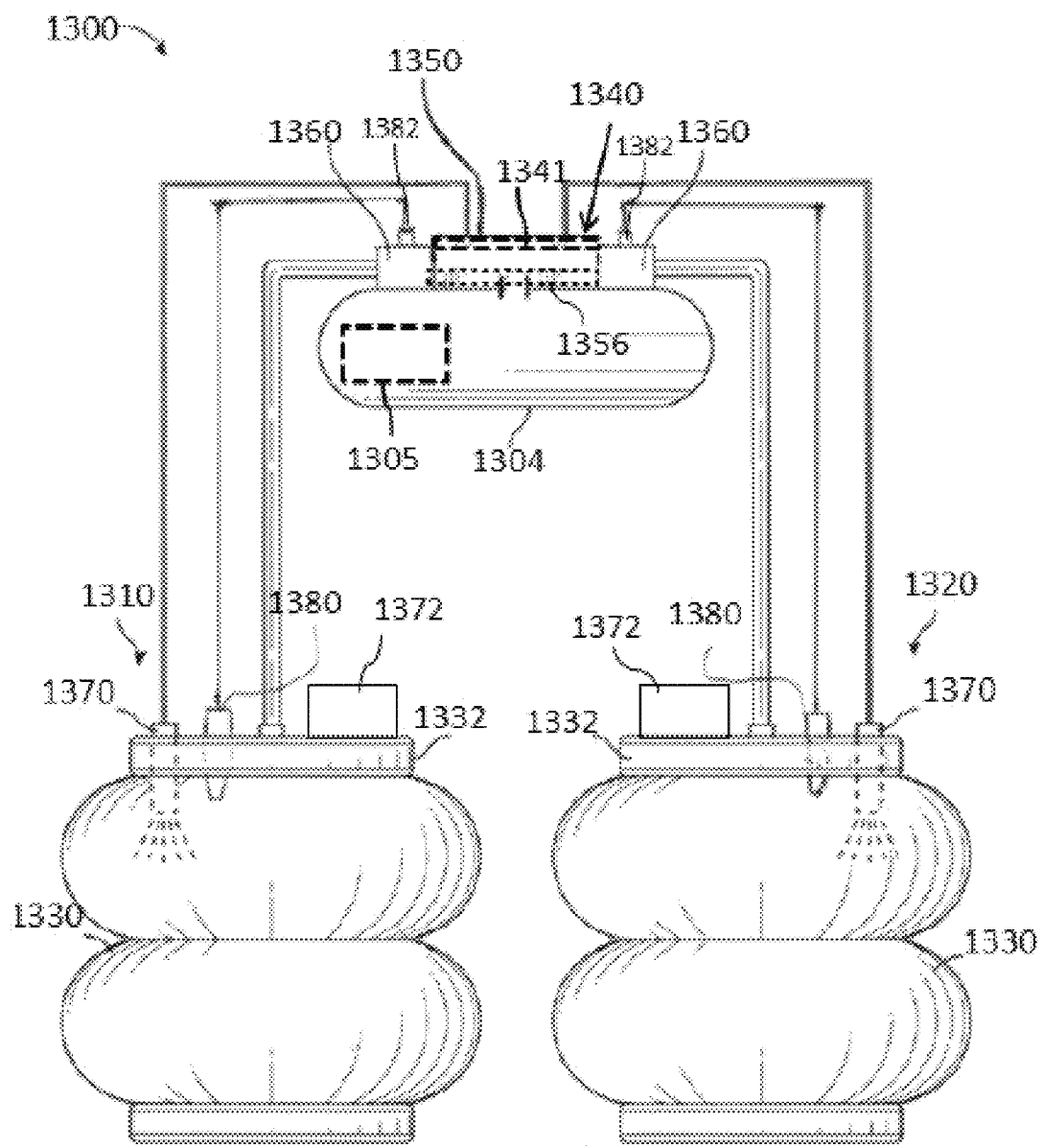
FIG. 48 is a schematic view of an air management system according to the present disclosure.

FIG. 48 shows an air management system 1300 comprising a supply air tank 1304, a first pneumatic circuit 1310 disposed on a first side of the vehicle, and a second pneumatic circuit 1320 disposed on a second side of the vehicle. Each pneumatic circuit 1310, 1320 includes one or more air springs 1330. In one example, the air management system 1300 includes an air compressor 1305 located within the air tank 1304 and configured to generate air pressure such that the air tank 1304 can supply air to the first and second pneumatic circuits 1310, 1320. In other examples, the air management system 1300 includes an air compressor disposed outside the air tank 1304 and connected to the air tank 1304 via a hose. Similar to the example described in FIG. 47, the air management system 1300 comprises a system controller 1340 comprising a manifold housing 1350 integrally attached to the supply air tank 1304, a pair of valves 1360 disposed at each end of the manifold housing 1350, and a printed circuit board 1341 secured to a top side of the manifold housing 1350. Similar to the example described in FIG. 53, the manifold housing 1350 comprises a plurality of ports and passages to establish communication between the supply tank 1304, the pneumatic circuits 1310, 1320, and the atmosphere, and each valve 1360 is configured to selectively supply air from the air tank 1304, remove air to the atmosphere, or establish cross-flow for each of the first and second pneumatic circuits 1310, 1320. In one example, the manifold housing 1350 includes a cross-flow passage 1356 establishing pneumatic communication between the leveling valves 1360 on each end of the system controller 1340. Similar to the examples described in FIGS. 47 and 52, the system controller 1340 is configured to selectively supply air to or remove air from each air spring 1330 of the air management system 1300 by actuating the valves 1360.

Similar to the example illustrated in FIG. 46 and described in this disclosure, the air management system 1300 of FIG. 48 further comprises a height sensor 1370, a first proportional control sensor 1380 disposed in the top plate 1332 of each air spring 1330, and second proportional control sensors 1382 disposed in the manifold housing 1350. Accordingly, similar to the example described in FIG. 46, the system controller 1340 may proportionally control the height of the air springs 1330 based on signals received from the height sensor 1370 and proportional control sensor 1380.

Referring to FIG. 48, an inertial sensor unit 1372 is optionally disposed on the top plate 1332 of each air spring 1330. The inertial sensor unit 1372 may include the same type of sensors as the aspect described in FIG. 55, which includes an accelerometer, a gyroscope, and a magnetometer. Each inertial sensor unit 1372 may transmit signals indicating the acceleration, angular velocity, and the magnetic force with respect to one or more axes of the vehicle to the system controller 1340. In some examples, the inertial sensor unit 1372 is wired to the system controller 1340 such that the inertial sensor unit 1372 transmits signals along a cable. In some examples, the inertial sensor unit 1372 transmits signals wirelessly to the system controller 1340.

Figure 49:
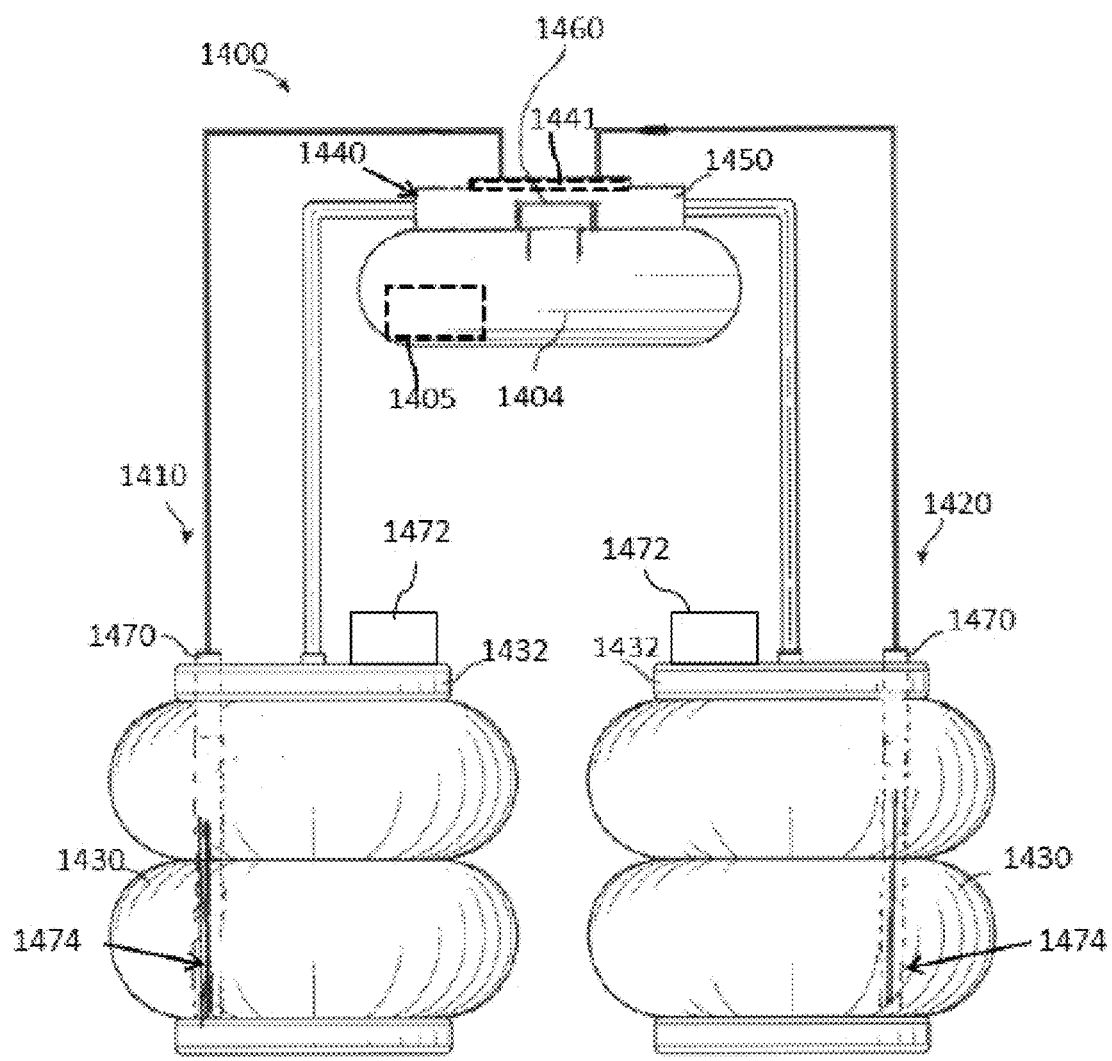
FIG. 49 is a schematic view of an air management system according to the present disclosure.

FIG. 49 shows an air management system 1400 comprising a supply air tank 1404, a first pneumatic circuit 1410 disposed on a first side of the vehicle, and a second pneumatic circuit 1420 disposed on a second side of the vehicle. Each pneumatic circuit 1410, 1420 includes one or more air springs 1430. In one example, the air management system 1400 includes an air compressor 1405 located within the air tank 1404 and configured to generate air pressure such that the air tank 1404 can supply air to the first and second pneumatic circuits 1410, 1420. In other examples, the air management system 1400 includes an air compressor disposed outside the air tank 1404 and connected to the air tank 1404 via a hose. Similar to the examples described in FIGS. 45 and 46, the air management system 1400 further comprises a system controller 1440 comprising a manifold housing 1450 integrally attached to the supply air tank 1404, a valve unit 1460 disposed in the manifold housing 1450, and a printed circuit board 1441 secured to the top side of the manifold housing 1450. Similar to the example described in FIG. 51, the manifold housing 1450 comprises a plurality of ports and passages to establish communication between the supply tank 1404, the pneumatic circuits 1410, 1420, and the atmosphere, and the valve unit 1460 comprises a plurality of valves configured to selectively supply air from the air tank 1404, remove air to the atmosphere, or establish cross-flow for each of the first and second pneumatic circuits 1410, 1420. Similar to the examples described in FIGS. 45 and 52, the system controller 1440 is configured to selectively supply air to or remove air from each air spring 1430 of the air management system 1400 by actuating the plurality of valves in the valve unit 1460.

As shown in FIG. 49, the air management system 1400 comprises a height sensor 1470 disposed in the top plate 1432 of each air spring 1430, in which the height sensor 1470 is a linear potentiometer sensor configured to monitor the height of its associated air spring 1430. Referring to FIG. 49, the height sensor 1470 comprises a linear shaft 1474 that extends along the height of its associated air spring 1430 and configured to move up and down as the air spring 1430 expands or contracts. The height sensor 1470 further comprises a wiper contact (not shown) electrically linked to a mechanical shaft 1472, and the resistance value between the wiper contact and the shaft 1472 provide an electrical signal output that is proportional to the height of the air spring 1430. Accordingly, the system controller 1440 may control the height of the air springs 1430 based on signals received from the height sensor 1470.

Referring to FIG. 49, an inertial sensor unit 1472 is optionally disposed on the top plate 1432 of each air spring 1430. The inertial sensor unit 1472 may include the same type of sensors as the aspect described in FIG. 55, which includes an accelerometer, a gyroscope, and a magnetometer. Each inertial sensor unit 1472 may transmit signals indicating the acceleration, angular velocity, and the magnetic force with respect to one or more axes of the vehicle to the system controller 1440. In some examples, the inertial sensor unit 1472 is wired to the system controller 1440 such that the inertial sensor unit 1472 transmits signals along a cable. In some examples, the inertial sensor unit 1472 transmits signals wirelessly to the system controller 1440.

Figure 50:
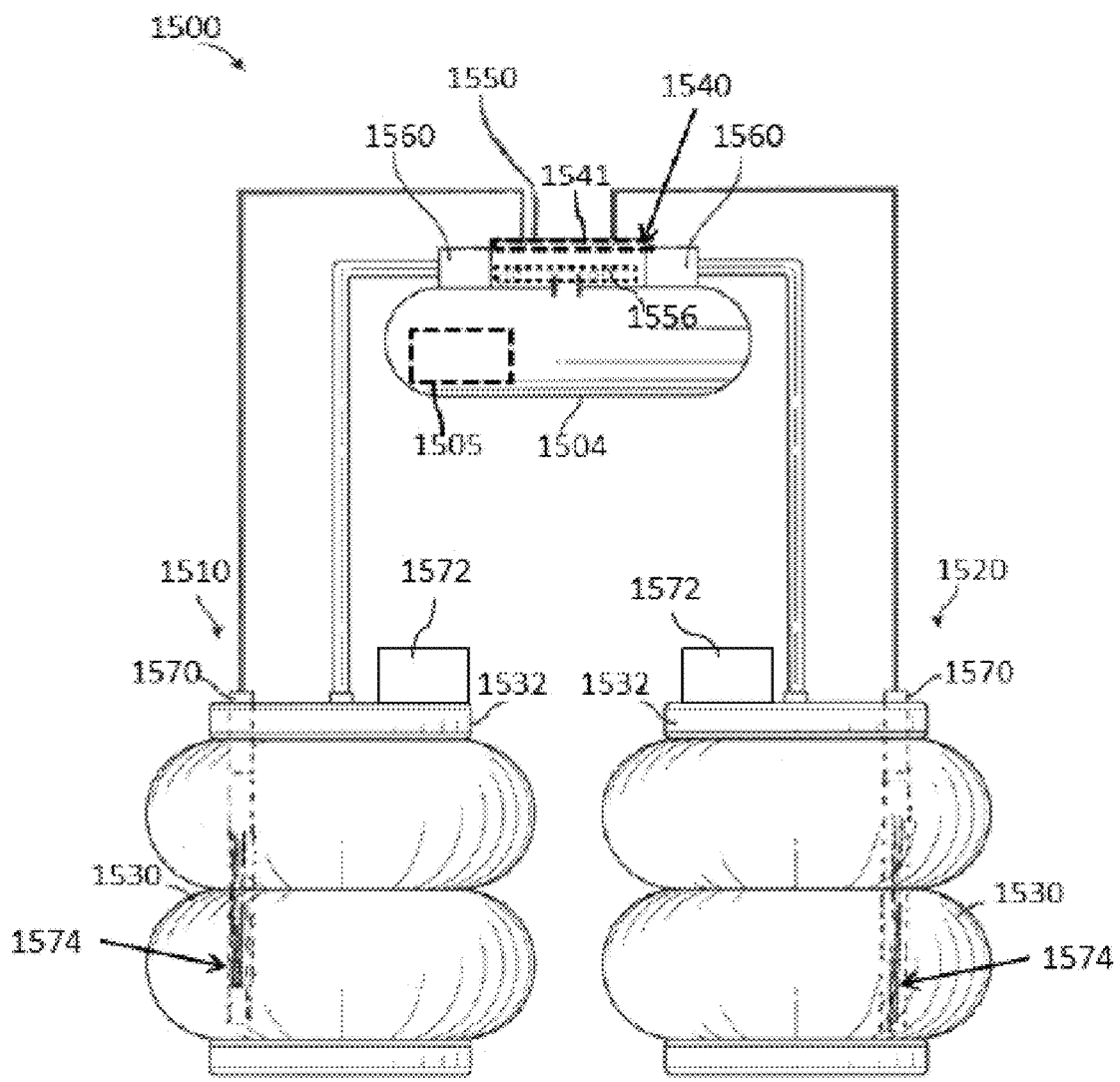
FIG. 50 is a schematic view of an air management system according to the present disclosure.

FIG. 50 shows an air management system 1500 comprising a supply air tank 1504, a first pneumatic circuit 1510 disposed on a first side of the vehicle, and a second pneumatic circuit 1520 disposed on a second side of the vehicle. Each pneumatic circuit 1510, 1520 includes one or more air springs 1530. In one example, the air management system 1500 includes an air compressor 1505 located within the air tank 1504 and configured to generate air pressure such that the air tank 1504 can supply air to the first and second pneumatic circuits 1510, 1520. In other examples, the air management system 1500 includes an air compressor disposed outside the air tank 1504 and connected to the air tank 1504 via a hose. Similar to the example described in FIGS. 47 and 48, the air management system 1500 comprises a system controller 1540 comprising a manifold housing 1550 integrally attached to the supply air tank 1504, a pair of valves 1560 disposed at each end of the manifold housing 1550, and a printed circuit board 1541 secured to a top side of the manifold housing 1550. Similar to the example described in FIG. 53, the manifold housing 1550 comprises a plurality of ports and passages to establish communication between the supply tank 1504, the pneumatic circuits 1510, 1520, and the atmosphere, and each valve 1560 is configured to selectively supply air from the air tank 1504, remove air to the atmosphere, or establish cross-flow for each of the first and second pneumatic circuits 1510, 1520. In one example, the manifold housing 1550 includes a cross-flow passage 1556 establishing pneumatic communication between the leveling valves 1560 on each end of the system controller 1540. Similar to the examples described in FIGS. 47 and 52, the system controller 1540 is configured to selectively supply air to or remove air from each air spring 1530 of the air management system 1500 by actuating the valves 1560.

Similar to the example described in FIG. 49, the air management system 1500 comprises a height sensor 1570 disposed in the top plate 1532 of each air spring 1530, in which the height sensor 1570 is a linear potentiometer sensor configured to monitor the height of its associated air spring 1530. Similar to FIG. 49, the height sensor 1570 comprises a linear shaft 1574 that extends along the height of its associated air spring 1530 and configured to move up and down as the air spring 1530 expands or contracts. Accordingly, the system controller 1540 may control the height of the air springs 1530 based on signals received from the height sensor 1570.

Referring to FIG. 50, an inertial sensor unit 1572 is optionally disposed on the top plate 1532 of each air spring 1530. The inertial sensor unit 1572 may include the same type of sensors as the aspect described in FIG. 55, which includes an accelerometer, a gyroscope, and a magnetometer. Each inertial sensor unit 1572 may transmit signals indicating the acceleration, angular velocity, and the magnetic force with respect to one or more axes of the vehicle to the system controller 1540. In some examples, the inertial sensor unit 1572 is wired to the system controller 1540 such that the inertial sensor unit 1572 transmits signals along a cable. In some examples, the inertial sensor unit 1572 transmits signals wirelessly to the system controller 1540.

Figure 54:
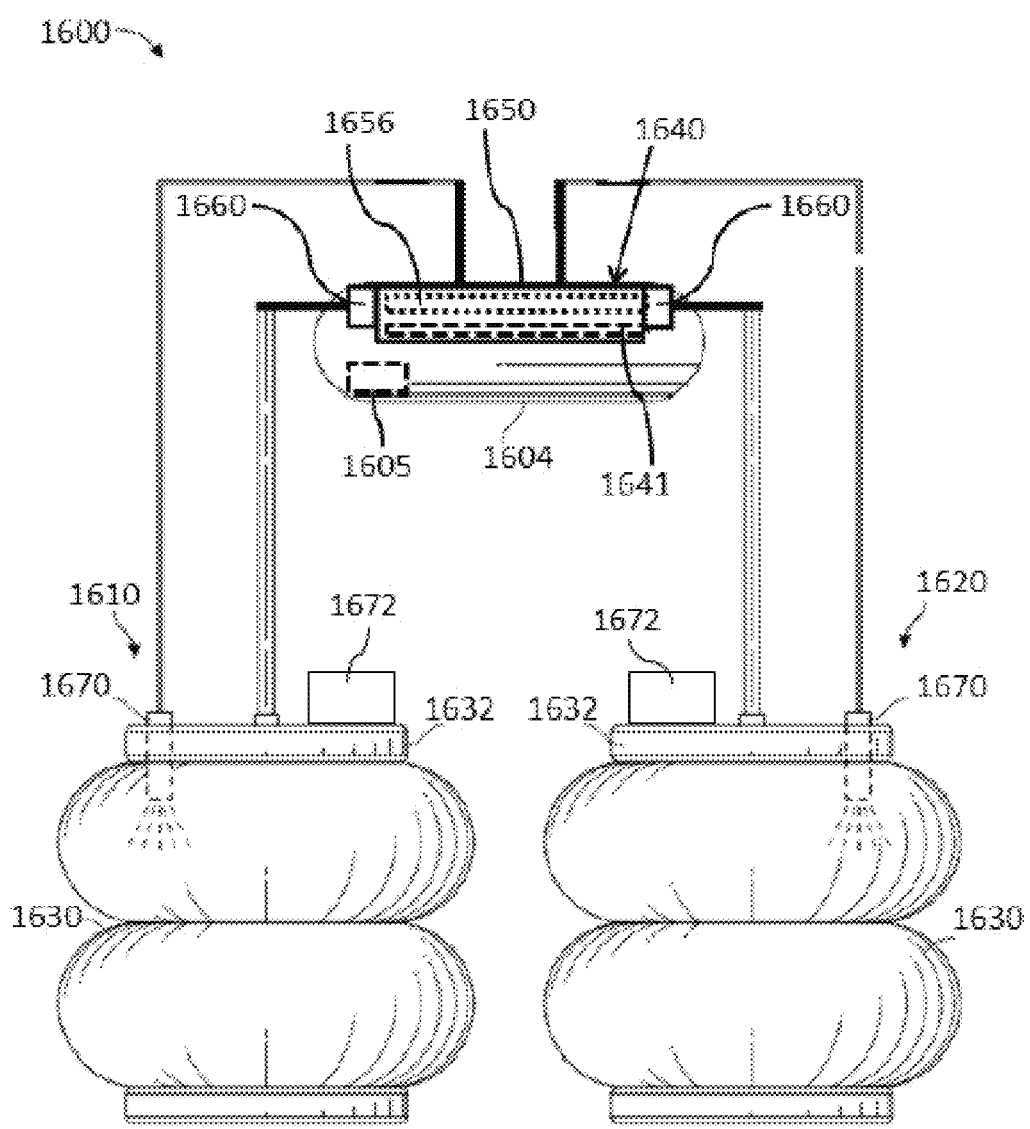
FIG. 54 is a schematic view of an air management system according to the present disclosure.

FIG. 54 shows an air management system 1600 comprising a supply air tank 1604, a first pneumatic circuit 1610 disposed on a first side of the vehicle, and a second pneumatic circuit 1620 disposed on a second side of the vehicle. Each pneumatic circuit 1610, 1620 includes one or more air springs 1630. In one example, the air management system 1600 includes an air compressor 1605 located within the air tank 1604 and configured to generate air pressure such that the air tank 1604 can supply air to the first and second pneumatic circuits 1610, 1620. In other examples, the air management system 1600 includes an air compressor disposed outside the air tank 1604 and connected to the air tank 1604 via a hose. The air management system 1600 further comprises a system controller 1640 disposed within the air tank 1604. The system controller 1640 comprises a manifold housing 1650 integrally attached to the supply air tank 1604, a pair of leveling valves 1660 disposed at each end of the manifold housing 1650, and a printed circuit board 1641 secured to the top side of the manifold housing 1650. Similar to the aspect described in FIG. 53, the manifold housing 1650 comprises a plurality of ports and passages to establish communication between the supply tank 1604, the pneumatic circuits 1610, 1620, and the atmosphere. In one example, the manifold housing 1650 includes a cross-flow passage 1656 establishing pneumatic communication between the leveling valves 1660 on each end of the system controller 1640. Each leveling valve 1660 is configured to selectively supply air from the air tank 1604 to one of the pneumatic circuits 1610, 1620, remove air from the one of the pneumatic circuits 1610, 1620 to the atmosphere, or establish cross-flow for between first and second pneumatic circuits 1610, 1620. Similar to the examples described in FIGS. 45 and 46, the system controller 1660 is configured to selectively supply air to or remove air from each air spring 1630 of the air management system 1600 by actuating the valves 1660.

Similar to the examples described above, the air management system 1600 comprises a height sensor 1670 disposed in the top plate 1632 of each air spring 1630, in which the height sensor 1670 (e.g., ultrasonic sensor, laser sensor) is configured to monitor the height of its associated air spring 1630. Accordingly, the system controller 1640 may control the height of the air springs 1630 based on signals received from the height sensor 1670. Similar to the examples described above, the air management system 1600 may further comprise a first proportional control sensor (not shown) disposed in the top plate 1632 of each air spring 1630, and second proportional control sensors (not shown) disposed in the manifold housing 1650 so that the system controller may control the height of the air springs 1630 based on signals received from the proportional control sensors.

Referring to FIG. 54, an inertial sensor unit 1672 is optionally disposed on the top plate 1632 of each air spring 1630. The inertial sensor unit 1672 may include the same type of sensors as the aspect described in FIG. 55, which includes an accelerometer, a gyroscope, and a magnetometer. Each inertial sensor unit 1672 may transmit signals indicating the acceleration, angular velocity, and the magnetic force with respect to one or more axes of the vehicle to the system controller 1640. In some examples, the inertial sensor unit 1672 is wired to the system controller 1640 such that the inertial sensor unit 1672 transmits signals along a cable. In some examples, the inertial sensor unit 1672 transmits signals wirelessly to the system controller 1640.

In each configuration of the air management system described in FIGS. 45-54, the air management system may include other types of sensors, such as accelerometers, gyroscopes and magnetometer, and determine the desired air pressure or height for each air spring based on inputs received from the other sensors, including accelerometers, gyroscopes and magnetometer. In one example, an accelerometer includes an electromechanical device configured to measure acceleration forces of the vehicle. In one example, a gyroscope includes a device configured to measure rotation motion of the vehicle, such as angular velocity of the vehicle. Accordingly, input from the accelerometers, gyroscopes and magnetometer may be used to calculate a dynamic vehicle condition (e.g. tilt of vehicle, rolling condition, lateral acceleration etc.), and the system controller may determine the desired air pressure or height of each air spring based on the calculated dynamic vehicle condition.

In each configuration of the air management system described in FIGS. 45-54, the system controller operates as a closed-loop control system to adjust the height of the air springs to a desired height based on the monitored operating conditions of the vehicle. In operation, the system controller receives, by the communication interface, inputs from the one or more sensors, such as the height sensor and the proportional control sensor, to determine the height and the internal air pressure of each air spring. The system controller then determines, by the processing module, the desired air pressure for each air spring based on inputs from the one or more sensors. In determining the desired air pressure for each air spring, the system controller may take into account the differences in air pressures between all the air springs of the air management system so that the system controller may determine the vehicle pitch and roll rates. The system controller determines, by the processing module, the flow rate needed to adjust the internal air pressure of each air spring based on the vehicle roll and pitch rates. In one configuration, the calculated flow rate is based on how fast the height of the air spring is changing in response to a load or displacement (i.e., height differential rate). Based on the height differential rate and the internal pressure of the air springs and the differences between heights of the air springs of the air management system, the system controller is configured to determine the desired air pressure and flow rate needed to adjust each air spring to provide optimal stability and comfort for the vehicle. After determining the desired air pressure and flow rate, the system controller is configured to control the flow rate of air being exhausted from or supplied to each air spring by transmitting, by the driver module, commands to the individual valves.

In each configuration of the air management system shown in FIGS. 45-54, the system controller is configured to actuate the valve unit or the leveling valves to establish cross-flow between the first and second pneumatic circuits when the pressure differential or height differential between the air springs of the first and second pneumatic circuits are within a predetermined threshold. For example, if the system controller receives height measurements from signals transmitted by the height sensors that indicate that the height differential between the air springs of the first and second pneumatic circuits are within a predetermined threshold, the system controller will actuate the valves to establish cross-flow between the air springs of the first and second pneumatic circuits. In each configuration of the air management system shown in FIGS. 45-53, the system controller is configured to independently adjust the air pressure of the first and second pneumatic circuits when the pressure differential or height differential between the air springs of the first and second pneumatic circuits are greater than a predetermined threshold. The system controller may determine the pressure or height differential of the air springs of each pneumatic circuit based on measurement signals received from the sensors described above.

In each configuration of the air management system shown in FIGS. 45-54, the system controller is configured to provide cross-flow between the first and second pneumatic circuits when neither air is supplied from the supply tank to the air springs nor air is removed from the air springs to the atmosphere. In operation, each time that the system controller determines, by the processing module, that the height or the air pressure of the associated air springs does not need to be adjusted independently, the system controller actuates the valves to be set in a neutral mode to establish pneumatic communication between the first and second pneumatic circuits. The system controller may determine to establish cross-flow based on sensor input signals from the sensors of each air spring. In one configuration, the system controller is configured to take into account a difference between a spring height of the air springs in determining to actuate the valve between the active mode and the neutral mode. In various aspects, the system controller is configured to provide cross-flow between the first and second pneumatic circuits when the vehicle is traveling at any speed, include velocities substantially above zero miles-per-hour or kilometers-per-hour, so that the pressure differences between air springs disposed on opposite sides of the vehicle are eliminated at any time during vehicle operation.

In each configuration of the air management system shown in FIGS. 45-54, the system controller may be disposed in the interior of the supply tank such that the printed-circuit-board, the passages, and the valves are located within the supply tank. In one example, the system controller may include four-way valve unit positioned at each end of the supply tank and a cross-flow passage connecting the two valves. In one example, the system controller may be coupled to the interior surface of the supply tank. In one example, the supply tank may include mounting structure, such as brackets or rails to secure the system controller within the supply tank. Accordingly, the system controller may independently adjust air flow to each pneumatic circuit and selectively establish cross-flow between the pneumatic circuits when all valves are not independently adjusting the air flow to the pneumatic circuits.

In each configuration of the air management system shown in FIGS. 19-21B, the control units or the system controller may be configured to execute a dump cycle such that the air is released from each air spring of the air management at the same time. In each air management system shown in FIGS. 19-21B, the air management system may include a user interface unit operatively linked to the control units or the system controller and configured transmit a command to the system controller or the control units to execute a dump cycle so that air is released from all the air springs. The user interface unit may be disposed in the vehicle dashboard or configured as an application downloaded on a display device, such as a smartphone or handheld computer.

All the configurations of the air management systems described herein may be incorporated with any type of vehicle, trailer, or towable, including but not limited to, sport-utility vehicles, passenger vehicles, racing vehicles, pick-up trucks, dump trucks, freight carriers, trailers of any type including trailers for boats, cattle, horses, heavy equipment, tractors, agriculture implements (e.g., granular spreaders, fertilizer sprayers and other types of sprayers, feeders and spreaders), liquid hauling vehicles, baffled and unbaffled liquid tankers, machinery, towing equipment, rail vehicles, road-rail vehicles, street cars, and any other type of chassis having air bags, etc.

The air management systems described herein have been found to significantly increase tire life both in terms of reducing wear and resulting in even wear, even when the tires are not rotated. In one exemplary embodiment, it has been observed that truck tires having an average life of 100,000 km when mounted on trucks that were not equipped with the air management systems described herein, experience significantly reduced wear when mounted on identical trucks that are equipped with the air management systems described herein. In certain embodiments, average truck tire life is extended by at least 20%, and in some instances by up to 30%, 40%, 50%, or more. As such, an unexpected and significant financial, time (reduced time waste in rotating, changing, retreading, and replacing tires), and environmental savings is realized as additional surprising advantages of the inventions of this disclosure.

The air management systems described herein have been found to significantly reduce the unsafe effects of wind shears on vehicles traveling at speed, particularly on truck trailers. Wind shears destabilize trucks hauling trailers at highway speeds and have caused such trailers to overturn leading to devastating injuries and losses of life, cargos, and multi-vehicle wrecks. In one exemplary embodiment, trailers and recreational vehicles that are equipped with the air management systems described herein may be significantly more stable and resistant to wind shear forces at highway speeds. As such, an unexpected and significant safety and comfort advantage is realized as additional surprising advantages of the inventions of this disclosure.

The air management systems described herein have been found to significantly reduce road noise, vibrations, and discomfort for drivers, passengers as well as live cargo including livestock, horses and the like. In one exemplary embodiment, it has been observed that road noise, vibrations, and discomfort are significantly reduced such that drivers that could previously drive large vehicles only a few hundred miles per day due to discomfort were able to drive significantly longer distances due to the reduction in aches, pains, discomfort and fatigue, which was achieved from very noticeably improved ride quality and stability. As such, an unexpected and significant comfort advantage is realized as additional surprising advantages of the inventions of this disclosure.

The air management systems described herein have been found to significantly reduce or even eliminate vehicle nose-diving when braking. Such nose-diving can create unsafe conditions, is highly uncomfortable for drivers and passengers, and puts increased stress on numerous vehicle components. By reducing and in many cases eliminating such nose-diving, an unexpected and significant safety and comfort advantage is realized as additional surprising advantages of the inventions of this disclosure.

The air management systems described herein have been found to significantly increase traction resulting in improved handling, even in slippery conditions. In one exemplary embodiment, it has been observed that trucks requiring use of four-wheel drive mode (when not equipped with the air management systems described herein) to drive through uneven and/or slippery terrain were able to be drive through the same terrain in two-wheel drive mode without losing traction and becoming immobilized. As such, an unexpected and significant safety and utility advantage is realized as additional surprising advantages of the inventions of this disclosure.

The air management systems described herein may enhance brake performance. In vehicles equipped with electronic stability systems, e.g., any electronic stability control (ESC), including, but not limited to electronic stability program (ESP), dynamic stability control (DSC), vehicle stability control (VSC), automatic traction control (ATC), the air management systems described herein have been found to reduce the incidence rate of such electronic systems applying brakes because the vehicle is maintained in a level and stable position, and thereby avoids activation of such electronic systems, which may enhance brake performance and life.

In the present context, the phrase "adjust independently" refers to a state in which the leveling valve is adjusting the air pressure of air springs in one pneumatic circuit while the leveling valve is not in pneumatic communication with any components of another pneumatic circuit.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the term "about" when used in connection with a numerical value should be interpreted to include any values which are within 5% of the recited value. Furthermore, recitation of the term about and approximately with respect to a range of values should be interpreted to include both the upper and lower end of the recited range.

As used herein, the terms "attached," "connected," or "fastened," may be interpreted to include two elements that are secured together with or without contacting each other.

The present disclosure includes methods, kits, and systems for retrofitting vehicles that have been manufactured without air springs including but not limited to coil spring or leaf spring suspension systems. A symmetrically dynamic equalized volume and pressure distributing air management system may be installed as a retrofit on such vehicles by providing a kit comprising an air tank, a compressor, a symmetrically dynamic equalized volume and pressure distributing pneumatic valve on each of the left and right sides of the vehicle, at least one air spring connected to each symmetrically dynamic equalized volume and pressure distributing pneumatic valve, and a plurality of air hoses connecting the air management system components as described and illustrated herein. In some configurations of the present disclosure, the plurality of air hoses may have equal lengths and diameters.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various embodiments of the invention comprise one or more of the following items:

An air management system for a vehicle, the air management system comprising: a supply tank; a system controller integrated with the supply tank; a first pneumatic circuit comprising one or more air springs disposed on a first side of the vehicle and one or more air lines pneumatically connecting the one or more air springs with the system controller; a second pneumatic circuit comprising one or more air springs disposed on a second side of the vehicle and one or more air lines pneumatically connecting the one or more air springs with the system controller; and wherein the system controller is configured to adjust independently air pressure of the one or more air springs of the first pneumatic circuit and adjust independently air pressure of the one or more air springs of the second pneumatic circuit without establishing pneumatic communication between the first and second pneumatic circuits; wherein the system controller is configured to establish pneumatic communication between the first and second pneumatic circuits when the system controller is not adjusting independently the air pressure of the one or more air springs of the first pneumatic circuit and not adjusting independently the air pressure of the one or more air springs of the second pneumatic circuit.

2. The air management system of item 1, wherein the system controller comprises a housing disposed on an exterior surface of the supply tank, and the housing comprises an internal cross-flow passage pneumatically connecting the first and second pneumatic circuits.

3. The air management system of item 1, wherein the system controller comprises a housing disposed within the supply tank, and the housing comprises an internal cross-flow passage pneumatically connecting the first and second pneumatic circuits.

4. The air management system of any one of claims 1-3, wherein the system controller comprises a first port connected to one of the air lines of the first pneumatic circuit, a second port connected to one of the air lines of the second pneumatic circuit, an exhaust port configured to exhaust air to the atmosphere, and one or more tank ports coupled to the supply tank.

5. The air management system of item 4, wherein the system controller comprises a cross-flow passage pneumatically connecting the first port to the second port.

6. The air management system of any one of items 1-5, wherein the system controller comprises a valve unit comprising a plurality of valves configured to selectively supply air from the air tank to at least one of the first and second pneumatic circuits, remove air from at least one of the first and second pneumatic circuits, and establish pneumatic communication between the first and second pneumatic circuits.

7. The air management system of any one of items 1-6, wherein at least one air spring of the first and second pneumatic circuits comprises a height sensor configured to monitor the height of its associated air spring and transmit a signal indicating the height of its associated air spring.

8. The air management system of any one of items 1-7, wherein the system controller is configured to receive the signal transmitted from each height sensor and calculate a height differential between the air springs of the first pneumatic circuit and the air springs of the second pneumatic circuit based at least on the received signals from the height sensor.

9. The air management system of any one of items 1-8, wherein the system controller is configured to adjust independently the air pressure of the first and second pneumatic circuits when the calculated height differential is above a predetermined threshold, and the system controller is configured to establish pneumatic communication between the first and second pneumatic circuits when the calculated height differential is below a predetermined threshold.

10. The air management system of any one of items 1-9, wherein each pneumatic circuit comprises at least two proportional control sensors configured to monitor the air pressure of or flow rate to its associated air spring and transmit a signal indicating the air pressure of its associated air spring.

11. The air management system of any one of items 1-10, wherein the system controller is configured to receive the signal transmitted from each proportional control sensor and determine a lag time for air to travel from the system controller to one of the air springs based at least on the received signals from the proportional control sensors.

12. The air management system of any one of items 1-11, wherein the air lines have equal lengths and diameters.

13. The air management system of any one of items 1-12 comprising a compressor disposed within the supply tank.

14. The air management system of any one of items 1-13, wherein each air spring comprises an inertial sensor unit comprising an accelerometer, a gyroscope, and a magnetometer.

15. The air management system of any one of items 1-14, wherein the accelerometer is configured to measure an acceleration with respect to three axes of the vehicle; wherein the gyroscope is configured to measure an angular velocity with respect to three axes of the vehicle; and wherein the magnetometer is configured to measure the magnetic force with respect to three axes of the vehicle.

16. The air management system of any one of items 1-15, wherein the inertial sensor unit is configured to transmit a signal indicating the measured acceleration, the angular velocity, and the magnetic force with respect to the three axes of the vehicle; wherein the system controller is configured to receive the signal transmitted from the inertial sensor unit and calculate at least one of the vehicle yaw, vehicle pitch, and vehicle roll, and the system controller is configured to determine the desired air pressure of each air spring based on at least on one of the calculated vehicle yaw, vehicle pitch, and vehicle roll.

17. A system controller for an air management system comprising a supply tank, a first pneumatic circuit disposed on a first side of a vehicle, and a second pneumatic circuit disposed on a second side of a vehicle, the system controller comprising: a housing integrated with the supply tank, wherein the housing comprises at least one tank port pneumatically connected to the supply tank, a first port pneumatically connected to the first pneumatic circuit, a second port pneumatically connected to the second pneumatic circuit, and an exhaust port pneumatically connected to the atmosphere; and a set of valves configured to selectively supply air from the air tank to at least one of the first and second pneumatic circuits, remove air from at least one of the first and second pneumatic circuits to the atmosphere, and establish pneumatic communication between the first and second pneumatic circuits; wherein the system controller is configured to adjust independently air pressure of the first pneumatic circuit and adjust independently air pressure of the second pneumatic circuit without establishing pneumatic communication between the first and second pneumatic circuits; wherein the system controller is configured to establish pneumatic communication between the first and second pneumatic circuits when the system controller is not adjusting independently the air pressure of the first pneumatic circuit and not adjusting independently the air pressure of the second pneumatic circuit.

18. The system controller of item 17, wherein the housing is disposed on an exterior surface of the supply tank.

19. The system controller of item 17, wherein the housing is disposed within the supply tank.

20. The system controller of any one of items 17-19, wherein the at least one tank port comprises a first tank port and a second tank port, and wherein the housing comprises: a first passage pneumatically connecting the first port with the first tank port, a second passage pneumatically connecting the second port with the second tank port, a cross-flow passage pneumatically connecting the first passage with the second passage, and an exhaust passage pneumatically connecting the exhaust port to the cross-flow passage.

21. The system controller of any one of items 17-20, wherein the set of valves is a valve unit comprising: a first valve disposed at an intersection between the first passage and the cross-flow passage, a second valve disposed at an intersection between the second passage and the cross-flow passage, and a third valve disposed at an intersection between the exhaust passage and the cross-flow passage.

22. The system controller of any one of items 17-21, wherein the first valve and the second valve each comprises two electronically actuated solenoid valves, and the third valve comprises three electronically actuated solenoid valves.

23. The system controller of any one of items 17-22, wherein the first valve is configured to selectively supply air from the air tank to the first pneumatic circuit, and the second valve is configured to selectively supply air from the air tank to the second pneumatic circuit.

24. The system controller of any one of items 17-23, wherein the first and third valves are synced such that the first and third valves are configured to selectively exhaust air from the first pneumatic circuit, and the second and third valves are synced such that the second third valves are configured to selectively exhaust air from the second pneumatic circuit.

25. The system controller of any one of items 17-24, wherein the first, second, and third valves are synced such that the first, second, and third valves are configured to establish pneumatic communication between the first and second ports without supplying air from the air tank to any one of the first and second pneumatic circuits and without exhausting air from any one of the first and second pneumatic circuits to the exhaust port.

26. The system controller of any one of items 17-25, wherein the at least one tank port comprises a first tank port, and wherein the housing comprises: a supply passage pneumatically connected to the first tank port, an exhaust passage pneumatically connected to the exhaust port, and a flow passage pneumatically connected to the first port, the second port, the supply passage, and the exhaust passage.

27. The system controller of any one of items 17-26, wherein the set of valves is a four-way valve disposed at an intersection between the supply, exhaust, and flow passages.

28. The system controller of any one of items 17-27, wherein the four-way valve comprises: a first flow-valve and a second flow-valve connected to the flow passage; a supply valve connected to the supply passage; and an exhaust valve connected to the exhaust passage; wherein the first flow-valve, the second-flow valve, the supply valve, and the exhaust valve are each an electronically actuated solenoid valve.

29. The system controller of any one of items 17-28, wherein the first flow-valve, the second-flow valve, the supply valve, and the exhaust valve are synced such that the four-way valve is configured to establish pneumatic communication between the first and second ports without supplying air from the air tank to any one of the first and second pneumatic circuits and without exhausting air from any one of the first and second pneumatic circuits to the exhaust port.

30. The system controller of any one of items 17-28, wherein the first flow-valve, the second-flow valve, the supply valve, and the exhaust valve are synced such that the four-way valve is configured to selectively supply air from the air tank to any one of the first and second pneumatic circuits and remove air from any one of the first and second pneumatic circuits to the exhaust port.

31. The system controller of any one of items 17-30, wherein the set of valves comprise a first leveling valve and a second leveling valve, wherein the first leveling valve is configured to selectively supply air from the first tank port to the first port, selectively remove air from the first port to the exhaust port, and selectively establish pneumatic communication between the first port and the second port; wherein the second leveling valve is configured to selectively supply air from the second tank port to the second port, selectively remove air from the second port to the exhaust port, and selectively establish pneumatic communication between the second port and the first port.

32. The system controller of any one of items 17-31, wherein the first and second leveling valves are each electronically actuated multi-way valves.

33. A method for adjusting air pressure of an air management system of a vehicle comprising a supply tank, a first pneumatic circuit disposed on a first side of the vehicle, and a second pneumatic circuit disposed on a second side of the vehicle, the method comprising: adjusting independently, by a system controller, the air pressure of the first pneumatic circuit such that the system controller is either supplying air from the supply tank to the first pneumatic circuit or removing air from the first pneumatic circuit to the atmosphere; adjusting independently, by the system controller, the air pressure of the second pneumatic circuit such that the system controller is either supplying air from the supply tank to the second pneumatic circuit or removing air from the second pneumatic circuit to the atmosphere; and establishing, by the system controller, pneumatic communication between the first pneumatic circuit and the second pneumatic circuit only when the system controller is neither supplying air from the supply tank nor removing air to the atmosphere; wherein the system controller comprises a housing integrated with the supply tank, and the housing comprises an internal cross-flow passage pneumatically connecting the first and second pneumatic circuits.

34. An air management system for leveling a vehicle operated under dynamic driving conditions comprising: an air supply tank; a compressor operatively connected to the supply air tank; a system controller integrated with the supply tank; one or more air springs disposed on a first side of the vehicle and one or more air lines pneumatically connecting the one or more air springs disposed on the first side of the vehicle with the system controller; one or more air springs disposed on a second side of the vehicle and one or more air lines pneumatically connecting the one or more air springs disposed on the second side of the vehicle with the system controller; the one or more air springs disposed on a first side of the vehicle have a first leveling valve configured to adjust independently the height of at least one air spring on a first side of the vehicle; the one or more air springs disposed on a second side of the vehicle have a second leveling valve configured to adjust independently the height of at least one air spring on a second side of the vehicle; and wherein at least one air spring disposed on the first side of the vehicle and at least one air spring disposed on the second side of the vehicle comprise one or more sensors configured to monitor at least two conditions of its associated air spring and transmit a measurement signal indicating the at least two conditions of its associated air spring, wherein the at least two conditions comprise a height of its associated air spring and a pressure of its associated air spring, wherein the system controller is configured to (i) receive the signals transmitted from the one or more sensors of each air spring, (ii) detect a height differential between at least one air spring disposed on the first side of the vehicle and at least one air spring disposed on the second side of the vehicle based at least on the received signals from the one or more sensors of each air spring, (iii) independently adjust air pressure of the at least one air spring disposed on the first side of the vehicle such that the first leveling valve is either supplying air from the air supply tank to the at least one air spring disposed on the first side of vehicle or removing air from the at least one air spring disposed on the first side of vehicle to the atmosphere, (iv) independently adjust air pressure of the at least one air spring disposed on the second side of the vehicle by a second leveling valve such that the second leveling valve is either supplying air from the air supply tank to the at least one air spring disposed on the second side of the vehicle or removing air from the at least one air spring disposed on the second side of the vehicle to the atmosphere, (v) detect a pressure differential between the at least one air springs disposed on the first side of the vehicle and the at least one air spring disposed on the second side of the vehicle based at least on the received signals from the one or more sensors of each air spring when both the first leveling valve and the second leveling valve are set in a neutral mode such that the height differential is within a predetermined threshold such that each leveling valve is neither supplying air from the air supply tank or removing air to the atmosphere, and (vi) establish pneumatic communication between the first and second pneumatic circuits when the system controller is not adjusting independently the air pressure of the one or more air springs of the first pneumatic circuit and not adjusting independently the air pressure of the one or more air springs of the second pneumatic circuit.

35. The air management system of item 34, wherein the one or more sensors comprises a height sensor configured to monitor the height of the air spring and transmit a signal indicating the height of the air spring.

36. The air management system of item 35, wherein the height sensor is an ultrasonic sensor, a laser sensor, an infrared sensor, an electromagnetic wave sensor, or a potentiometer.

37. The control unit of any one of items 34-36, wherein the one or more sensors comprise a pressure sensor configured to monitor the internal air pressure of the air spring and transmit a signal indicating the internal air pressure of the air spring.

38. The air management system of any one of items 34-37, wherein the system controller comprises a housing disposed on an exterior surface of the supply tank.

39. The air management system of any one of items 34-38, wherein the system controller comprises a housing disposed within the supply tank.

40. The air management system of any one of items 34-39, wherein the system controller comprises a first port connected to one of the air lines connected to the one or more air springs disposed on the first side of the vehicle, a second port connected to one of the air lines connected to the one or more air springs disposed on the second side of the vehicle, an exhaust port configured to exhaust air to the atmosphere, and one or more tank ports coupled to the supply tank.

41. The air management system of any one of items 34-40, wherein at least one air spring disposed on the first side of the vehicle and at least one air spring disposed on the second side of the vehicle comprise a proportional control sensor configured to monitor the air pressure of or flow rate to its associated air spring and transmit a signal indicating the air pressure of its associated air spring.

42. The air management system of any one of items 34-41, wherein the system controller is configured to receive the signal transmitted from each proportional control sensor and determine a lag time for air to travel from the system controller to one of the air springs based at least on the received signals from the proportional control sensor.

43. The air management system of any one of items 34-42, wherein the air lines have equal lengths and diameters.

44. The air management system of any one of items 34-43 comprising a compressor disposed within the supply tank.

45. The air management system of any one of items 34-44, wherein the one or more sensors comprises an inertial sensor unit comprising an accelerometer, a gyroscope, and a magnetometer.

46. The air management system of any one of items 34-45, wherein the accelerometer is configured to measure an acceleration with respect to three axes of the vehicle; wherein the gyroscope is configured to measure an angular velocity with respect to three axes of the vehicle; and wherein the magnetometer is configured to measure the magnetic force with respect to three axes of the vehicle.

47. The air management system of any one of items 34-46, wherein the one or more sensors are configured to transmit a signal indicating the measured acceleration, the angular velocity, and the magnetic force with respect to the three axes of the vehicle; wherein the system controller is configured to receive the signal transmitted from the inertial sensor unit and calculate at least one of the vehicle yaw, vehicle pitch, and vehicle roll, and the system controller is configured to determine the desired air pressure of each air spring based on at least on one of the calculated vehicle yaw, vehicle pitch, and vehicle roll.

48. A method for controlling the stability of a vehicle operated under dynamic driving conditions comprising an air management system, wherein the air management system comprises a supply tank, one or more air springs disposed on a first side of the vehicle in pneumatic communication with the supply tank and one or more air springs disposed on a second side of the vehicle in pneumatic communication with the supply tank, the method comprising: (i) monitoring, by one or more sensors, at least one condition of at least one air spring disposed on each of the first and second sides of the vehicle; (ii) transmitting, by the one or more sensors, at least one signal indicating the at least one condition of the at least one air spring disposed on each of the first and second sides of the vehicle; (iii) receiving, by a processing module, at least one signal indicating the at least one condition of the at least one air spring disposed on each of the first and second sides of the vehicle; (iv) detecting, by the processing module, a height differential between the at least one air spring disposed on each of the first and second sides of the vehicle based at least on the received signals; (v) independently adjusting, by a first leveling valve, air pressure of the at least one air spring disposed on the first side of the vehicle such that the first leveling valve is either supplying air from the air supply tank to the at least one air spring disposed on the first side of the vehicle or removing air from the at least one air spring disposed on the first side of the vehicle to the atmosphere; (vi) independently adjusting, by a second leveling valve, air pressure of the at least one air spring disposed on the second side of the vehicle such that the second leveling valve is either supplying air from the air supply tank to the at least one air spring disposed on the second side of the vehicle or removing air from the at least one air spring disposed on the second side of the vehicle to the atmosphere; (vii) detecting, by the processing module, an air pressure differential between at least one air spring disposed on each of the first and second sides of the vehicle based at least on the received signals when both the first leveling valve and the second leveling valve are set in a neutral mode such that the height differential is within a predetermined threshold such that first and second leveling valves are neither supplying air from the air supply tank nor removing air to the atmosphere; and (viii) establishing pneumatic communication between the first pneumatic circuit and the second pneumatic circuit only when both the first leveling valve and the second leveling valve are set in a neutral mode via an internal cross-flow passage pneumatically connecting the first and second pneumatic circuits extending through the supply tank.

49. The method of item 48, wherein the one or more sensors comprises a height sensor configured to monitor the height of the air spring and transmit a signal indicating the height of the air spring.

50. The method of item 49, wherein the height sensor is an ultrasonic sensor, a laser sensor, an infrared sensor, an electromagnetic wave sensor, or a potentiometer.

51. The method of any one of items 48-50, wherein the one or more sensors comprise a pressure sensor configured to monitor the internal air pressure of the air spring and transmit a signal indicating the internal air pressure of the air spring.

52. The method of any one of items 48-51, wherein the system controller comprises a housing disposed on an exterior surface of the supply tank.

53. The method of any one of items 48-51, wherein the system controller comprises a housing disposed within the supply tank.

54. The method of any one of items 48-53 comprising a compressor disposed within the supply tank.

55. The method, system, and/or control unit of any one of items 1-54, wherein one or more steps of the method for controlling the stability of a vehicle operated under dynamic driving conditions of this disclosure are continuously implemented while the vehicle is operated under dynamic driving conditions such that any step is repeated one or more times in response to changing driving conditions.

56. The method, system, and/or control unit of any one of items 1-55, wherein the air management system dynamically receives and processes sensor data, and transmits commands to supply and purge air continuously while the vehicle is operated under dynamic driving conditions.

The present disclosure includes the ornamental design for a leveling valve, its lower housing, its top housing, one or more rotary disks, a shaft, and any other embodiment of the present disclosure, as shown and described.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An air management system for leveling a vehicle operated under dynamic driving conditions, the air management system comprising:
a supply tank;
a compressor operatively connected to the supply air tank;
a system controller integrated with the supply tank;
a first pneumatic circuit comprising one or more air springs disposed on a first side of the vehicle and one or more air lines pneumatically connecting the one or more air springs with the system controller;
a second pneumatic circuit comprising one or more air springs disposed on a second side of the vehicle and one or more air lines pneumatically connecting the one or more air springs with the system controller; and
wherein the system controller is configured to adjust independently air pressure of the one or more air springs of the first pneumatic circuit and adjust independently air pressure of the one or more air springs of the second pneumatic circuit without establishing pneumatic communication between the first and second pneumatic circuits;
wherein the system controller is configured to establish pneumatic communication between the first and second pneumatic circuits when the system controller is not adjusting independently the air pressure of the one or more air springs of the first pneumatic circuit and not adjusting independently the air pressure of the one or more air springs of the second pneumatic circuit.

2. The air management system of claim 1, wherein the system controller comprises a housing disposed on an exterior surface of the supply tank, and the housing comprises an internal cross-flow passage pneumatically connecting the first and second pneumatic circuits.

3. The air management system of claim 1, wherein the system controller comprises a housing disposed within the supply tank, and the housing comprises an internal cross-flow passage pneumatically connecting the first and second pneumatic circuits.

4. The air management system of claim 1, wherein the system controller comprises a first port connected to one of the air lines of the first pneumatic circuit, a second port connected to one of the air lines of the second pneumatic circuit, an exhaust port configured to exhaust air to the atmosphere, and one or more tank ports coupled to the supply tank.

5. The air management system of claim 4, wherein the system controller comprises a cross-flow passage pneumatically connecting the first port to the second port.

6. The air management system of claim 1, wherein the system controller comprises a valve unit comprising a plurality of valves configured to selectively supply air from the air tank to at least one of the first and second pneumatic circuits, remove air from at least one of the first and second pneumatic circuits, and establish pneumatic communication between the first and second pneumatic circuits.

7. The air management system of claim 1, wherein at least one air spring of the first and second pneumatic circuits comprises a height sensor configured to monitor the height of its associated air spring and transmit a signal indicating the height of its associated air spring.

8. The air management system of claim 7, wherein the system controller is configured to receive the signal transmitted from each height sensor and calculate a height differential between the air springs of the first pneumatic circuit and the air springs of the second pneumatic circuit based at least on the received signals from the height sensor.

9. The air management system of claim 8, wherein the system controller is configured to adjust independently the air pressure of the first and second pneumatic circuits when the calculated height differential is above a predetermined threshold, and the system controller is configured to establish pneumatic communication between the first and second pneumatic circuits when the calculated height differential is below a predetermined threshold.

10. The air management system of claim 1, wherein each pneumatic circuit comprises at least two proportional control sensors configured to monitor the air pressure of or flow rate to its associated air spring and transmit a signal indicating the air pressure of its associated air spring.

11. The air management system of claim 10, wherein the system controller is configured to receive the signal transmitted from each proportional control sensor and determine a lag time for air to travel from the system controller to one of the air springs based at least on the received signals from the proportional control sensors.

12. The air management system of claim 1, wherein the air lines have equal lengths and diameters.

13. The air management system of claim 1 comprising a compressor disposed within the supply tank.

14. The air management system of claim 1, wherein each air spring comprises an inertial sensor unit comprising an accelerometer, a gyroscope, and a magnetometer.

15. The air management system of claim 14, wherein the accelerometer is configured to measure an acceleration with respect to three axes of the vehicle;
wherein the gyroscope is configured to measure an angular velocity with respect to three axes of the vehicle; and
wherein the magnetometer is configured to measure the magnetic force with respect to three axes of the vehicle.

16. The air management system of claim 15, wherein the inertial sensor unit is configured to transmit a signal indicating the measured acceleration, the angular velocity, and the magnetic force with respect to the three axes of the vehicle;
wherein the system controller is configured to receive the signal transmitted from the inertial sensor unit and calculate at least one of the vehicle yaw, vehicle pitch, and vehicle roll, and the system controller is configured to determine the desired air pressure of each air spring based on at least on one of the calculated vehicle yaw, vehicle pitch, and vehicle roll.

17. The air management system of claim 1, further comprising one or more sensors configured to monitor at least two conditions of its associated air spring and transmit a measurement signal indicating the at least two conditions of its associated air spring,
wherein the at least two conditions comprise a height of its associated air spring and a pressure of its associated air spring,
wherein, the system controller is configured to (i) receive the signals transmitted from the one or more sensors of each air spring, (ii) detect a height differential between at least one air spring disposed on the first side of the vehicle and at least one air spring disposed on the second side of the vehicle based at least on the received signals from the one or more sensors of each air spring, (iii) independently adjust air pressure of the at least one air spring disposed on the first side of the vehicle such that the first leveling valve is either supplying air from the air supply tank to the at least one air spring disposed on the first side of vehicle or removing air from the at least one air spring disposed on the first side of vehicle to the atmosphere, (iv) independently adjust air pressure of the at least one air spring disposed on the second side of the vehicle by a second leveling valve such that the second leveling valve is either supplying air from the air supply tank to the at least one air spring disposed on the second side of the vehicle or removing air from the at least one air spring disposed on the second side of the vehicle to the atmosphere, (v) detect a pressure differential between the at least one air springs disposed on the first side of the vehicle and the at least one air spring disposed on the second side of the vehicle based at least on the received signals from the one or more sensors of each air spring when both the first leveling valve and the second leveling valve are set in a neutral mode such that the height differential is within a predetermined threshold such that each leveling valve is neither supplying air from the air supply tank or removing air to the atmosphere, and (vi) establish pneumatic communication between the first and second pneumatic circuits when the system controller is not adjusting independently the air pressure of the one or more air springs of the first pneumatic circuit and not adjusting independently the air pressure of the one or more air springs of the second pneumatic circuit.

18. A method for adjusting air pressure of an air management system of a vehicle operated under dynamic driving conditions comprising a supply tank, a first pneumatic circuit disposed on a first side of the vehicle, and a second pneumatic circuit disposed on a second side of the vehicle, the method comprising:
adjusting independently, by a system controller, the air pressure of the first pneumatic circuit such that the system controller is either supplying air from the supply tank to the first pneumatic circuit or removing air from the first pneumatic circuit to the atmosphere;
adjusting independently, by the system controller, the air pressure of the second pneumatic circuit such that the system controller is either supplying air from the supply tank to the second pneumatic circuit or removing air from the second pneumatic circuit to the atmosphere; and
establishing, by the system controller, pneumatic communication between the first pneumatic circuit and the second pneumatic circuit only when the system controller is neither supplying air from the supply tank nor removing air to the atmosphere;
wherein the system controller comprises a housing integrated with the supply tank, and the housing comprises an internal cross-flow passage pneumatically connecting the first and second pneumatic circuits.

19. The method of claim 18, further comprising:
(i) monitoring, by one or more sensors, at least one condition of at least one air spring disposed on each of the first and second sides of the vehicle;
(ii) transmitting, by the one or more sensors, at least one signal indicating the at least one condition of the at least one air spring disposed on each of the first and second sides of the vehicle;
(iii) receiving, by a processing module, at least one signal indicating the at least one condition of the at least one air spring disposed on each of the first and second sides of the vehicle;
(iv) detecting, by the processing module, a height differential between the at least one air spring disposed on each of the first and second sides of the vehicle based at least on the received signals;
(v) independently adjusting, by a first leveling valve, air pressure of the at least one air spring disposed on the first side of the vehicle such that the first leveling valve is either supplying air from the air supply tank to the at least one air spring disposed on the first side of the vehicle or removing air from the at least one air spring disposed on the first side of the vehicle to the atmosphere;

(vi) independently adjusting, by a second leveling valve, air pressure of the at least one air spring disposed on the second side of the vehicle such that the second leveling valve is either supplying air from the air supply tank to the at least one air spring disposed on the second side of the vehicle or removing air from the at least one air spring disposed on the second side of the vehicle to the atmosphere;

(vii) detecting, by the processing module, an air pressure differential between at least one air spring disposed on each of the first and second sides of the vehicle based at least on the received signals when both the first leveling valve and the second leveling valve are set in a neutral mode such that the height differential is within a predetermined threshold such that first and second leveling valves are neither supplying air from the air supply tank nor removing air to the atmosphere; and (viii) establishing pneumatic communication between the first pneumatic circuit and the second pneumatic circuit only when both the first leveling valve and the second leveling valve are set in a neutral mode via an internal cross-flow passage pneumatically connecting the first and second pneumatic circuits extending through the supply tank.

20. The method of claim 18, wherein the one or more sensors comprises a height sensor configured to monitor the height of the air spring and transmit a signal indicating the height of the air spring.

21. The method of claim 20, wherein the height sensor is an ultrasonic sensor, a laser sensor, an infrared sensor, an electromagnetic wave sensor, or a potentiometer.

22. The method of claim 18, wherein the one or more sensors comprise a pressure sensor configured to monitor the internal air pressure of the air spring and transmit a signal indicating the internal air pressure of the air spring.

23. The method of claim 18, wherein the system controller comprises a housing disposed on an exterior surface of the supply tank.

24. The method of claim 18, wherein the system controller comprises a housing disposed within the supply tank.

25. The method of claim 18 comprising a compressor disposed within the supply tank.

26. A system controller for an air management system comprising a supply tank, a first pneumatic circuit disposed on a first side of a vehicle, and a second pneumatic circuit disposed on a second side of a vehicle, the system controller comprising:

a housing integrated with the supply tank, wherein the housing comprises at least one tank port pneumatically connected to the supply tank, a first port pneumatically connected to the first pneumatic circuit, a second port pneumatically connected to the second pneumatic circuit, and an exhaust port pneumatically connected to the atmosphere; and a set of valves configured to selectively supply air from the air tank to at least one of the first and second pneumatic circuits, remove air from at least one of the first and second pneumatic circuits to the atmosphere, and establish pneumatic communication between the first and second pneumatic circuits;

wherein the system controller is configured to adjust independently air pressure of the first pneumatic circuit and adjust independently air pressure of the second pneumatic circuit without establishing pneumatic communication between the first and second pneumatic circuits;

wherein the system controller is configured to establish pneumatic communication between the first and second pneumatic circuits when the system controller is not adjusting independently the air pressure of the first pneumatic circuit and not adjusting independently the air pressure of the second pneumatic circuit.

27. The system controller of claim 26, wherein the housing is disposed on an exterior surface of the supply tank.

28. The system controller of claim 26, wherein the housing is disposed within the supply tank.

29. The system controller of claim 26, wherein the at least one tank port comprises a first tank port and a second tank port, and wherein the housing comprises:
a first passage pneumatically connecting the first port with the first tank port,
a second passage pneumatically connecting the second port with the second tank port,
a cross-flow passage pneumatically connecting the first passage with the second passage, and
an exhaust passage pneumatically connecting the exhaust port to the cross-flow passage.

30. The system controller of claim 29, wherein the set of valves is a valve unit comprising:
a first valve disposed at an intersection between the first passage and the cross-flow passage,
a second valve disposed at an intersection between the second passage and the cross-flow passage, and
a third valve disposed at an intersection between the exhaust passage and the cross-flow passage.

* * * * *